US009935459B2

(12) United States Patent
Kogo

(10) Patent No.: US 9,935,459 B2
(45) Date of Patent: Apr. 3, 2018

(54) POWER NETWORK SYSTEM, AND POWER ADJUSTMENT APPARATUS AND METHOD

(71) Applicant: NEC Corporation, Tokyo (JP)

(72) Inventor: Takuma Kogo, Tokyo (JP)

(73) Assignee: NEC Corporation, Tokyo (JP)

( * ) Notice: Subject to any disclaimer, the term of this patent is extended or adjusted under 35 U.S.C. 154(b) by 304 days.

(21) Appl. No.: 14/891,816

(22) PCT Filed: May 8, 2014

(86) PCT No.: PCT/JP2014/002445
§ 371 (c)(1),
(2) Date: Nov. 17, 2015

(87) PCT Pub. No.: WO2014/185035
PCT Pub. Date: Nov. 20, 2014

(65) Prior Publication Data
US 2016/0134109 A1    May 12, 2016

(30) Foreign Application Priority Data
May 17, 2013   (JP) .................................. 2013-105214

(51) Int. Cl.
H02J 1/10            (2006.01)
H02J 3/46            (2006.01)
(Continued)

(52) U.S. Cl.
CPC ................. H02J 1/10 (2013.01); H02J 1/14 (2013.01); H02J 3/46 (2013.01); H02J 13/0079 (2013.01);
(Continued)

(58) Field of Classification Search
CPC . H02J 3/14; H02J 13/0075; H02J 1/08; G05F 5/00; Y10T 307/549; Y02B 70/3225; Y04S 20/222
See application file for complete search history.

(56) References Cited

U.S. PATENT DOCUMENTS 6,290,131 B1 *   9/2001   Kolis ................. G06K 7/10851
                                                  235/462.01
9,768,832 B2 *   9/2017   Nishibayashi ......... H04B 3/542
(Continued)

FOREIGN PATENT DOCUMENTS

JP          3934518         6/2007
JP        2011-61931        3/2011
(Continued)

OTHER PUBLICATIONS

Website reference of the Digital Grid Consortium (http://www.digitalgrid.org/jp/), [searched on Nov. 28, 2012].
(Continued)

Primary Examiner — Daniel Kessie
(74) Attorney, Agent, or Firm — Finnegan, Henderson, Farabow, Garrett & Dunner, L.L.P.

(57) ABSTRACT

A central control device is connected to a first power router including some power transmitting ends and a second power router including some power receiving ends, acquires, for each of the power receiving ends, received power information including identification information of each of the power transmitting ends and a value of supply power supplied from each of the power transmitting ends, and power supply priority information defining a priority for determining a power transmitting end for which an adjustment of the supply power to be supplied to each of the power receiving ends should be prioritized, determines a power transmitting end for which the supply power is adjusted from among the power transmitting ends based on the
(Continued)

received power information and the priority defined in the power supply priority information, and adjusts the supply power in the determined power transmitting end.

12 Claims, 67 Drawing Sheets

(51) Int. Cl.
  *H02J 13/00* (2006.01)
  *H02J 1/14* (2006.01)
  *H02J 7/00* (2006.01)
(52) U.S. Cl.
  CPC ............ *H02J 1/102* (2013.01); *H02J 7/0052* (2013.01); *H02J 2007/0059* (2013.01)

(56) References Cited

U.S. PATENT DOCUMENTS

| | | | | |
|---|---|---|---|---|
| 2004/0070280 | A1* | 4/2004 | Nakata | H02J 3/32 307/69 |
| 2007/0114954 | A1* | 5/2007 | Hampo | B60L 11/1868 318/105 |
| 2010/0001585 | A1* | 1/2010 | Nagata | H02J 3/14 307/24 |
| 2012/0158202 | A1 | 6/2012 | Yano et al. | |
| 2012/0173035 | A1 | 7/2012 | Abe | |
| 2012/0313443 | A1* | 12/2012 | Cheng | H02J 3/383 307/82 |
| 2013/0033111 | A1* | 2/2013 | Kawamoto | G05F 1/67 307/66 |
| 2013/0082525 | A1* | 4/2013 | Szu | H02J 1/108 307/26 |
| 2013/0099592 | A1* | 4/2013 | Abe | H02J 5/005 307/104 |
| 2014/0125137 | A1* | 5/2014 | Couture | H02J 13/0065 307/98 |
| 2016/0049794 | A1* | 2/2016 | Liu | H02J 3/38 307/24 |

FOREIGN PATENT DOCUMENTS

| | | |
|---|---|---|
| JP | 2011-61970 | 3/2011 |
| JP | 4783453 | 9/2011 |
| JP | 2012-85516 | 4/2012 |

OTHER PUBLICATIONS

International Search Report and Written Opinion dated Jun. 17, 2014 in corresponding PCT International Application.

* cited by examiner

|  | | SECOND POWER ROUTER | | | |
|---|---|---|---|---|---|
| | | MASTER LEG | DESIGNATED POWER TRANSMISSION/RECEPTION LEG | STAND-ALONE LEG | AC-THROUGH |
| FIRST POWER ROUTER | MASTER LEG | UN-CONNECTABLE | UN-CONNECTABLE | CONNECTABLE | CONNECTABLE |
| | DESIGNATED POWER TRANSMISSION/ RECEPTION LEG | UN-CONNECTABLE | UN-CONNECTABLE | CONNECTABLE | CONNECTABLE |
| | STAND-ALONE LEG | CONNECTABLE | CONNECTABLE | UN-CONNECTABLE | CONNECTABLE |
| | AC-THROUGH | CONNECTABLE | CONNECTABLE | CONNECTABLE | CONNECTION IS USELESS |

Fig. 15

| SETTING ID | POWER ROUTER ID | INPUT/OUTPUT TERMINAL ID | INPUT/OUTPUT | START TIME | END TIME | ACTIVE POWER (kWh) |
|---|---|---|---|---|---|---|
| ST1 | 100A | 110A | INPUT | 10:00 | 10:30 | 7.0 |
| ST2 | 100A | 120A | OUTPUT | 10:00 | 10:30 | 7.0 |
| ST3 | 200A | 210A | INPUT | 10:00 | 10:30 | 7.0 |
| ST4 | 200A | 220A | INPUT | 10:00 | 10:30 | 3.0 |
| ST5 | 200A | 230A | OUTPUT | 10:00 | 10:30 | 10.0 |

Fig. 23

| ROUTE ID | POWER TRANSMISSION SOURCE | | POWER TRANSMISSION DESTINATION | |
|---|---|---|---|---|
| | POWER ROUTER ID | INPUT/OUTPUT TERMINAL ID | POWER ROUTER ID | INPUT/OUTPUT TERMINAL ID |
| RT1 | 100A | 110A | 100A | 120A |
| RT2 | 100A | 120A | 200A | 210A |
| RT3 | 200A | 210A | 200A | 230A |
| RT4 | 200A | 220A | 200A | 230A |

Fig. 24

| MEASUREMENT TAG ID | POWER ROUTER ID | INPUT/OUTPUT TERMINAL ID | INPUT/OUTPUT | START TIME | END TIME | ACTIVE POWER (kWh) |
|---|---|---|---|---|---|---|
| MT1 | 100A | 110A | INPUT | 10:00 | 10:30 | 7.0 |
| MT2 | 100A | 120A | OUTPUT | 10:00 | 10:30 | 7.0 |
| MT3 | 200A | 210A | INPUT | 10:00 | 10:30 | 7.0 |
| MT4 | 200A | 220A | INPUT | 10:00 | 10:30 | 3.0 |
| MT5 | 200A | 230A | OUTPUT | 10:00 | 10:30 | 10.0 |

Fig. 25

| POWER TAG ID | POWER ROUTER ID | INPUT/OUTPUT TERMINAL ID | INPUT/OUTPUT | DATE | TIME PERIOD | POWER TRANSMISSION SOURCE | BREAKDOWN POWER (kWh) |
|---|---|---|---|---|---|---|---|
| PT1 | 100A | 110A | INPUT | 20121114 | 10:00-10:30 | UTILITY GRID | 7.0 |
| PT2 | 100A | 120A | OUTPUT | 20121114 | 10:00-10:30 | 110A | 7.0 |
| PT3 | 200A | 210A | INPUT | 20121114 | 10:00-10:30 | 120A | 7.0 |
| PT4 | 200A | 220A | INPUT | 20121114 | 10:00-10:30 | STORAGE BATTERY | 3.0 |
| PT5 | 200A | 230A | OUTPUT | 20121114 | 10:00-10:30 | 210A | 7.0 |
| PT6 | 200A | 230A | OUTPUT | 20121114 | 10:00-10:30 | 220A | 3.0 |

Fig. 26

| CONTRACT ID | POWER TRANSMITTER ID | POWER RECEIVER ID | DATE | TIME PERIOD | CONTRACT TIME (MINUTE) | POWER (kWh) | PRICE (YEN/kWh) | CO2 EMISSION COEFFICIENT (G/kWh) | POWER GENERATION ORIGIN |
|---|---|---|---|---|---|---|---|---|---|
| C1 | a | b | 20120817 | 12:00–13:30 | 90 | 12.0 | 20.0 | 570.0 | THERMAL POWER |
| C2 | c | d | 20121005 | 10:00–11:00 | 60 | 8.0 | 16.3 | 180.0 | NUCLEAR POWER |
| C3 | e | f | 20121114 | 10:00–10:30 | 30 | 10.0 | 25.5 | 60.0 | SOLAR LIGHT |

Fig. 35

| SETTING ID | POWER ROUTER ID | INPUT/ OUTPUT TERMINAL ID | INPUT/ OUTPUT | START TIME | END TIME | ACTIVE POWER (kWh) | REACTIVE POWER (kvarh) |
|---|---|---|---|---|---|---|---|
| ST1 | 100B | 110B | INPUT | 10:00 | 10:30 | 10.0 | 0.0 |
| ST2 | 100B | 140B | OUTPUT | 10:00 | 10:30 | 10.0 | 0.0 |
| ST3 | 200B | 210B | INPUT | 10:00 | 10:30 | 10.0 | 0.0 |
| ST4 | 200B | 230B | OUTPUT | 10:00 | 10:30 | 10.0 | 0.0 |

| SETTING ID | CONTRACT ID |
|---|---|
| ST1 | C3 |

Fig. 38

| ROUTE ID | POWER TRANSMISSION SOURCE | | POWER TRANSMISSION DESTINATION | |
|---|---|---|---|---|
| | POWER ROUTER ID | INPUT/OUTPUT TERMINAL ID | POWER ROUTER ID | INPUT/OUTPUT TERMINAL ID |
| RT1 | 100B | 110B | 100B | 140B |
| RT2 | 100B | 120B | 100B | 140B |
| RT3 | 100B | 140B | 200B | 210B |
| RT4 | 200B | 210B | 200B | 230B |
| RT5 | 200B | 220B | 200B | 230B |

| MEASUREMENT ID | POWER ROUTER ID | INPUT/ OUTPUT TERMINAL ID | INPUT/ OUTPUT | START TIME | END TIME | ACTIVE POWER (kWh) | REACTIVE POWER (kWh) | status |
|---|---|---|---|---|---|---|---|---|
| MT1 | 100B | 110B | INPUT | 10:00 | 10:30 | 10.0 | 0.0 | NORMAL |
| MT2 | 100B | 120B | INPUT | 10:00 | 10:30 | 1.0 | 0.0 | Master |
| MT3 | 100B | 140B | OUTPUT | 10:00 | 10:30 | 10.0 | 0.0 | NORMAL |
| MT4 | 200B | 210B | INPUT | 10:00 | 10:30 | 9.0 | 0.0 | NORMAL |
| MT5 | 200B | 220B | INPUT | 10:00 | 10:30 | 2.0 | 0.0 | Master |
| MT6 | 200B | 230B | OUTPUT | 10:00 | 10:30 | 10.0 | 0.0 | NORMAL |

Fig. 39

| INPUT/ OUTPUT TERMINAL ID | BREAKDOWN POWER (kWh) | POWER TRANSMISSION SOURCE (BREAKDOWN) | MEASUREMENT TAG TO BE REFERRED | POWER TAG TO BE GENERATED |
| --- | --- | --- | --- | --- |
| 110B | 10.0 | PHOTOVOLTAIC POWER | MT1 | PT1 |
| 120B | 1.0 | Master | MT2 | PT2 |
| 220B | 2.0 | Master | MT5 | PT7 |

Fig. 41

| | TARGET OUTPUT TERMINAL | INPUT TERMINAL OF NEXT HOP ROUTER | POWER TRANSMISSION SOURCE | BREAKDOWN CALCULATION FORMULA | BREAKDOWN RATIO | BREAKDOWN POWER (kWh) | MEASUREMENT TAG TO BE REFERRED | POWER TAG TO BE GENERATED |
|---|---|---|---|---|---|---|---|---|
| S44 | 140B | — | 110B | 10 / ( 10 + 1 ) * 10 | 91% | 9.1 | MT1, MT3 | PT3 |
| | | | 120B (Master) | 1 / ( 10 + 1 ) * 10 | 9% | 0.9 | MT2, MT3 | PT4 |
| S45 | — | 210B | 110B | 9.1 / 10 * 9 | 91% | 8.2 | MT3, MT4 | PT5 |
| | | | 120B (Master) | 0.9 / 10 * 9 | 9% | 0.8 | MT3, MT4 | PT6 |
| S44 | 230B | — | 110B | 8.2 / ( 9 + 2 ) * 10 | 75% | 7.5 | MT4, MT6 | PT8 |
| | | | 120B (Master) | 0.8 / ( 9 + 2 ) * 10 | 7% | 0.7 | MT4, MT6 | PT9 |
| | | | 220B (Master) | 2.0 / ( 9 + 2 ) * 10 | 18% | 1.8 | MT5, MT6 | PT10 |

Fig. 42

| POWER TAG ID | POWER ROUTER ID | INPUT/OUTPUT TERMINAL ID | INPUT/OUTPUT | DATE | TIME PERIOD | ACTIVE POWER (kWh) | REACTIVE POWER (kvarh) | status | CONTRACT ID | PRICE (YEN/kWh) | $CO_2$ EMISSION COEFFICIENT (G/kWh) | POWER GENERATION ORIGIN |
|---|---|---|---|---|---|---|---|---|---|---|---|---|
| PT1 | 100B | 110B | INPUT | 20121114 | 10:00-10:30 | 10.0 | 0.0 | NORMAL | C3 | 25.5 | 60.0 | SOLAR LIGHT |
| PT2 | 100B | 120B | INPUT | 20121114 | 10:00-10:30 | 1.0 | 0.0 | Master | – | – | – | – |
| PT3 | 100B | 140B | OUTPUT | 20121114 | 10:00-10:30 | 9.1 | 0.0 | NORMAL | C3 | 25.5 | 60.0 | SOLAR LIGHT |
| PT4 | 100B | 140B | OUTPUT | 20121114 | 10:00-10:30 | 0.9 | 0.0 | Master | – | – | – | – |
| PT5 | 200B | 210B | INPUT | 20121114 | 10:00-10:30 | 8.2 | 0.0 | NORMAL | C3 | 25.5 | 60.0 | SOLAR LIGHT |
| PT6 | 200B | 210B | INPUT | 20121114 | 10:00-10:30 | 0.8 | 0.0 | Master | – | – | – | – |
| PT7 | 200B | 220B | INPUT | 20121114 | 10:00-10:30 | 2.0 | 0.0 | Master | – | – | – | – |
| PT8 | 200B | 230B | OUTPUT | 20121114 | 10:00-10:30 | 7.5 | 0.0 | NORMAL | C3 | 25.5 | 60.0 | SOLAR LIGHT |
| PT9 | 200B | 230B | OUTPUT | 20121114 | 10:00-10:30 | 0.7 | 0.0 | Master | – | – | – | – |
| PT10 | 200B | 230B | OUTPUT | 20121114 | 10:00-10:30 | 1.8 | 0.0 | Master | – | – | – | – |

Fig. 43

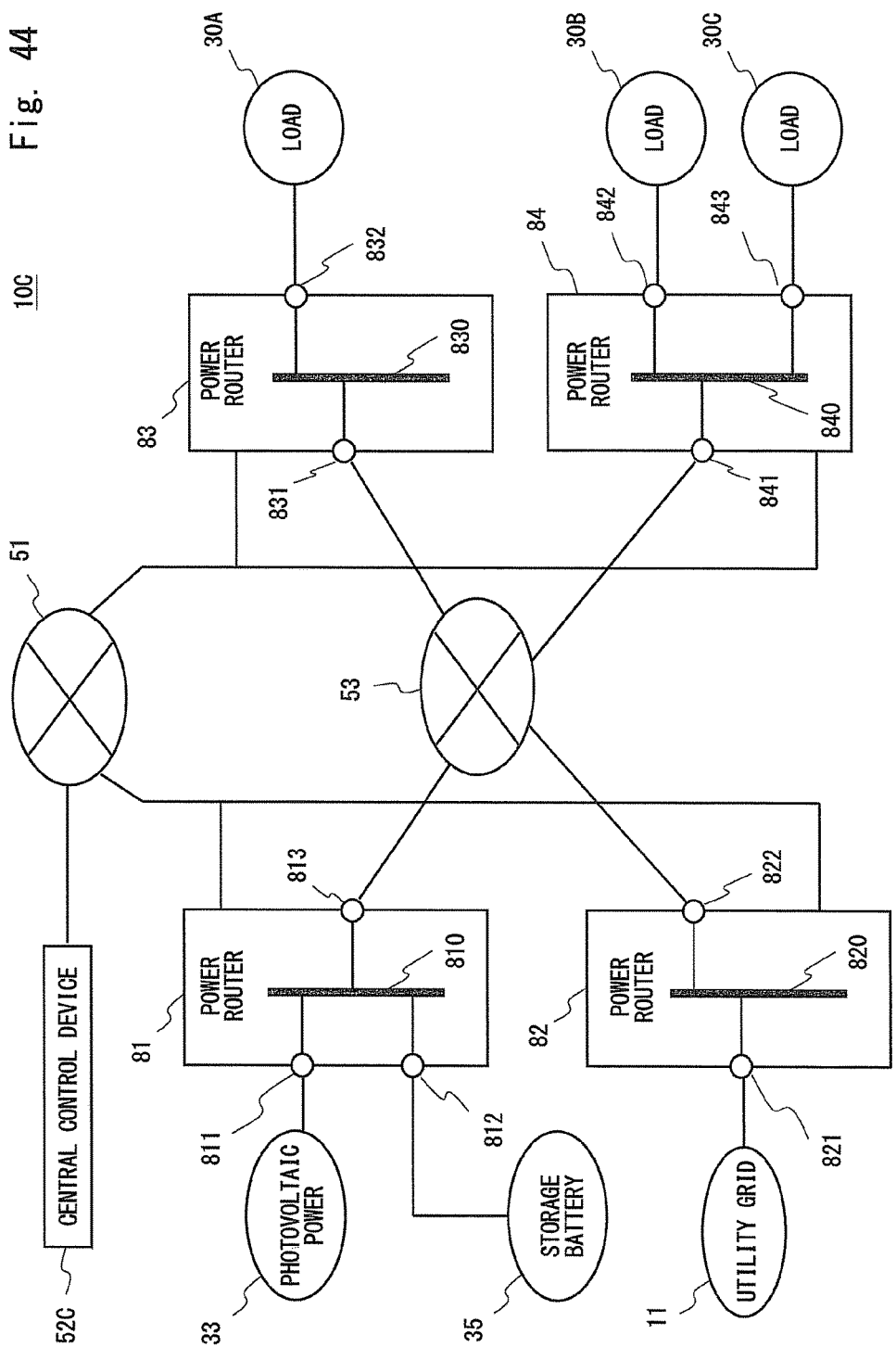

Fig. 63

| POWER TRANS-MITTING END s | | BEFORE POWER ADJUSTMENT | | AFTER POWER ADJUSTMENT |
|---|---|---|---|---|
| s1 | Bl(s) | Bu(s) | G(s) | | G(s) |
| | 20 | 50 | 30 | => | 50 |
| | POWER RECEIVING END AT SUPPLY DESTINATION | BREAKDOWN POWER | | BREAKDOWN POWER AFTER ADJUSTMENT |
| | d1 | 10 | => | 25 |
| | d2 | 10 | => | 25 |
| | d3 | 10 | => | 0 |
| s2 | Bl(s) | Bu(s) | G(s) | | G(s) |
| | 50 | 80 | 60 | => | 55 |
| | POWER RECEIVING END AT SUPPLY DESTINATION | BREAKDOWN POWER | | BREAKDOWN POWER AFTER ADJUSTMENT |
| | d1 | 20 | => | 20 |
| | d2 | 20 | => | 25 |
| | d3 | 20 | => | 10 |
| s3 | Bl(s) | Bu(s) | G(s) | | G(s) |
| | 70 | 110 | 90 | => | 95 |
| | POWER RECEIVING END AT SUPPLY DESTINATION | BREAKDOWN POWER | | BREAKDOWN POWER AFTER ADJUSTMENT |
| | d1 | 30 | => | 35 |
| | d2 | 30 | => | 30 |
| | d3 | 30 | => | 30 |

Fig. 64

| POWER TRANS-MITTING END d | | | BEFORE POWER ADJUSTMENT | | | AFTER POWER ADJUSTMENT | |
|---|---|---|---|---|---|---|---|
| d1 | REQUESTED POWER | | CURRENT RECEIVED POWER | DIFFER-ENCE | | BREAKDOWN POWER AFTER ADJUSTMENT | DIFFER-ENCE |
| | 80 | | 60 | 20 | => | 80 | 0 |
| | PRIORITY OF POWER TRANSMITTING END | TRANSMITTING END | BREAKDOWN POWER | | | BREAKDOWN POWER AFTER ADJUSTMENT | |
| | 1 | s1 | 10 | | => | 25 | |
| | 2 | s3 | 30 | | => | 35 | |
| | 3 | s2 | 20 | | => | 20 | |
| d2 | REQUESTED POWER | | CURRENT RECEIVED POWER | DIFFER-ENCE | | BREAKDOWN POWER AFTER ADJUSTMENT | DIFFER-ENCE |
| | 80 | | 60 | 20 | => | 80 | 0 |
| | PRIORITY OF POWER TRANSMITTING END | TRANSMITTING END | BREAKDOWN POWER | | | BREAKDOWN POWER AFTER ADJUSTMENT | |
| | 1 | s1 | 10 | | => | 25 | |
| | 2 | s2 | 20 | | => | 25 | |
| | 3 | s3 | 30 | | => | 30 | |
| d3 | REQUESTED POWER | | CURRENT RECEIVED POWER | DIFFER-ENCE | | BREAKDOWN POWER AFTER ADJUSTMENT | DIFFER-ENCE |
| | 40 | | 60 | -20 | => | 40 | 0 |
| | PRIORITY OF POWER TRANSMITTING END | TRANSMITTING END | BREAKDOWN POWER | | | BREAKDOWN POWER AFTER ADJUSTMENT | |
| | 1 | s3 | 30 | | => | 30 | |
| | 2 | s2 | 20 | | => | 10 | |
| | 3 | s1 | 10 | | => | 0 | |

Fig. 67

| LEG GROUP ID | LEG BELONGING TO GROUP | PRIORITY dp |
|---|---|---|
| 85 | d1 | 1 |
| 86 | d2, d3 | 2 |

Fig. 68

| LEG ID | PRIORITY dp |
|---|---|
| d1 | 1 |
| d2 | 2 |
| d3 | 2 |

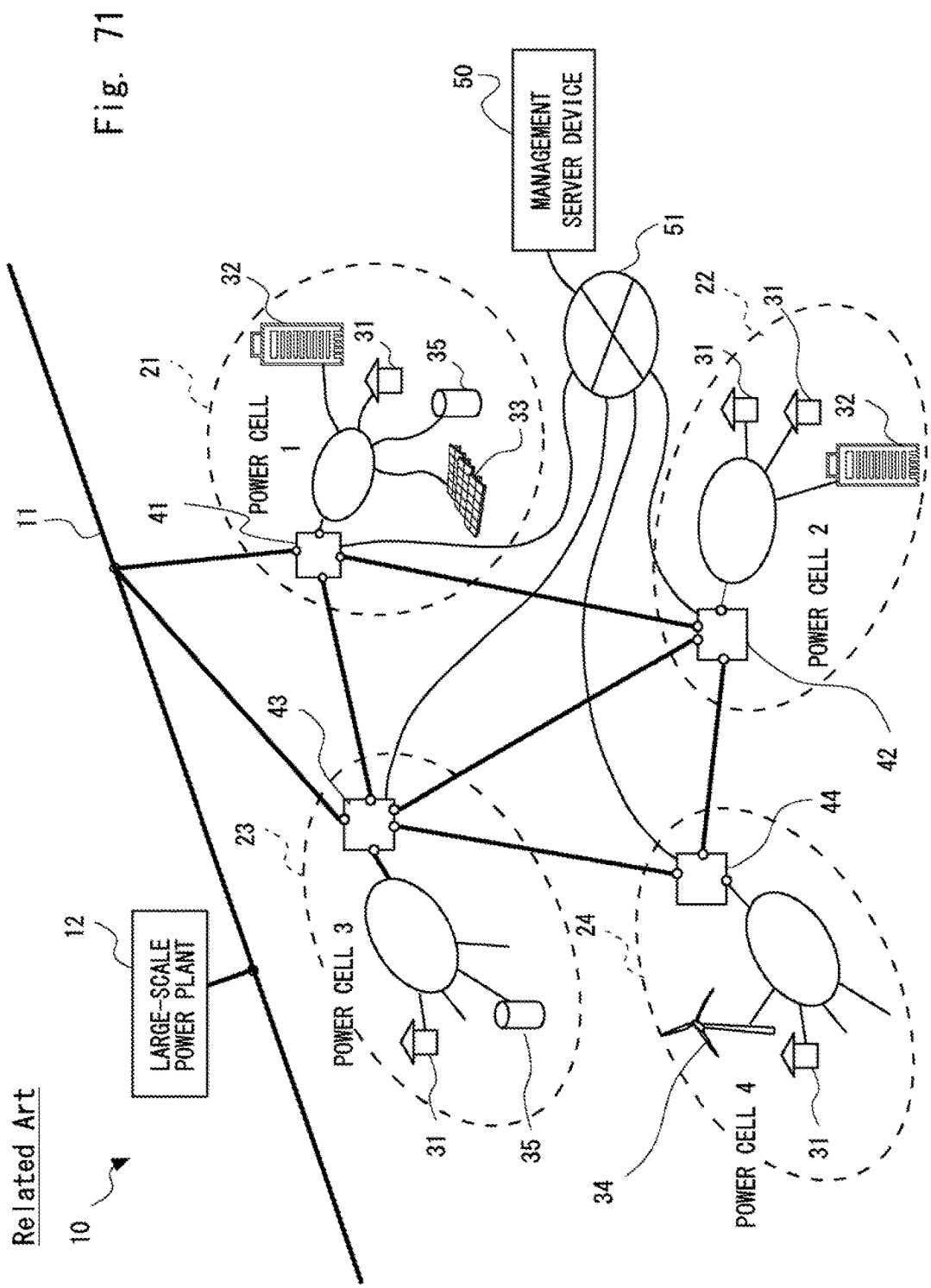

ND POWER
POWER NETWORK SYSTEM, AND POWER ADJUSTMENT APPARATUS AND METHOD

CROSS-REFERENCE TO RELATED PATENT APPLICATIONS

This application is a National Stage Entry of International Application No. PCT/JP2014/002445, filed May 8, 2014, which claims priority from Japanese Patent Application No. 2013-105214, filed May 17, 2013. The entire contents of the above-referenced applications are expressly incorporated herein by reference.

TECHNICAL FIELD

The present invention relates to a power network system, and a power adjustment apparatus, a method and a program. In particular, the present invention relates to a power network system, and a power adjustment apparatus, a method and a program capable of adjusting input/output power to an arbitrary value and capable of identifying a breakdown of power supply sources of received power.

BACKGROUND ART

When a power supply system is constructed, in addition to a further expansion of a power distribution grid in a more stable way, a main issue has been providing such a system with a capability of introducing a large amount of natural energy. A power network system called Digital Grid (registered trademark) has been proposed as a new power network (see Patent literature 1 and Non-patent literature 1). Digital Grid (registered trademark) is a power network system in which a power network is partitioned into small-sized cells and these cells are asynchronously interconnected. Each power cell may be small (e.g., a house, a building, or a commercial facility) or may be large (e.g., a prefecture or a municipality). Each power cell naturally includes a load, and may also include a power generation facility or a power storage system. The power generation facility may be, as an example, a power generation facility that uses natural energy generated by, for example, photovoltaic power, wind power, and geothermal power.

In order to freely generate power inside each power cell and to further smoothly interchange power among the power cells, the power cells are asynchronously connected. (That is, even when the plurality of power cells are interconnected, a frequency, a phase, and a voltage of power used in each power cell are asynchronous with those used in other power cells.) FIG. 71 shows an example of a power network system 10.

In FIG. 71, a utility grid 11 sends bulk power from a large-scale power plant 12. A plurality of power cells 21-24 is arranged. Each of the power cells 21-24 includes a load such as a house 31 and a building 32, power generation facilities 33 and 34, and a power storage system 35. The power generation facility may include, as an example, a solar panel 33 and a wind turbine 34. The power storage system is, for example, a storage battery 35. In this specification, the power generation facility and the power storage system may be collectively called a distributed power supply.

Further, the power cells 21-24 respectively include power routers 41-44 which serve as connection ports to be connected to other power cells or the utility grid 11. Each of the power routers 41-44 includes a plurality of legs (LEG). (Due to space constraints, the symbols for the legs are omitted in FIG. 71. It should be interpreted that the white circles attached to the power routers 41-44 are connection terminals of each leg.)

Now, each leg includes a connection terminal and a power conversion unit, and an address is attached to each leg. The power conversion by the leg means converting AC to DC or DC to AC and changing the phase, the frequency, and the voltage of the power.

All the power routers 41-44 are connected to a management server 50 by a communication network 51 and operations of all the power routers 41-44 are integrally controlled by the management server 50. For example, the management server 50 instructs each of the power routers 41-44 to transmit or receive power for each leg using the address attached to each leg. Accordingly, power is interchanged among power cells through the power routers 41-44.

Since power interchange among the power cells is achieved, a plurality of power cells can share, for example, one power generation facility 33 or 34 or one power storage system 35. If an excessive power can be interchanged among the power cells, a supply-demand balance of power can be kept stable while greatly reducing the equipment cost.

Further, Patent Literature 2 discloses a technique related to a power system in which priorities are assigned to a plurality of loads to which power is supplied according to the relative importance among the plurality of loads. In the power system disclosed in Patent Literature 2, for example, when the predicted available power is smaller than the demand of the overall load, the balance between the demand and the supply of the overall power in the system is adjusted by cancelling a connection(s) to the input power source for a load(s) having low importance.

CITATION LIST

Patent Literature

Patent Literature 1: Japanese Patent No. 4783453
Patent Literature 2: Japanese Unexamined Patent Application Publication No. 2012-85516

Non Patent Literature

Non-patent literature 1: Digital Grid Consortium, [searched on Nov. 28, 2012], the Internet <http://www.digitalgrid.org/index.php/jp/>

SUMMARY OF INVENTION

Technical Problem

If a plurality of power cells can be asynchronously connected by power routers, the advantage achieved by this asynchronous connection would be extremely large. It is thus desired that the power routers will be put into practical use at an early stage.

Incidentally, in Patent Literature 2, it is impossible to individually change the priorities for the plurality of power supply sources, which are the input power sources, among the plurality of loads (demanders to which power is supplied from power receiving ends). That is, there is a problem that it is impossible to cope with an individual need for the power supply source, which is required in the customer of power in each load. When the power network system like the one shown in Patent Literature 1 is put into practical use in the future, it is expected that power from a plurality of power supply sources is received in a mixed manner and its breakdown can be identified (i.e., each of power supply sources is identified). In such cases, there is a possibility that each of a plurality of power customers individually changes the priorities of the power supply sources.

The present invention has been made to solve the above-described problem and an object thereof is to provide a power network system, and a power adjustment apparatus, a method and a program for adjusting power supplies among a plurality of power receiving ends according to different priorities for a plurality of power supply sources.

Solution to Problem

A power network system according to a first aspect of the present invention is a power network system including a plurality of power cells each including a power router for asynchronous connection to a power grid, in which the power router includes:

a DC (Direct Current) bus maintained at a predetermined rated voltage;

a plurality of input/output end parts, one of connection ends of each of the input/output end parts being connected to the DC bus and the other of the connection ends serving as an external connection terminal and being connected to an external connection partner, each of the input/output end parts being configured to convert power between the one connection end and the other connection end; and control means for controlling the plurality of input/output end parts, at least first and second power routers among the plurality of power routers are connected to each other by respective input/output end parts, some of the plurality of input/output end parts included in the first power router are used as a plurality of power transmitting ends, each of the plurality of power transmitting ends supplies supply power to the second power router, the supply power being supplied from one of a plurality of power supply sources, some of the plurality of input/output end parts included in the second power router are used as a plurality of power receiving ends, each of the plurality of power receiving ends receives supply power through the DC bus and supplies the received power to one of a plurality of power demanders, the supply power being supplied from each of the plurality of power transmitting ends, the power network system includes a power adjustment apparatus connected to the first and second power routers through a communication network, the power adjustment apparatus includes power adjustment means for adjusting the supply power according to a power request value requested in each of the plurality of power receiving ends, and the power adjustment means:

acquires, for each of the plurality of power receiving ends, received power information including identification information of each of the plurality of power transmitting ends and a value of supply power supplied from each of the plurality of power transmitting ends, and power supply priority information defining a priority for determining a power transmitting end for which an adjustment of the supply power to be supplied to each of the plurality of power receiving ends should be prioritized; and determines a power transmitting end for which the supply power is adjusted from among the plurality of power transmitting ends based on the received power information and the priority defined in the power supply priority information.

A power adjustment apparatus according to a second aspect of the present invention is a power adjustment apparatus connected to a power router through a communication network, the power router including:

a DC bus maintained at a predetermined rated voltage;

a plurality of input/output end parts, one of connection ends of each of the input/output end parts being connected to the DC bus and the other of the connection ends serving as an external connection terminal and being connected to an external connection partner, each of the input/output end parts being configured to convert power between the one connection end and the other connection end; and control means for controlling the plurality of input/output end parts, in which at least first and second power routers among the plurality of power routers are connected to each other by respective input/output end parts, some of the plurality of input/output end parts included in the first power router are used as a plurality of power transmitting ends, each of the plurality of power transmitting ends supplies supply power to the second power router, the supply power being supplied from one of a plurality of power supply sources, some of the plurality of input/output end parts included in the second power router are used as a plurality of power receiving ends, each of the plurality of power receiving ends receives supply power through the DC bus and supplies the received power to one of a plurality of power demanders, the supply power being supplied from each of the plurality of power transmitting ends, the power adjustment apparatus includes power adjustment means for adjusting the supply power according to a power request value requested in each of the plurality of power receiving ends, and the power adjustment means:

acquires, for each of the plurality of power receiving ends, received power information including identification information of each of the plurality of power transmitting ends and a value of supply power supplied from each of the plurality of power transmitting ends, and power supply priority information defining a priority for determining the power transmitting end for which an adjustment of the supply power to be supplied to each of the plurality of power receiving ends should be prioritized; and determines a power transmitting end for which the supply power is adjusted from among the plurality of power transmitting ends based on the received power information and the priority defined in the power supply priority information.

A power adjustment method according to a third aspect of the present invention is a power adjustment method using a power router and a power adjustment apparatus connected to the power router through a communication network, the power router including:

a DC bus maintained at a predetermined rated voltage;

a plurality of input/output end parts, one of connection ends of each of the input/output end parts being connected to the DC bus and the other of the connection ends serving as an external connection terminal and being connected to an external connection partner, each of the input/output end parts being configured to convert power between the one connection end and the other connection end; and control means for controlling the plurality of input/output end parts, in which at least first and second power routers among the plurality of power routers are connected to each other by respective input/output end parts, and when:

some of the plurality of input/output end parts included in the first power router are used as a plurality of power transmitting ends;

each of the plurality of power transmitting ends supplies supply power to the second power router, the supply power being supplied from one of a plurality of power supply sources;

some of the plurality of input/output end parts included in the second power router are used as a plurality of power receiving ends; and each of the plurality of power receiving ends receives supply power through the DC bus and supplies the received power to one of a plurality of power demanders, the supply power being supplied from each of the plurality of power transmitting ends, the power adjustment apparatus:

acquires, for each of the plurality of power receiving ends, received power information including identification information of each of the plurality of power transmitting ends and a value of supply power supplied from each of the plurality of power transmitting ends, and power supply priority information defining a priority for determining the power transmitting end for which an adjustment of the supply power to be supplied to each of the plurality of power receiving ends should be prioritized;

determines a power transmitting end for which the supply power is adjusted from among the plurality of power transmitting ends based on the received power information and the priority defined in the power supply priority information;

determines an adjustment value of supply power at the determined power transmitting end; and adjusts the supply power in each of the plurality of power transmitting ends based on the determined adjustment value.

A power adjustment program according to a fourth aspect of the present invention is a non-transitory computer readable medium storing a power adjustment program for causing a computer connected to a power router through a communication network to execute a power adjustment process, the power router including:

a DC bus maintained at a predetermined rated voltage;

a plurality of input/output end parts, one of connection ends of each of the input/output end parts being connected to the DC bus and the other of the connection ends serving as an external connection terminal and being connected to an external connection partner, each of the input/output end parts being configured to convert power between the one connection end and the other connection end; and control means for controlling the plurality of input/output end parts, in which at least first and second power routers among the plurality of power routers are connected to each other by respective input/output end parts, and when:

some of the plurality of input/output end parts included in the first power router are used as a plurality of power transmitting ends;

each of the plurality of power transmitting ends supplies supply power to the second power router, the supply power being supplied from one of a plurality of power supply sources;

some of the plurality of input/output end parts included in the second power router are used as a plurality of power receiving ends; and each of the plurality of power receiving ends receives supply power through the DC bus and supplies the received power to one of a plurality of power demanders, the supply power being supplied from each of the plurality of power transmitting ends, the power adjustment program causes the computer to execute:

a process of acquiring, for each of the plurality of power receiving ends, received power information including identification information of each of the plurality of power transmitting ends and a value of supply power supplied from each of the plurality of power transmitting ends, and power supply priority information defining a priority for determining the power transmitting end for which an adjustment of the supply power to be supplied to each of the plurality of power receiving ends should be prioritized;

a process of determining a power transmitting end for which the supply power is adjusted from among the plurality of power transmitting ends based on the received power information and the priority defined in the power supply priority information;

a process of determining an adjustment value of supply power at the determined power transmitting end; and a process of adjusting the supply power in each of the plurality of power transmitting ends based on the determined adjustment value.

Advantageous Effects of Invention

According to the present invention, it is possible to provide a power network system, and a power adjustment apparatus, a method and a program for adjusting power supplies among a plurality of power receiving ends according to different priorities for a plurality of power supply sources.

BRIEF DESCRIPTION OF DRAWINGS

FIG. 15 is a table in which combination patterns for a connection between power routers are summarized;

FIG. 23 shows an example of an input/output terminal setting management table according to the example 1 of the power identification technique;

FIG. 24 shows an example of power transmission route information according to the example 1 of the power identification technique;

FIG. 25 shows an example of a measurement tag according to the example 1 of the power identification technique;

FIG. 26 shows an example of a power tag according to the example 1 of the power identification technique;

FIG. 35 shows an example of a power transmission/reception transaction contract information management table according to the example 2 of the power identification technique;

FIG. 36 shows an example of an input/output terminal setting management table according to the example 2 of the power identification technique;

FIG. 37 shows an example of a correspondence table between power transmission/reception contract information and input/output terminal settings according to the example 2 of the power identification technique;

FIG. 38 shows an example of power transmission route information according to the example 2 of the power identification technique;

FIG. 39 shows an example of a measurement tag according to the example 2 of the power identification technique;

FIG. 41 shows an example of breakdown information according to the example 2 of the power identification technique;

FIG. 42 shows a calculation example of breakdown information according to the example 2 of the power identification technique;

FIG. 43 shows an example of a power tag according to the example 2 of the power identification technique;

FIG. 44 is a block diagram showing a configuration of a power network system according to a first exemplary embodiment of the present invention;

FIG. 63 shows an example of changes in values before and after power adjustments at power transmitting ends according to the first exemplary embodiment of the present invention;

FIG. 64 shows an example of changes in values before and after power adjustments at power transmitting ends according to the first exemplary embodiment of the present invention;

FIG. 67 shows an example of power demand priority information according to the second exemplary embodiment of the present invention;

FIG. 68 shows another example of power demand priority information according to the second exemplary embodiment of the present invention;

FIG. 71 is a diagram for explaining an outline of a power network system.

DESCRIPTION OF EMBODIMENTS

Specific exemplary embodiments to which the present invention is applied are explained hereinafter in detail with reference to the drawings. The same components are denoted by the same symbols throughout the drawings, and duplicated explanation is omitted as necessary for clarifying the explanation.

Firstly, a configuration of a power router that is in common in exemplary embodiments according to the present invention is explained.

Figure 1:
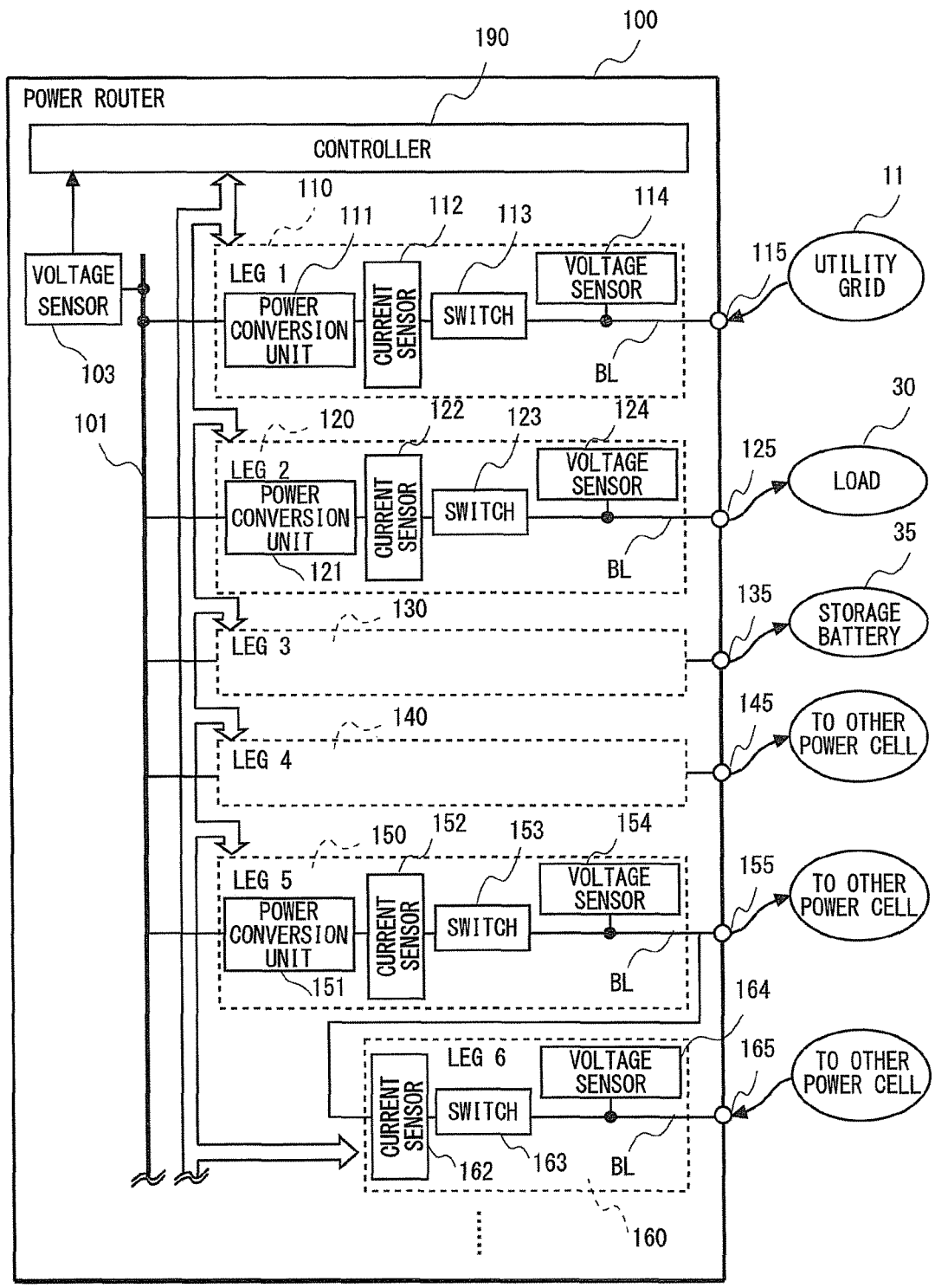
FIG. 1 is a block diagram showing a general configuration of a power router according to each exemplary embodiment of the present invention.

FIG. 1 is a diagram showing a schematic configuration of a power router 100.

Figure 2:
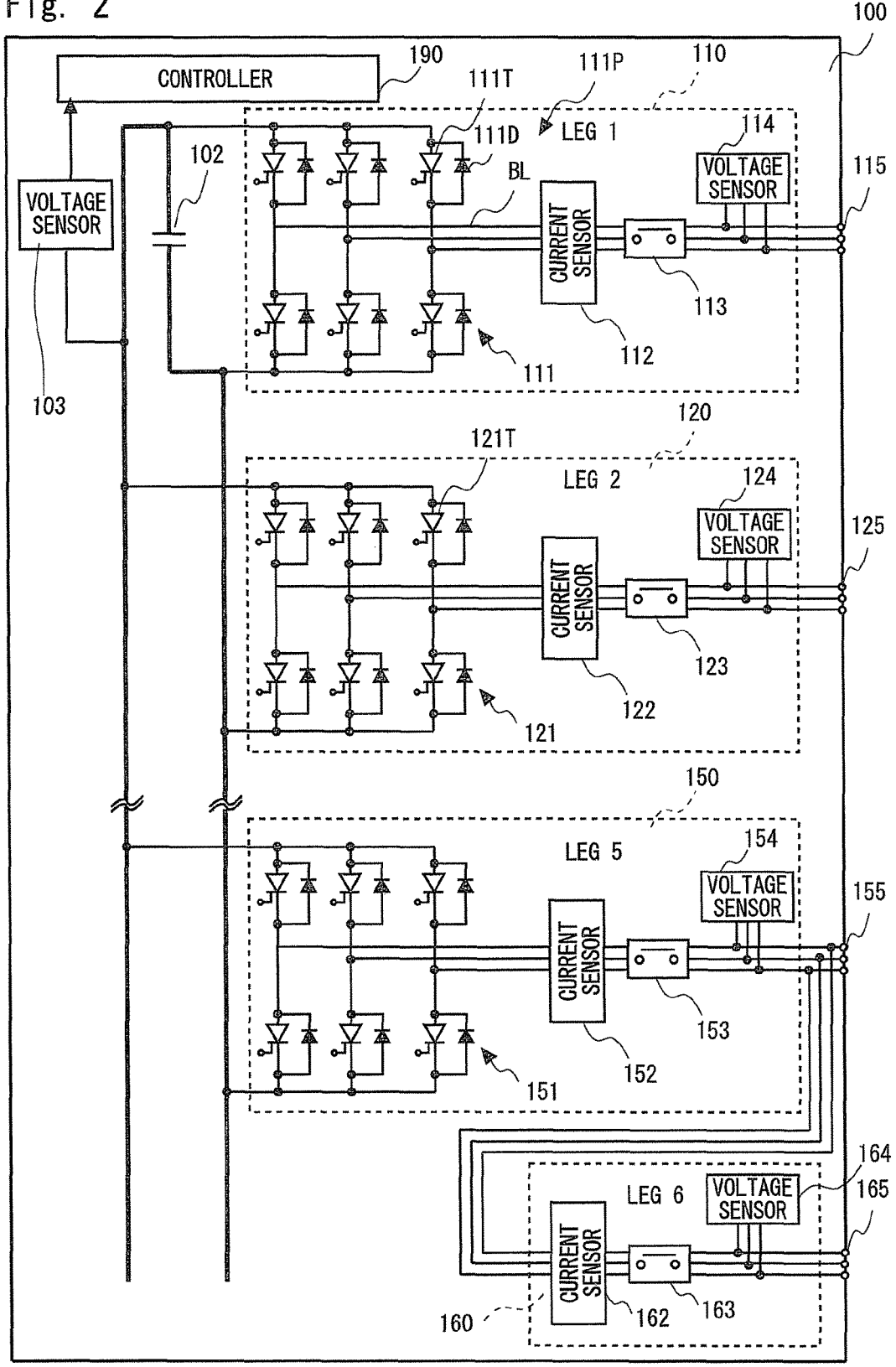
FIG. 2 is a block diagram showing showing details of an internal configuration of a power router according to each exemplary embodiment of the present invention.

Further, FIG. 2 is a diagram showing the details of an internal configuration of the power router 100.

In general, the power router 100 includes a DC (Direct Current) bus 101, a plurality of legs 110-160, and a controller 190.

The power router 100 includes the DC bus 101 to which the plurality of legs 110-160 are connected in parallel. The DC bus 101 is provided to enable DC power flow, and a voltage of the DC bus 101 is controlled to be constant.

(How the voltage of the DC bus 101 is kept constant will be described later.)

The power router 100 is connected to the outside through each of the legs 110-160. All the power to be exchanged with the outside is once converted into DC and the DC flows through the DC bus 101. Since power is once converted into DC, it is possible to asynchronously connect power cells without any consideration for the differences in the phase, the voltage, or the frequency thereof. It is assumed here that the DC bus 101 is, as shown in FIG. 2, a parallel type including a smoothing capacitor 102. A voltage sensor 103 is connected to the DC bus 101, and a voltage value of the DC bus 101 detected by the voltage sensor 103 is sent to the controller 190.

Next, the plurality of legs 110-160 will be described. The plurality of legs 110-160 are provided in parallel with the DC bus. In FIG. 1, six legs 110-160 are shown. The six legs 110-160 are represented, as shown in FIG. 1, as a first leg 110, a second leg 120, . . . , and a sixth leg 160. In FIG. 1, due to space constraints, the first leg 110 is denoted by a leg 1 and the second leg 120 is denoted by a leg 2, for example. Further, in FIG. 2, the third leg 130, the fourth leg 140, and the sixth leg 160 are omitted.

While the first leg 110 to the fifth leg 150 have the same configuration, the sixth leg 160 is different from the first to fifth legs 110-150 in that the sixth leg 160 does not include a power conversion unit. First, the configuration of the first leg 110 to the fifth leg 150 will be described. Since the first leg 110 to the fifth leg 150 have the same configuration, just the configuration of the first leg 110 will be described as an example. The first leg 110 includes a power conversion unit 111, a current sensor 112, a switch 113, a voltage sensor 114, and a connection terminal 115. The power conversion unit 111 converts AC power to DC power or DC power to AC power. Since DC power flows through the DC bus 101, the power conversion unit 111 converts DC power flowing through the DC bus 101 to AC power having a predetermined frequency and voltage to allow the AC power to flow to the outside from the connection terminal 115. Otherwise, the power conversion unit 111 converts AC power that flows from the connection terminal 115 into DC power to allow the DC power to flow through the DC bus 101.

The power conversion unit 111 has a configuration of an inverter circuit in which anti-parallel circuits 111P formed of power conversion elements 111T and feedback diodes 111D are three-phase bridge-connected. (That is, six anti-parallel circuits 111P are provided for one inverter circuit.)

While the power conversion unit 111 is a three-phase inverter circuit since the three-phase AC is used in this example, a single-phase inverter circuit may be used instead. A line that is drawn from a node between two anti-parallel circuits 111P and connects the node and the connection terminal is called a branch line BL. (Since the three-phase AC is used, one leg includes three branch lines BL.)

Note that for the power conversion elements, thyristors, which are externally commutated power conversion elements, IGBTs (Insulated Gate Bipolar Transistors), which are self-commutated power conversion elements, MOSFETs (Metal-Oxide-Semiconductor Field-Effect Transistors), or the like can be used.

The direction of the power, the frequency of the AC power and the like are controlled by the controller 190. That is, switching operations of the power conversion elements 111T are controlled by the controller 190. The operation control by the controller 190 will be described later.

The switch 113 is provided between the power conversion unit 111 and the connection terminal 115. The branch line BL is opened or closed by the operation of the switch 113, which means the connection between the outside and the DC bus 101 is broken or established. Further, the voltage of the branch line BL is detected by the voltage sensor 114 and the current value of the current flowing through the branch line BL is detected by the current sensor 112. The switching operation of the switch 113 is controlled by the controller 190 and the values detected by the voltage sensor 114 and the current sensor 112 are output to the controller 190.

While the power conversion unit is the inverter circuit and the connection partner of the leg uses AC as described above, the connection partner of the leg may instead use DC and may be, for example, a storage battery 35. (For example, in FIG. 1, the third leg 130 is connected to the storage battery 35.)

The power conversion in this case is DC-DC conversion. Accordingly, it is possible to provide an inverter circuit and a converter circuit in parallel in the power conversion unit and separately use the inverter circuit and the converter circuit depending on whether the connection partner is AC or DC. Otherwise, a leg dedicated for DC-DC conversion in which the power conversion unit is a DC-DC conversion unit may be provided. It will be often advantageous in terms of the size and the cost to use a power router that includes both a leg dedicated for AC-DC conversion and a leg dedicated for DC-DC conversion instead of providing the inverter circuit and the converter circuit in parallel in each leg.

The first leg 110 to the fifth leg 150 have the same configuration stated above.

Next, the sixth leg 160 will be described. The sixth leg 160 does not include a power conversion unit, which means a connection terminal 165 of the sixth leg 160 is not connected to the DC bus 101. The sixth leg 160 is connected to the branch line BL of the fifth leg 150. An internal wire of the sixth leg 160 is also called a branch line BL. The branch line BL of the sixth leg 160 is connected between the connection terminal 155 and the switch 153 of the fifth leg 150.

The sixth leg 160 includes a switch 163, a voltage sensor 164, a current sensor 162, and a connection terminal 165. The branch line BL of the sixth leg 160 is connected to the branch line BL of the fifth leg 150 through the switch 163. That is, the connection terminal 165 of the sixth leg 160 is connected to the connection terminal 155 of the fifth leg 150. Only the switch 163 is provided between the connection terminal 165 of the sixth leg 160 and the connection terminal 155 of the fifth leg 150 and the sixth leg 160 does not include a power converter. Accordingly, power is conducted between the connection terminal 165 of the sixth leg 160 and the connection terminal 155 of the fifth leg 150 without being converted. A leg such as the sixth leg 160 that does not include a power converter may be called an AC-through leg.

The current sensor 162 and the voltage sensor 164 detect a current value and a voltage value of the branch line BL to output the current value and the voltage value to the controller 190. The switching operation of the switch 163 is controlled by the controller 190.

(Operation Modes of Legs)

The first leg 110 to the fifth leg 150 include power converters 111-151 and the switching operations of the power conversion elements in the power converters are controlled by the controller 190, as already described above.

Note that the power router 100 is in the node of the power network 10, and plays an important role of connecting the utility grid 11, the load 30, a distributed power supply, power cells and the like. At this time, the connection terminals 115-165 of the respective legs 110-160 are connected to the utility grid 11, the load 30, the distributed power supply, and power routers of other power cells. The present inventors have noticed that the legs 110-160 have different roles depending on the connection partner and the power routers are not appropriately operated unless each of the legs 110-160 is appropriately operated according to each of their respective roles. While the legs have the same configuration, the present inventors have changed the method of operating the legs depending on the connection partner.

The method of operating the legs is called an operation mode.

The present inventors have prepared three types of operation modes of the legs, and the modes are switched according to the connection partner.

The operation modes of the legs include:
a master mode;
a stand-alone mode; and
a designated power transmission/reception mode.

In the following description, these operation modes will be described in series.

(Master Mode)

The master mode is an operation mode when a leg is connected to a stable power supply source such as an electrical grid, and is an operation mode to keep the voltage of the DC bus 101. In FIG. 1, an example in which the connection terminal 115 of the first leg 110 is connected to the utility grid 11 is shown. In the case of FIG. 1, the operation of the first leg 110 is controlled as a master mode, and plays a role of keeping the voltage of the DC bus 101. While many other legs 120-150 are connected to the DC bus 101, power may flow into the DC bus 101 from the legs 120-150 or may flow out from the legs 120-150. When the power flows out through the DC bus 101 and the voltage of the DC bus 101 decreases from the rated voltage, the leg 110 which is in the master mode supplements an insufficient energy due to the outflow from the connection partner (in this example, the utility grid 11). On the other hand, when the power flows into the DC bus 101 and the voltage of the DC bus 101 increases from the rated voltage, the leg 110 which is in the master mode transfers an excessive energy due to the inflow to the connection partner (in this example, the utility grid 11). The leg 110 which is in the master mode is therefore able to keep the voltage of the DC bus 101.

Accordingly, in one power router, at least one leg needs to be operated in the master mode. Otherwise, the voltage of the DC bus 101 is not kept constant. In one power router, two or more legs may be operated in the master mode. It is preferable, however, that only one leg be operated in the master mode in one power router. Further, for example, the leg which in the master mode may be connected to the distributed power supply (also including storage batteries) on which a self-commutated inverter is mounted instead of being connected to the utility grid. It is impossible, however, to connect the leg which is in the master mode and the distributed power supply on which an externally commutated inverter is mounted.

In the following description, the leg operated in the master mode may be referred to as a master leg.

The operation control of the master leg will be described.

The master leg is started as follows.

First, the switch 113 is set to the opened (broken) state. In this state, the connection terminal 115 is connected to the connection partner. In this embodiment, the connection partner is the utility grid 11.

The voltage sensor 114 measures the voltage of the utility grid of the connection partner and obtains the phase, the frequency, and the amplitude of the voltage of the utility grid using a phase-locked loop (PLL) or the like. After that, the output of the power conversion unit 111 is adjusted so that the voltage of the phase, the frequency, and the amplitude that are obtained is output from the power conversion unit 111. That is, the ON/OFF patterns of the power conversion elements 111T are determined. When this output is made stable, the switch 113 is turned on and the power conversion unit 111 and the utility grid 11 are connected. Since the output of the power conversion unit 111 and the voltage of the utility grid 11 are synchronized at this point, the current does not flow.

The operation control when the master leg is operated will be described.

The voltage of the DC bus 101 is measured by the voltage sensor 103. When the voltage of the DC bus 101 exceeds a predetermined rated bus voltage, the power conversion unit 111 is controlled so that power is sent from the master leg 110 to the utility grid. (At least one of the phase and the amplitude of the voltage output from the power conversion unit 111 is adjusted so that power is sent from the DC bus 101 to the utility grid 11 through the master leg 110.) The rated voltage of the DC bus 101 is predetermined.

On the other hand, when the voltage of the DC bus 101 is below the predetermined rated bus voltage, the power conversion unit 111 is controlled so that the master leg 110 is able to receive power from the utility grid 11. (At least one of the phase and the amplitude of the voltage output from the power conversion unit 111 is adjusted so that power is sent from the utility grid 11 to the DC bus 101 through the master leg 110.) It will be understood that, according to the operation of the master leg as described above, the voltage of the DC bus 101 can be kept to the predetermined rated voltage.

(Stand-Alone Mode)

The stand-alone mode is an operation mode in which a leg generates a voltage of the amplitude and the frequency specified by the management server 50 by itself, and sends power to and receives power from the connection partner.

The stand-alone mode is, for example, an operation mode to supply power to a device such as the load 30 that consumes power. Alternatively, the stand-alone mode is an operation mode to directly receive power sent from the connection partner.

FIG. 1 shows an example in which the connection terminal 125 of the second leg 120 is connected to the load 30. The operation of the second leg 120 is controlled as the stand-alone mode and power is supplied to the load 30.

Further, when a leg is connected to another power router as in the fourth leg 140 or the fifth leg 150, the fourth leg 140 or the fifth leg 150 may be operated in the stand-alone mode as a mode to send power required by the other power router.

Alternatively, when a leg is connected to another power router as in the fourth leg 140 or the fifth leg 150, the fourth leg 140 or the fifth leg 150 may be operated in the stand-alone mode as a mode to receive power sent from the other power router.

While it is not illustrated in the drawings, the second leg can be operated in the stand-alone mode also in a case in which the second leg is connected to a power generation facility in place of the load 30. In this case, however, an externally commutated inverter is installed in the power generation facility.

The operation mode when the power routers are connected to each other will be described later.

The leg operated in the stand-alone mode is called a stand-alone leg. In one power router, a plurality of stand-alone legs may be provided.

The operation control of the stand-alone leg will be described.

First, a switch 123 is opened (broken). The connection terminal 125 is connected to the load 30. The management server 50 notifies the power router 100 of the amplitude and the frequency of the power (voltage) that should be supplied to the load 30. The controller 190 causes the power (voltage) of the specified frequency and the specified amplitude to be output from the power conversion unit 121 to the load 30. (In short, the ON/OFF patterns of the power conversion elements 121T are determined.) When this output becomes stable, the switch 123 is turned on to connect the power conversion unit 121 and the load 30. Lastly, when the power is consumed in the load 30, the power corresponding to the consumed amount flows out to the load 30 from the stand-alone leg 120.

(Designated Power Transmission/Reception Mode)

A designated power transmission/reception mode is an operation mode for transmitting or receiving a designated energy. Specifically, the designated power transmission/reception mode includes a case in which the designated power is transmitted to the connection partner and a case in which the designated power is received from the connection partner.

In FIG. 1, the fourth leg 140 and the fifth leg 150 are connected to other power routers.

In such a case, a predetermined energy is fed from the fourth leg 140 or the fifth leg 150 to the other power router or from the other power router to the fourth leg 140 or the fifth leg 150.

Alternatively, the third leg 130 is connected to the storage battery 35.

In such a case, a predetermined energy is sent to the storage battery 35 to charge the storage battery 35.

Further, the designated power transmission/reception leg and the distributed power supply (also including the storage battery) on which a self-commutated inverter is mounted may be connected. However, the designated power transmission/reception leg and the distributed power supply on which an externally commutated inverter is mounted cannot be connected.

The leg operated in the designated power transmission/reception mode is called a designated power transmission/reception leg. In one power router, a plurality of designated power transmission/reception legs may be provided.

The operation control of the designated power transmission/reception leg will be described. Since the control when the designated power transmission/reception leg is started is basically the same as that when the master leg is started, a description thereof will be omitted.

The operation control when the designated power transmission/reception leg is operated will be described.

(In the following description, symbols attached to the components of the fifth leg 150 will be used.)

A voltage sensor 154 measures the voltage of the electrical grid of the connection partner to obtain the phase and the frequency of the voltage of the connection partner using a phase-locked loop (PLL) or the like. The target value of the current that the power converter 151 receives or outputs is obtained based on an active power value and a reactive power value specified by the management server 50 and the phase and the frequency of the voltage of the connection partner. A current sensor 152 measures the current value of the current. The power converter 151 is adjusted so that the current corresponding to the difference between the target value and the current value is additionally output. (At least one of the phase and the amplitude of the voltage output from the power conversion unit 151 is adjusted so that a desired power flows between the designated power transmission/reception leg and the connection partner.)

From the above description, it will be understood that the first to fifth legs having the same configuration can play roles having three different patterns according to the method of the operation control.

(Connection Restrictions)

Since the operations of the legs vary according to the difference in the operation mode, there are respective restrictions regarding the selection of the connection partner and the selection of the operation mode. That is, when the connection partner is determined, the operation mode that can be selected is determined, and in contrast, when the operation mode is determined, the connection partner that can be selected is determined. (When the connection partner is changed, the operation mode of the leg needs to be changed according to the change of the connection partner.)

Patterns of possible combinations of connections will be described below.

Figure 3:
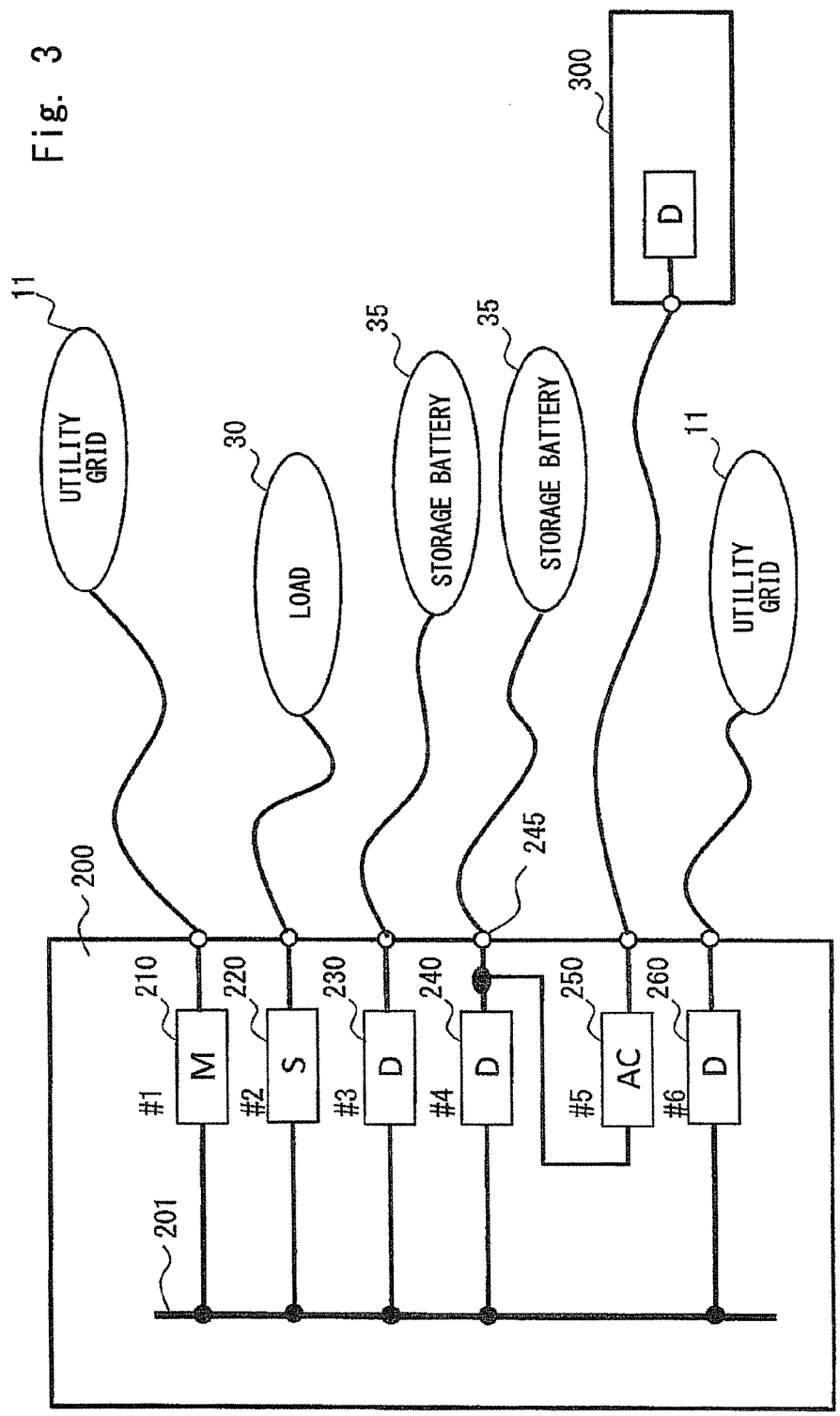
FIG. 3 shows an example in which a power router is connected to a utility grid, a load, and various distributed power supply.

In the following description, the expressions in the diagrams are simplified as shown in FIG. 3.

Specifically, the master leg is denoted by M.

The stand-alone leg is denoted by S.

The designated power transmission/reception leg is denoted by D.

The AC-through leg is denoted by AC.

Further, the legs may be differentiated from one another by numbers such as "#1" attached to the top of the legs as necessary.

While systematized symbols are attached for each of figures starting from FIG. 3, the same elements are not necessarily denoted by the same reference symbols throughout the drawings.

Figure 4:
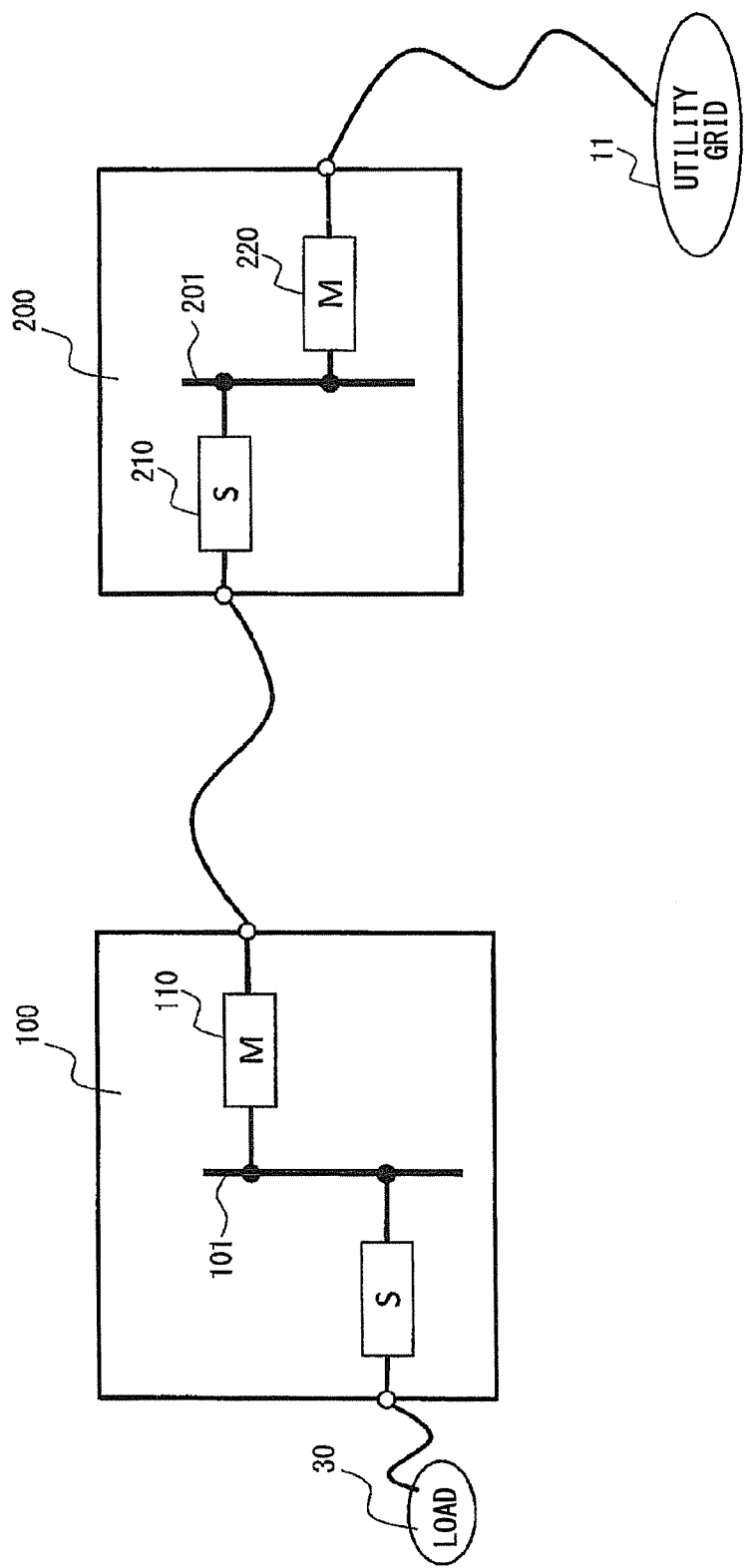
FIG. 4 shows an example of a possible combination of a connection between power routers.

For example, the symbol 200 in FIG. 3 and the symbol 200 in FIG. 4 do not indicate the same component.

All the combinations of the connections shown in FIG. 3 are available. A first leg 210 is connected to the utility grid 11 as a master leg. This connection has already been described above.

A second leg 220 is connected to the load 30 as the stand-alone leg. This connection has already been described above as well.

A third leg 230 and a fourth leg 240 are connected to the storage battery 35 as the designated power transmission/reception legs. This connection has already been described above as well.

A fifth leg 250 is an AC-through leg. The AC-through leg 250 is connected to the designated power transmission/reception leg of another power router 300 and the AC-through leg 250 is connected to the storage battery 35 through a connection terminal 245 of the fourth leg 240. Since the AC-through leg 250 does not include a power conversion unit, this above connection relation is equivalent to the state in which the designated power transmission/reception leg of the other power router 300 is directly connected to the storage battery 35. It is understood that such a connection is permitted.

A sixth leg 260 is connected to the utility grid 11 as the designated power transmission/reception leg. If it is assumed that a predetermined power is received from the utility grid 11 through the sixth leg 260, it is understood that such a connection is permitted.

Considering that the first leg 210 is the master leg, if the power received by the sixth leg 260 is insufficient to keep the voltage of the DC bus 201 to the rated voltage, the master leg 210 receives necessary power from the utility grid 11. In contrast, when the power received by the sixth leg 260 exceeds the amount that is necessary to keep the voltage of the DC bus 201 to the rated voltage, the master leg 210 transfers excessive power to the utility grid 11.

Next, a case in which the power routers are connected to each other will be described. Connecting the power routers means connecting a leg of one power router and a leg of another power router. When the legs are connected to each other, the operation modes that can be combined are restricted.

Figure 5:
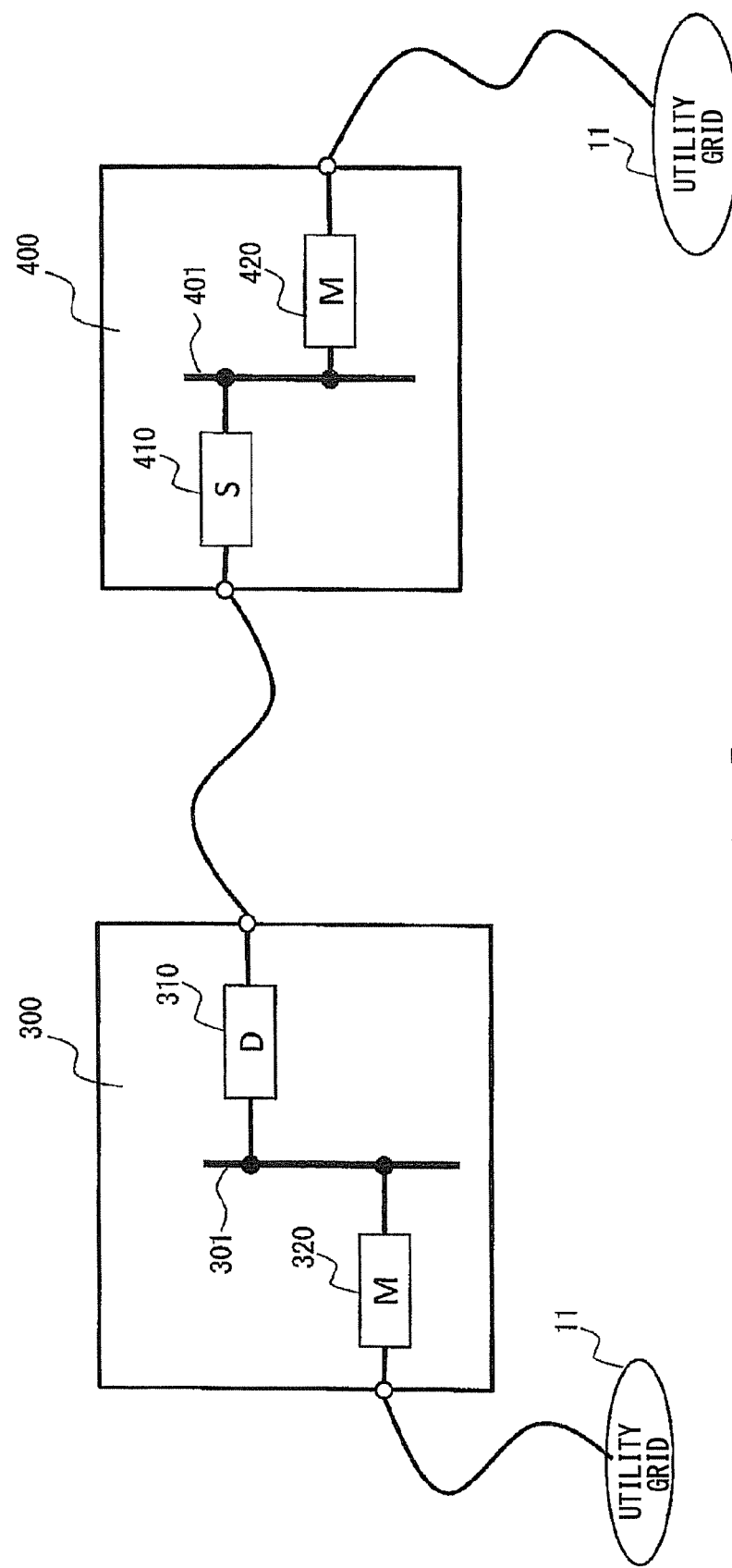
FIG. 5 shows an example of a possible combination of a connection between power routers.

Both of the combinations of the connections shown in FIGS. 4 and 5 are available. In FIG. 4A, the master leg 110 of the first power router 100 and the stand-alone leg 210 of the second power router 200 are connected. While the details of this connection will not be described, the master leg 220 of the second power router 200 is connected to the utility grid 11, whereby the voltage of the DC bus 201 of the second power router 200 is kept to be the rated voltage.

In FIG. 4, when power is supplied to the load 30 from the first power router 100, the voltage of the DC bus 101 decreases. The master leg 110 obtains power from the connection partner so as to keep the voltage of the DC bus 101. That is, the master leg 110 draws insufficient power from the stand-alone leg 210 of the second power router 200. The stand-alone leg 210 of the second power router 200 sends power required from the connection partner (in this example, the master leg 110). While the voltage decreases by the energy sent from the stand-alone leg 210 in the DC bus 201 of the second power router 200, this is supplemented from the utility grid 11 by the master leg 220. In this way, the first power router 100 can obtain a necessary energy from the second power router 200.

As described above, even when the master leg 110 of the first power router 100 and the stand-alone leg 210 of the second power router 200 are connected, each of the master leg 110 and the stand-alone leg 210 can each play a role. Therefore, no disadvantage occurs in each of the operations in the master leg 110 and the stand-alone leg 210. Accordingly, the master leg and the stand-alone leg may be connected as shown in FIG. 4.

In FIG. 5, a designated power transmission/reception leg 310 of the third power router 300 and a stand-alone leg 410 of the fourth power router 400 are connected. While not described in detail, a master leg 320 of the third power router 300 and a master leg 420 of the fourth power router 400 are each connected to the utility grid 11. DC buses 301 and 401 of the third power router 300 and the fourth power router 400 thus keep the rated voltage.

It is assumed that the designated power transmission/reception leg 310 of the third power router 300 is instructed to receive a designated power according to the instruction from the management server 50. The designated power transmission/reception leg 310 draws the designated power from the stand-alone leg 410 of the fourth power router 400. The stand-alone leg 410 of the fourth power router 400 sends power required from the connection partner (in this example, the designated power transmission/reception leg 310). While the voltage of the DC bus 401 of the fourth power router 400 decreases by the energy sent from the stand-alone leg 410, this is supplemented from the utility grid 11 by the master leg 420.

As described above, even when the designated power transmission/reception leg 310 of the third power router 300 and the stand-alone leg 410 of the fourth power router 400 are connected, the designated power transmission/reception leg 310 and the stand-alone leg 410 can each play a role. Therefore, no disadvantage occurs in each of the operations in the designated power transmission/reception leg 310 and the stand-alone leg 410. Accordingly, the designated power transmission/reception leg and the stand-alone leg may be connected as shown in FIG. 5.

While the case in which the third power router 300 obtains power from the fourth power router 400 has been described above, it should be understood that there is also no disadvantage in a case in which the third power router 300 gives power to the fourth power router 400.

It is therefore possible to interchange the designated power between the third power router 300 and the fourth power router 400.

When the legs having the power conversion units are directly connected to each other, only two connection patterns shown in FIGS. 4 and 5 are permitted.

Specifically, only the case in which the master leg and the stand-alone leg are connected and the case in which the designated power transmission/reception leg and the stand-alone leg are connected are permitted.

Next, combinations of the legs that cannot be connected will be described.

FIGS. 6 to 9 are patterns in which legs should not be connected.

Figure 6:
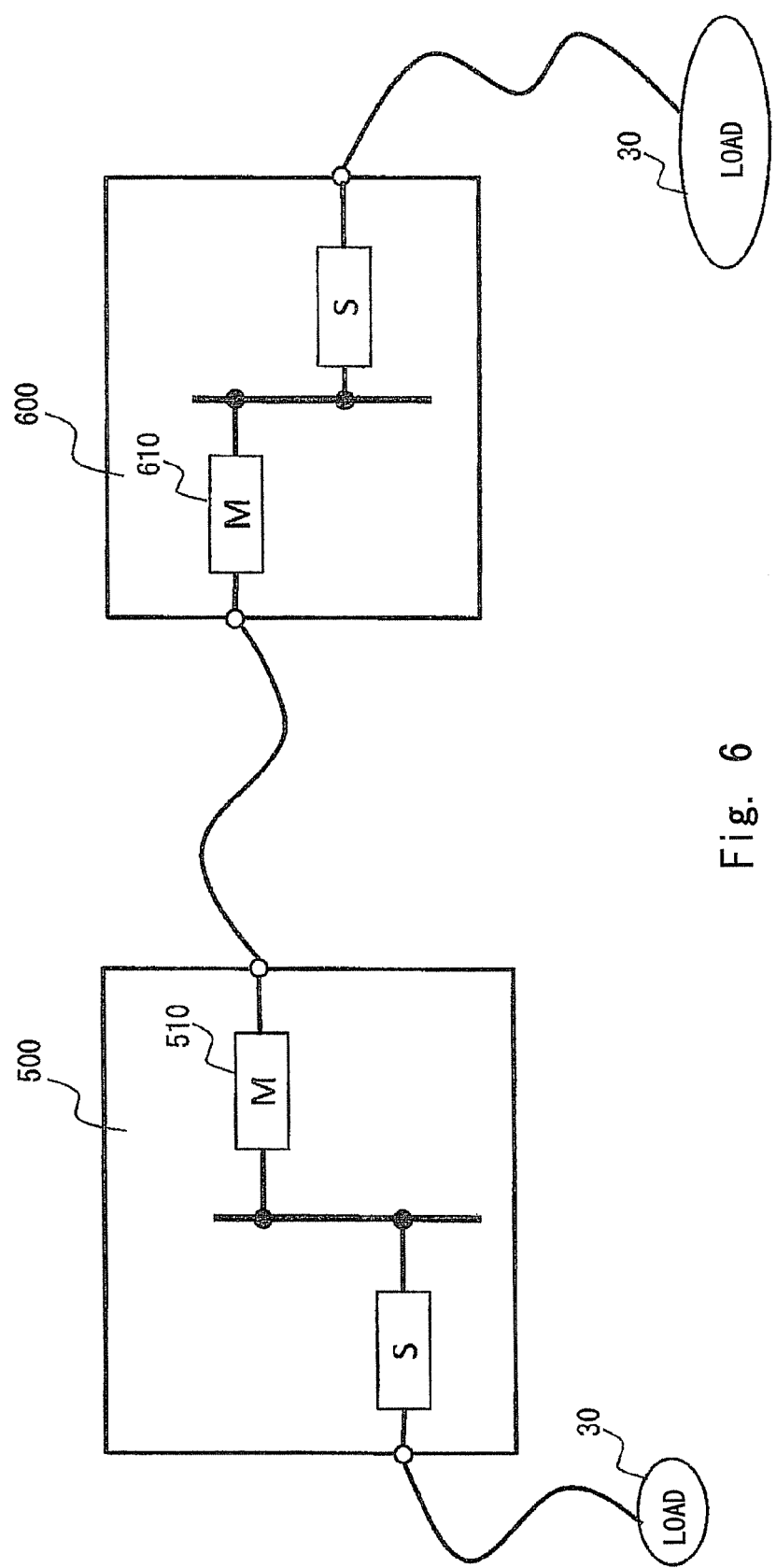
FIG. 6 shows an example of a prohibited combination of a connection between power routers.
Figure 7:
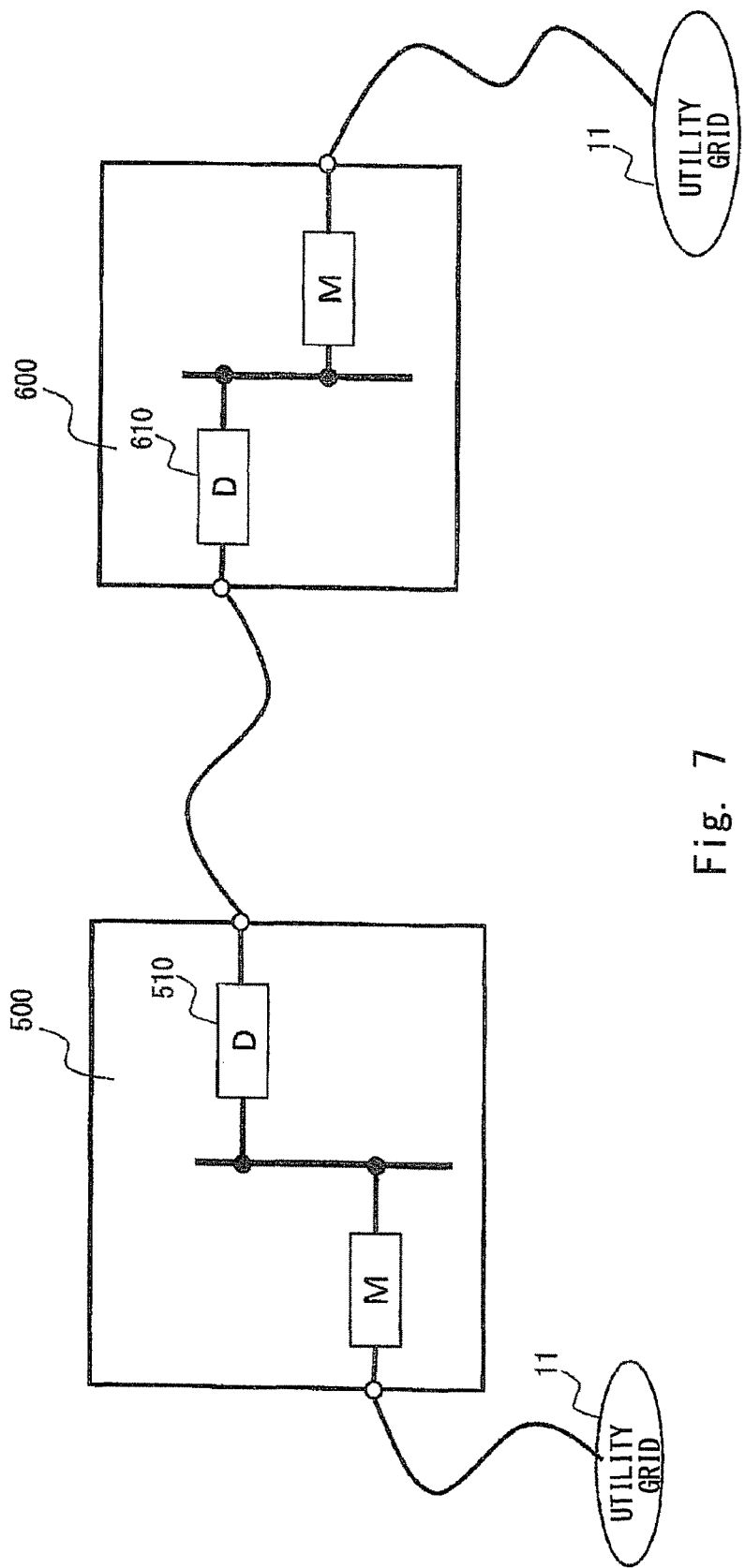
FIG. 7 shows an example of a prohibited combination of a connection between power routers.
Figure 8:
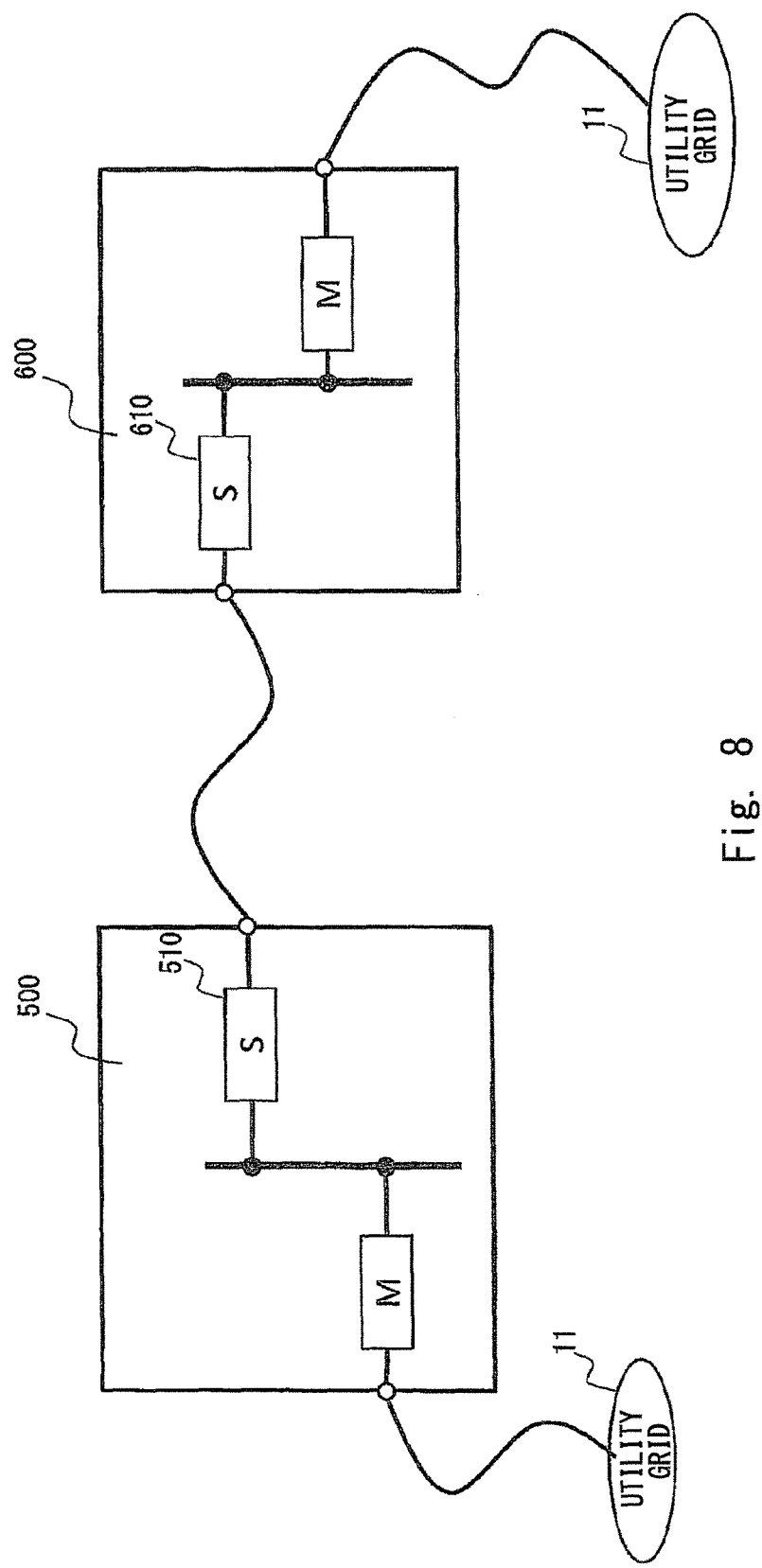
FIG. 8 shows an example of a prohibited combination of a connection between power routers.

As shown in FIGS. 6, 7, and 8, the legs that are in the same operation mode must not be connected.

In the case of FIG. 6, for example, the master legs are connected.

The master leg first performs processing for generating power in synchronization with the phase, the frequency, and the voltage of the connection partner, as described above in the description of the operation.

When the connection partner is also a master leg, each master leg tries to be synchronized with the voltage and the frequency of the other master leg. However, since the master leg does not establish the voltage and the frequency in a stand-alone manner, the synchronous processing stated above does not succeed.

Therefore, the master legs cannot be connected to each other.

There are other reasons why the master legs cannot be connected to each other as follows.

The master leg needs to draw power from the connection partner in order to keep the voltage of the DC bus. (Otherwise excessive power needs to be made to flow out to the connection partner in order to keep the voltage of the DC bus.) When the master legs are connected to each other, each master leg cannot meet the requirements of the connection partner. (If the master legs are connected to each other, neither of the power routers can keep the voltage of the DC bus. This may cause a malfunction such as blackout in each power cell.) In this way, if the master legs are connected to each other, the roles of the master legs conflict with each other (do not match). The master legs therefore must not be connected to each other.

While the designated power transmission/reception legs are connected to each other in FIG. 7, it should be understood that this connection is not available as well.

As described above in the description of the operation, similar to the master leg, the designated power transmission/reception leg first performs processing for generating power in synchronization with the phase, the frequency, and the voltage of the connection partner.

When the connection partner is also a designated power transmission/reception leg, each leg tries to be synchronized with the voltage and the frequency of the other leg. However, since the designated power transmission/reception leg does not establish the voltage and frequency in a stand-alone manner, the synchronous processing stated above does not succeed.

Therefore, the designated power transmission/reception legs cannot be connected to each other.

There are other reasons why the above legs cannot be connected to each other as follows.

Even if the designated transmitted power that should be sent by one designated power transmission/reception leg 510 is made equal to the designated received power that should be received by the other designated power transmission/reception leg 610, such designated power transmission/reception legs should not be connected to each other. Assume a case, for example, in which one designated power transmission/reception leg 510 adjusts the power conversion unit to send the designated transmitted power. (For example, the output voltage is made higher than that of the connection partner by a predetermined value.) On the other hand, the other designated power transmission/reception leg 610 adjusts the power conversion unit to receive the designated received power. (For example, the output voltage is made lower than that of the connection partner by a predetermined value.) It will be understood that, when such an adjustment operation is executed in both of the designated power transmission/reception legs 510 and 610 at the same time, both of the designated power transmission/reception legs 510 and 610 become uncontrollable.

While the stand-alone legs are connected in FIG. 8, it should be understood that such a connection is prohibited.

The stand-alone leg generates a voltage and a frequency by itself.

If one of the voltage, the frequency, and the phase generated by the two stand-alone legs is deviated from the other by even a slight amount in a state in which the stand-alone legs are connected, unintended power flows between the two stand-alone legs.

It is impossible to completely keep the voltage, the frequency, and the phase generated by the two stand-alone legs to be equal. Therefore, the stand-alone legs should not be connected.

Figure 9:
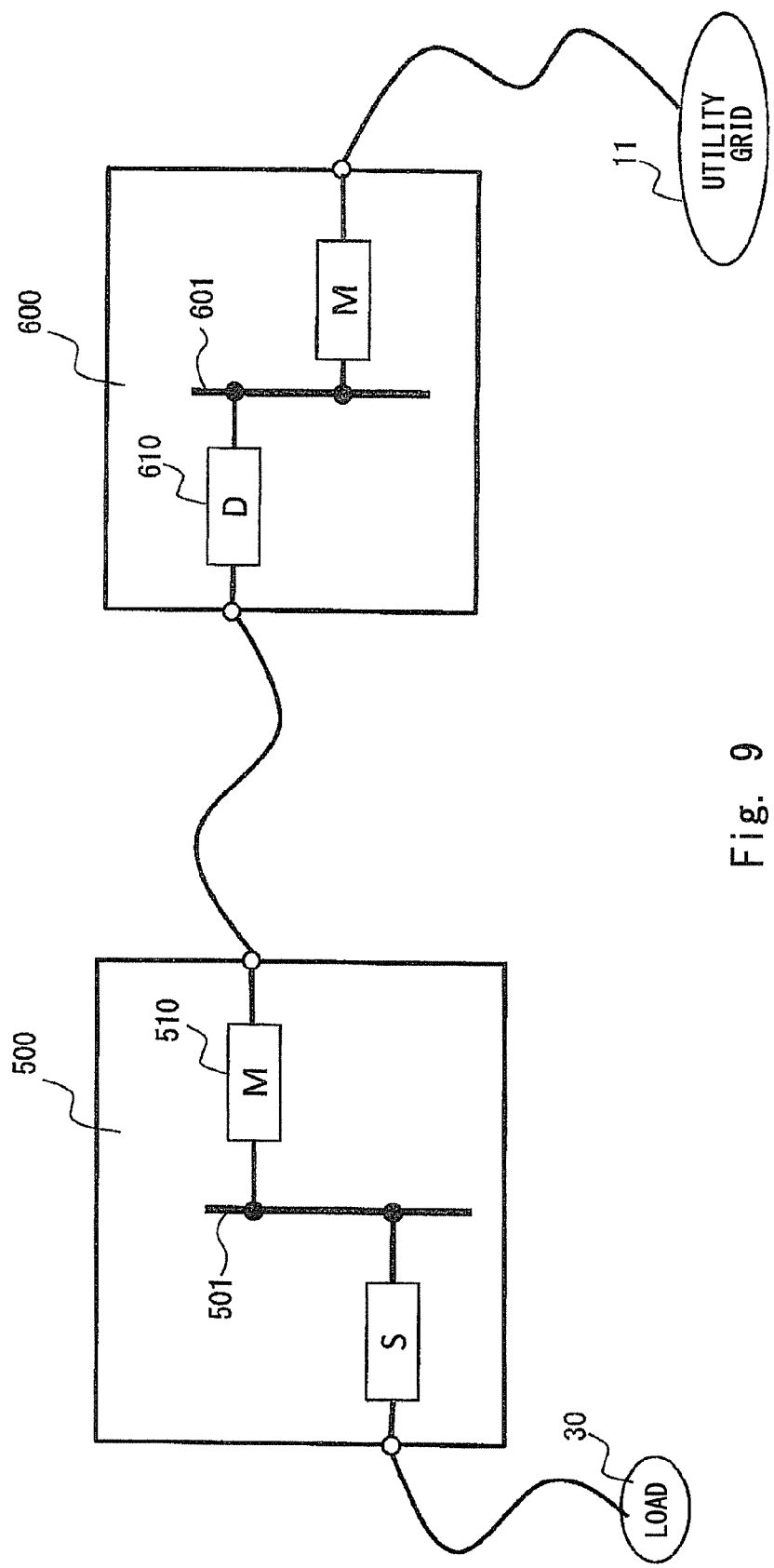
FIG. 9 shows an example of a prohibited combination of a connection between power routers.

In FIG. 9, the master leg and the designated power transmission/reception leg are connected.

It should be understood from the above description that this connection is not available as well. Even when the master leg 510 transmits power to or receives power from the connection partner to keep the voltage of the DC bus 501, the designated power transmission/reception leg 610 does not transmit or receive power according to the request from the master leg 510. Accordingly, the master leg 510 cannot keep the voltage of the DC bus 501. Further, even when the designated power transmission/reception leg 610 transmits designated power to or receives it from the connection partner (510), the master leg 510 does not transmit or receive power according to the request from the designated power transmission/reception leg 610. Accordingly, the designated power transmission/reception leg 610 cannot transmit the designated power to or receive it from the connection partner (in this example, the master leg 510).

Figure 10:
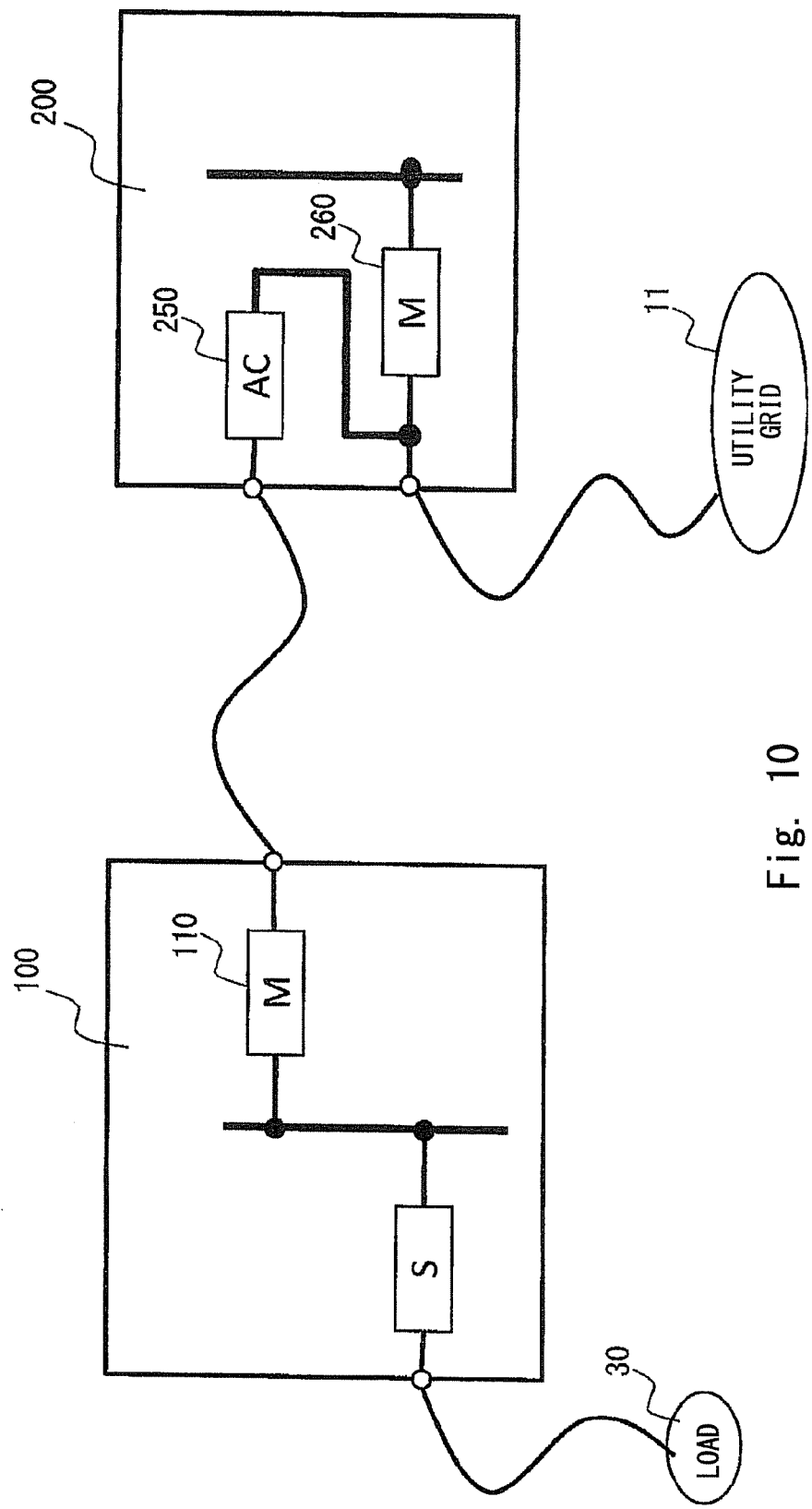
FIG. 10 shows an example of possible combination of a connection between power routers in which an AC-through leg is taken into consideration.
Figure 11:
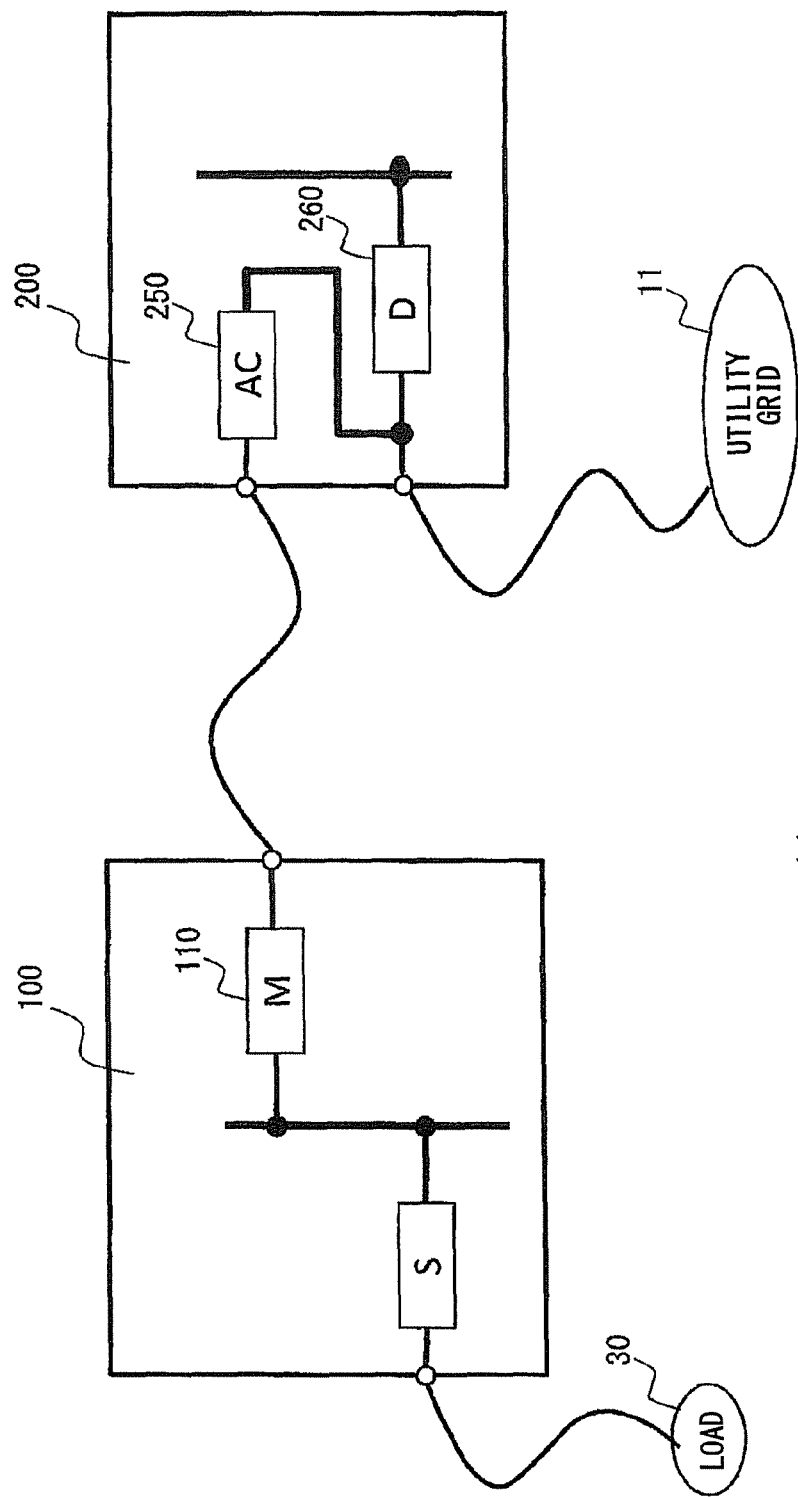
FIG. 11 shows an example of possible combination of a connection between power routers in which an AC-through leg is taken into consideration.
Figure 12:
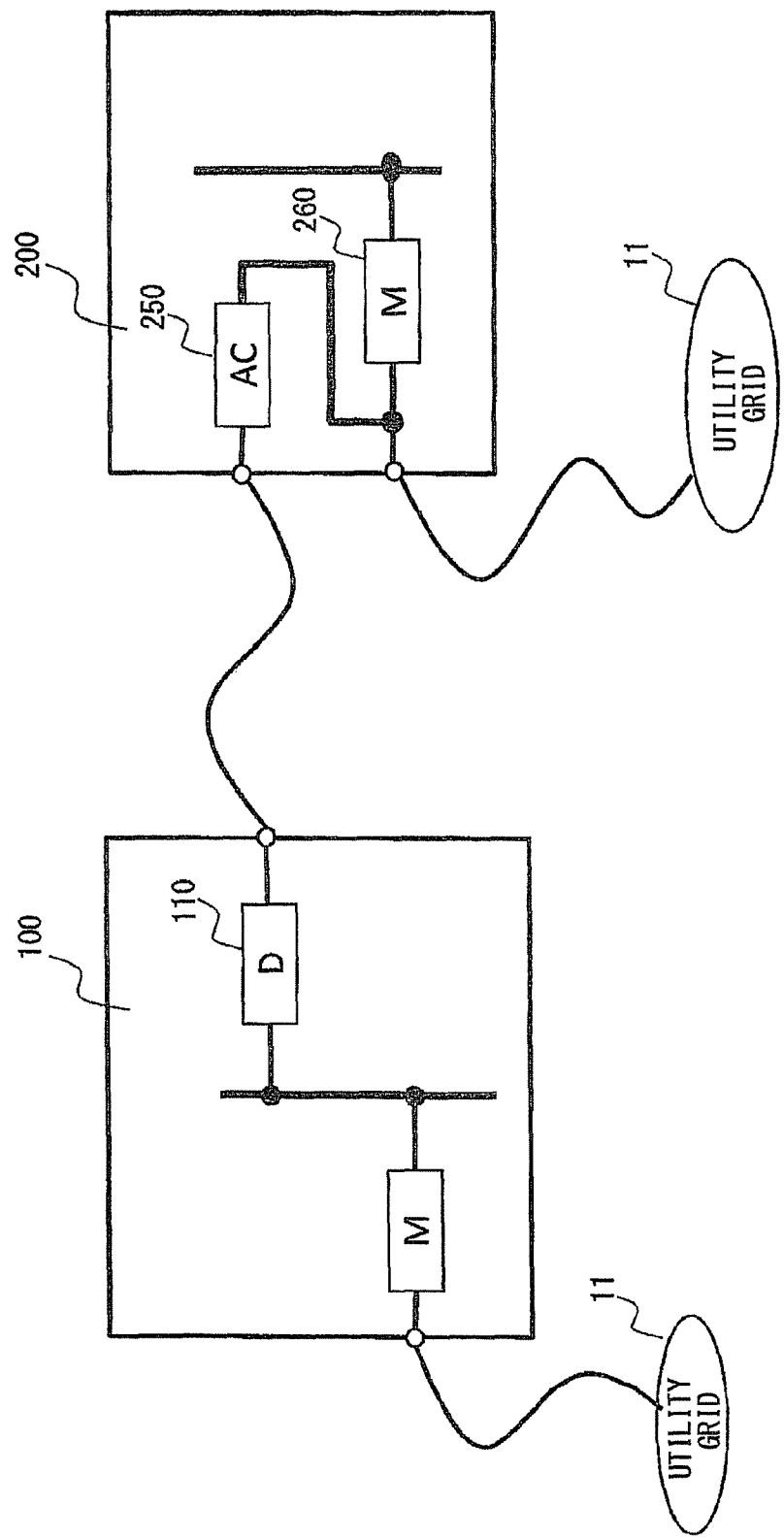
FIG. 12 shows an example of possible combination of a connection between power routers in which an AC-through leg is taken into consideration.
Figure 13:
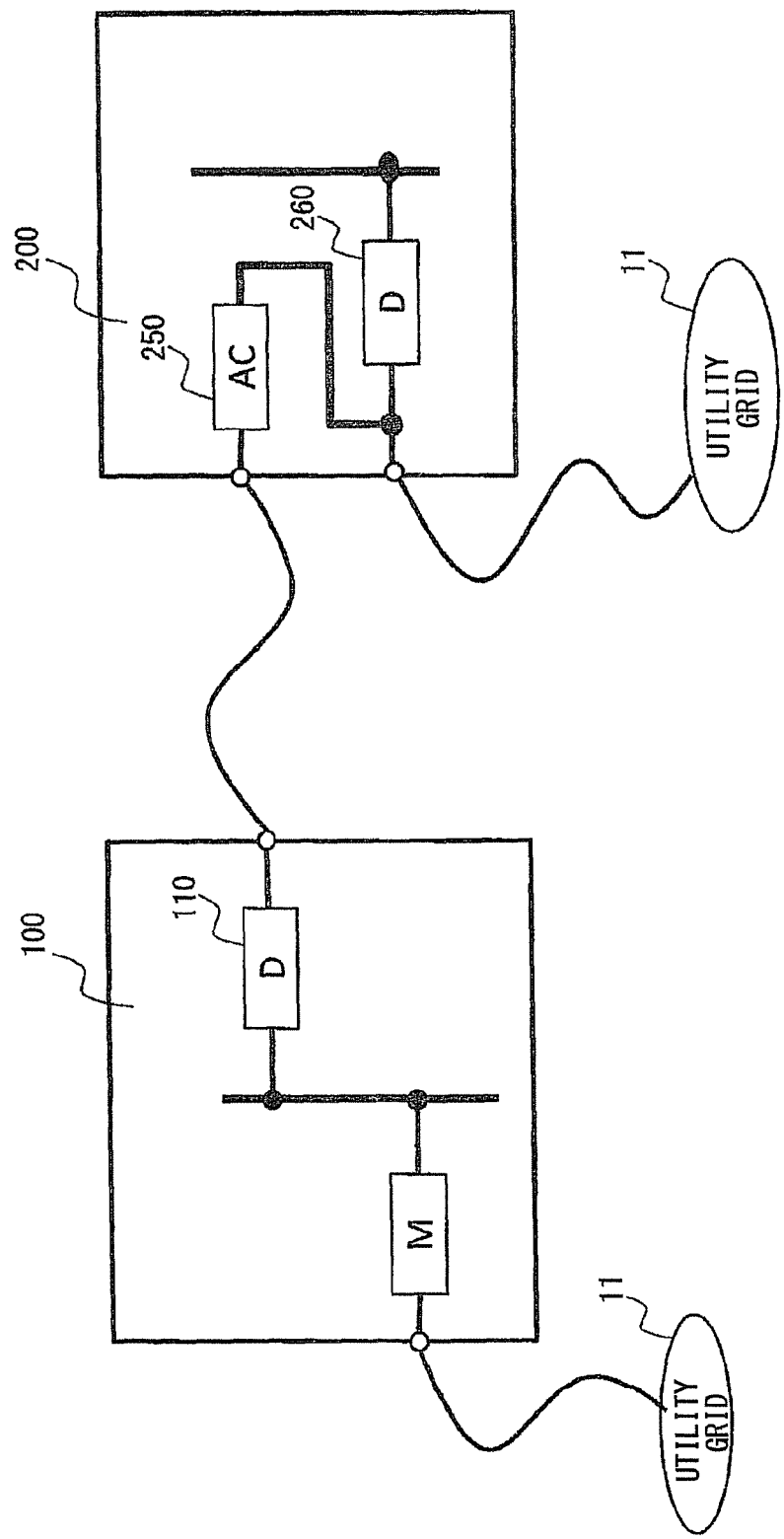
FIG. 13 shows an example of possible combination of a connection between power routers in which an AC-through leg is taken into consideration.

The case in which the legs including power conversion units are connected has been stated above. When an AC-through leg is taken into consideration, patterns shown in FIGS. 10 to 13 are also available. Since the AC-through leg does not include a power conversion unit, it is a simple bypass. Accordingly, as shown in FIGS. 10 and 13, the situation in which the master leg 110 of the first power router 100 is connected to the utility grid 11 through the AC-through leg 250 of the second power router 200 is substantially equal to the situation in which the master leg 110 is directly connected to the utility grid 11. In a similar way, as shown in FIGS. 12 and 13, the situation in which the designated power transmission/reception leg 110 of the first power router 100 is connected to the utility grid 11 through the AC-through leg 250 of the second power router 200 is substantially equal to the situation in which the designated power transmission/reception leg 110 is directly connected to the utility grid 11.

Figure 14:
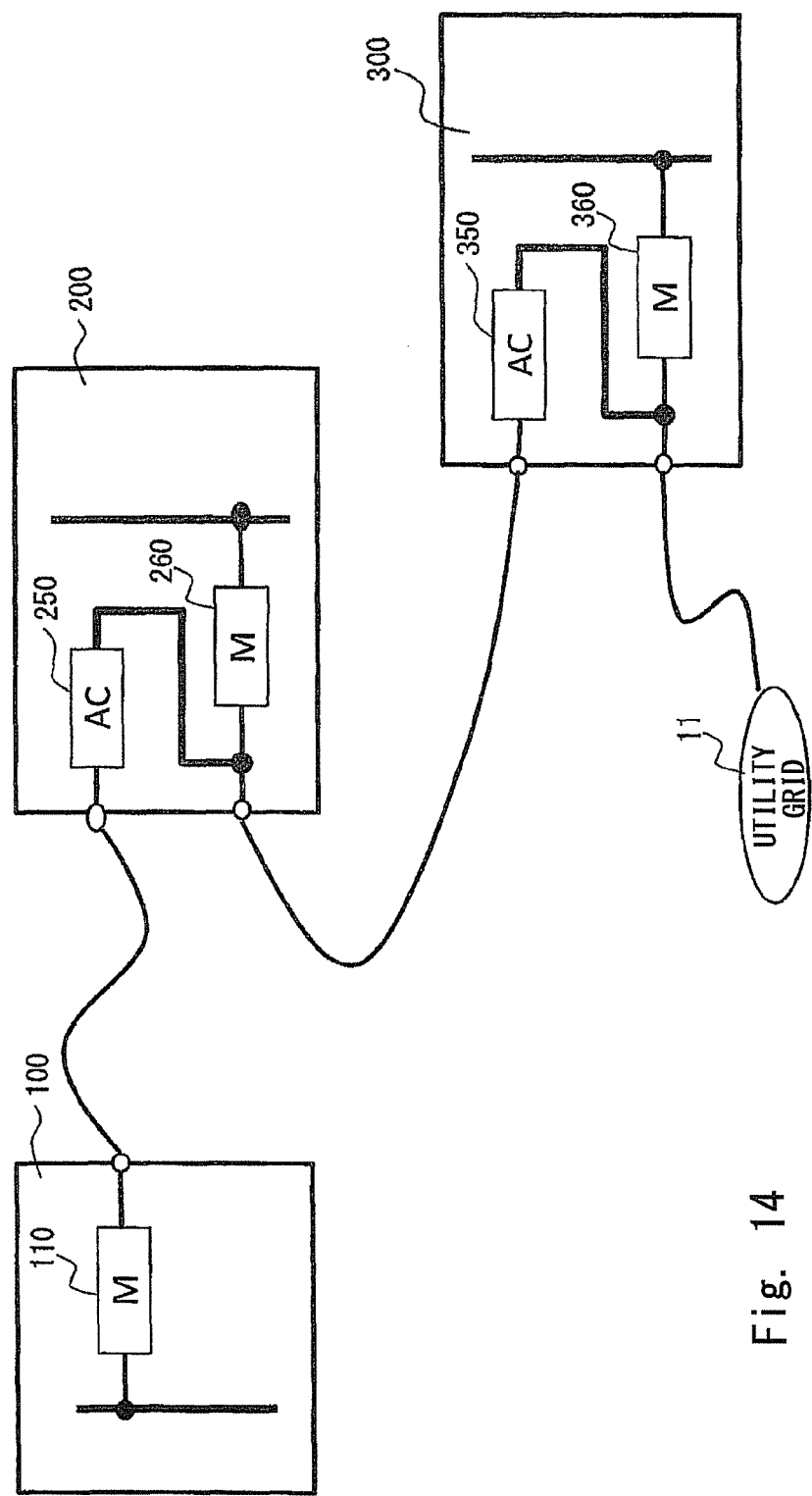
FIG. 14 shows a connection example using an AC-through leg.

Still, it is convenient to provide the AC-through leg. There may be a case, for example, in which the distance from the first power router 100 to the utility grid 11 is extremely long and some power routers 200 and 300 need to be passed to connect the first power router 100 to the utility grid 11, as shown in FIG. 14.

If it is assumed that the AC-through leg is not provided, as shown in FIG. 4, one or a plurality of stand-alone legs need to be passed. When a leg including a power conversion unit is passed, it requires conversion from AC power into DC power and conversion from DC power into AC power. The power conversion causes an energy loss, though the loss is low (several %). It is inefficient to require a power conversion a plurality of times only to connect the power router to the utility grid.

It is therefore preferable that the AC-through leg which does not include a power conversion unit is provided in the power router.

Figure 16:
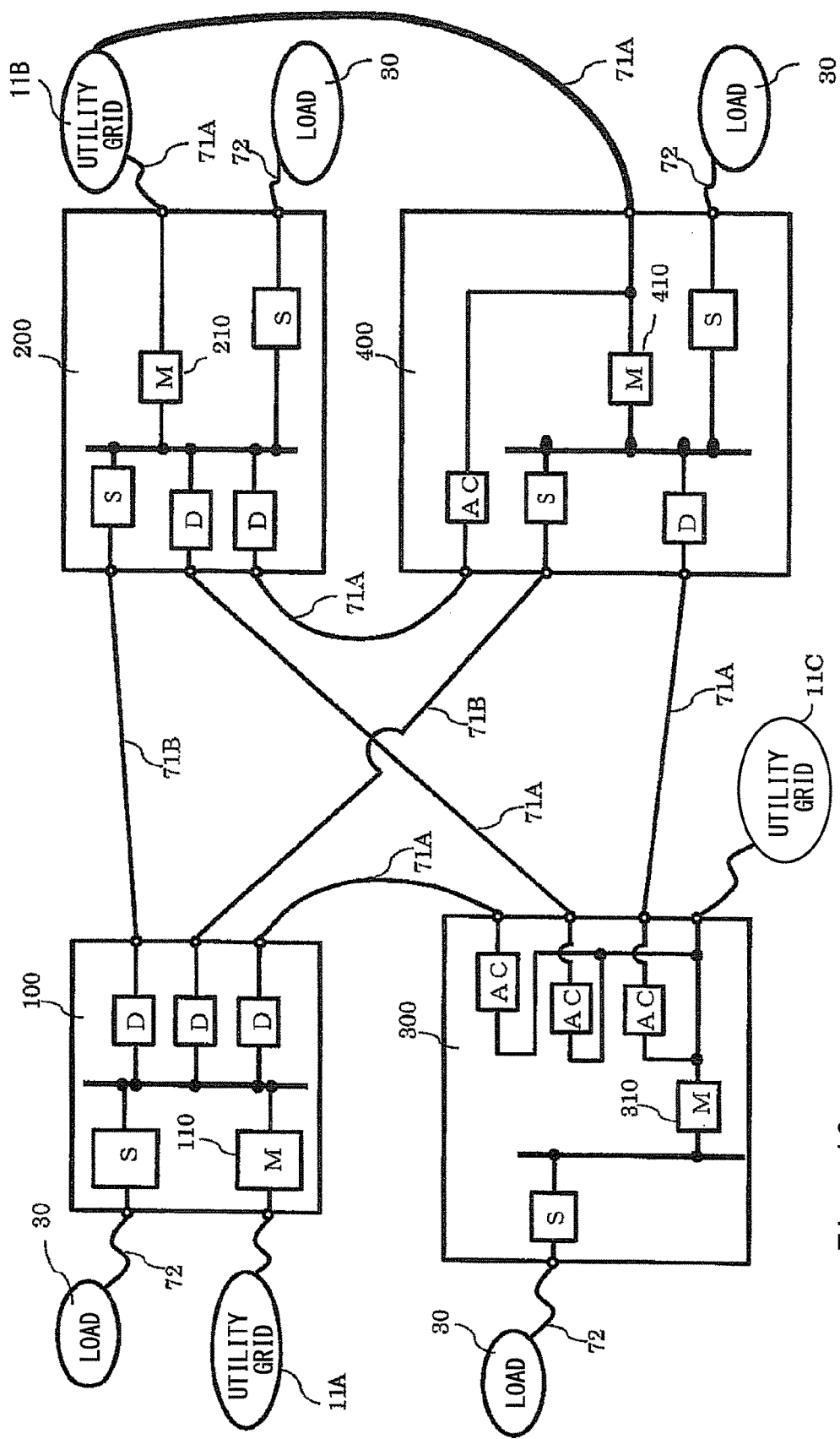
FIG. 16 shows an example in which four power routers are connected to each other.

FIG. 15 shows the combination of connections described above. FIG. 16 shows one example in which the four power routers 100-400 are interconnected. Since all of the connection relations have been described above, each connection partner will not be described in detail. It would be understood, however, that all of the connection relations are permitted.

Now, the connection line which connects the power router and the connection partner will be additionally described.

When the connection line that connects power routers is called a power-transmission line, the power-transmission line may be a part of the utility grid or may be separated from the utility grid.

(In FIG. 16, the power-transmission line which is a part of the utility grid is denoted by the symbol 71A and the power-transmission line separated from the utility grid is denoted by the symbol 71B.)

In summary, a plurality of power routers may be connected to the utility grid. In this way, by connecting two or more power routers through the utility grid, power interchange can be performed among the plurality of power routers through the utility grid, and the utility grid can adjust the excessive power or the insufficient power to be interchanged. Alternatively, two or more power routers may be connected to each other without the intervention of the utility grid.

Further, when the connection line that connects the power router and the load (or the distributed power supply) is called a distribution line 72, the distribution line 72 is separated from the utility grid 11. In summary, the distribution line 72 that connects the power router and the load (or distributed power supply) is not connected to the utility grid 11.

Figure 17:
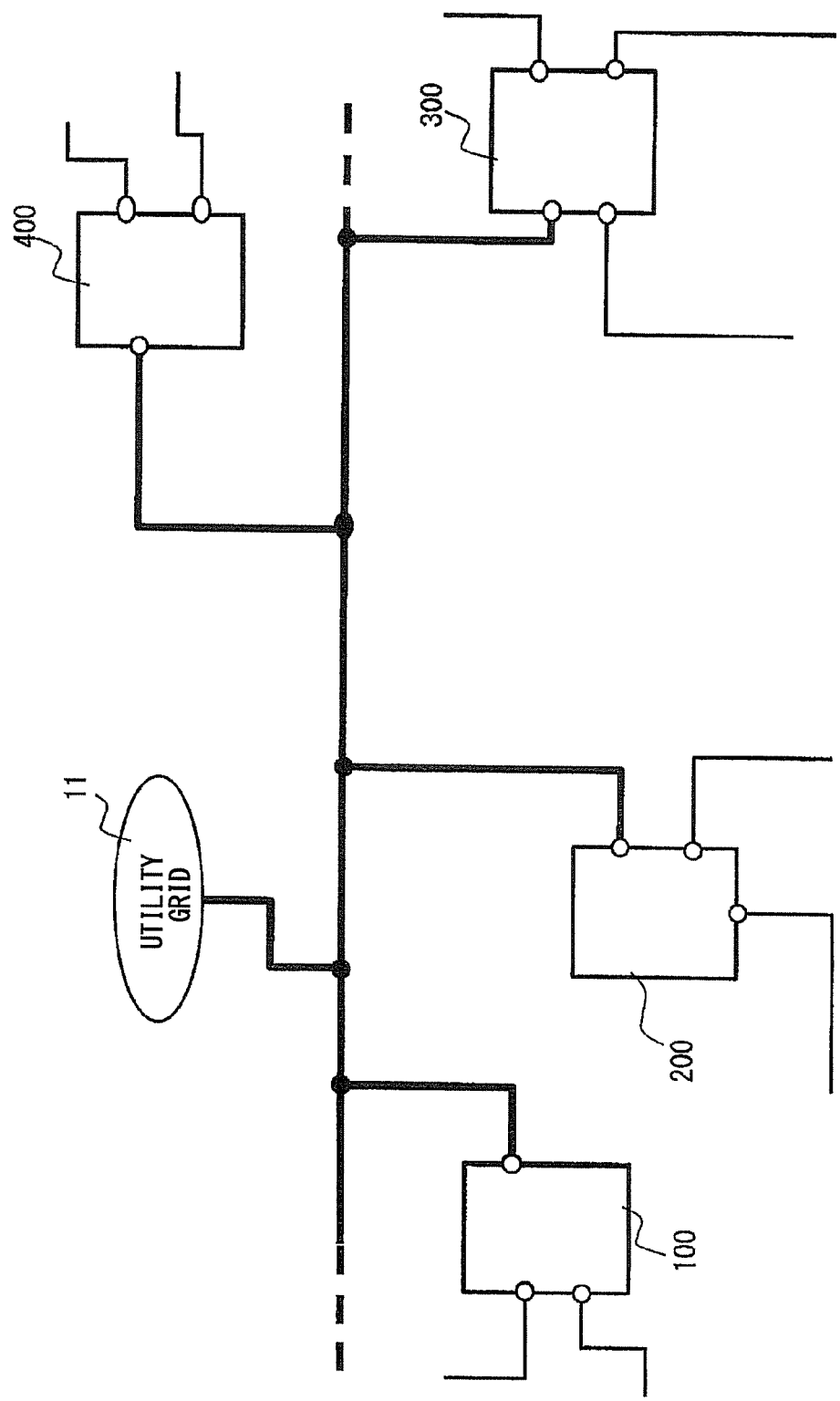
FIG. 17 shows an example where a plurality of power routers are connected through a bus.

Further, as shown in FIG. 17, the power routers 100-400 may be connected like a bus connection.

While a description of the operation mode of each leg is omitted, it is needless to say that the operation mode of each leg needs to be appropriately selected in consideration of the direction of power interchange and the connection restrictions described above.

As a matter of course, the utility grid 11 may be replaced by a distributed power supply such as a power generation facility or a storage battery in FIG. 17. That is, the plurality of power routers may be connected to the distributed power supply by a bus.

Figure 18:
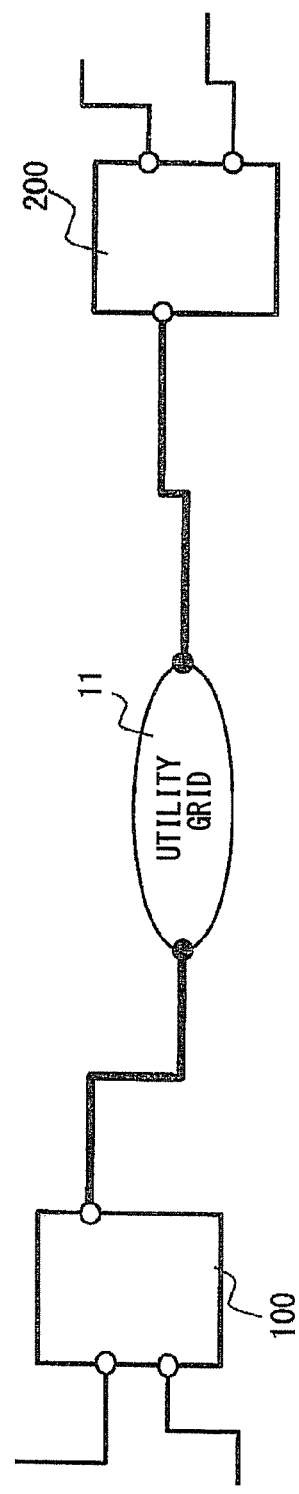
FIG. 18 shows an example of a connection form in which a utility grid is interposed between power routers.

Further, the example shown in FIG. 18 is an example of the connection form in which the two power routers 100 and 200 are connected to the utility grid 11.

In FIG. 18, the utility grid 11 may be replaced by a distributed power supply.

As described above, the connection partner of the power router may be a utility grid, a distributed power supply including a storage battery or a power generation facility, or another power router. In this specification and claims, the above are collectively called a power system.

With the power router, it is possible to build a power network system in which the power cells are asynchronously interconnected. According to the connection restrictions described in this exemplary embodiment, legs can be connected to each other so that the roles of the legs do not conflict with each other. It is therefore possible to extend the power network system and to operate the whole system in a stable manner.

As described above, in the above-described power network system using the power routers 100 and the like, power supplied from a plurality of power supply sources can be mixed through the DC bus provided in each of the power routers. Further, power can be output from the leg connected to the DC bus to the power supply destination. Therefore, when received power is simply measured in the leg that externally outputs power in the power router, the mixed power itself is measured. Accordingly, it is impossible to identify (i.e., determine) the rate of power supplied from each power supply source. Therefore, a power network system, a power identification method, and a power router for identifying (i.e., determining) a breakdown of power supply sources (i.e., identifying each of the power supply sources) even when power output from a plurality of power supply sources is mixed and received in the mixed state (hereinafter referred to as a "power identification technique") are explained hereinafter.

Example 1 of Power Identification Technique

In Example 1 of the power identification technique, an example in which a breakdown of power is identified (i.e., each of power supply sources is identified) in a case where power supplied from a plurality of power grids is transmitted to one place through a plurality of power routers is explained. Note that in Example 1 of the power identification technique, losses in power that occur during the power transmission are ignored. Further, the above-described "leg" is called "input/output terminal" or "input/output end part" in the following explanation.

Figure 19:
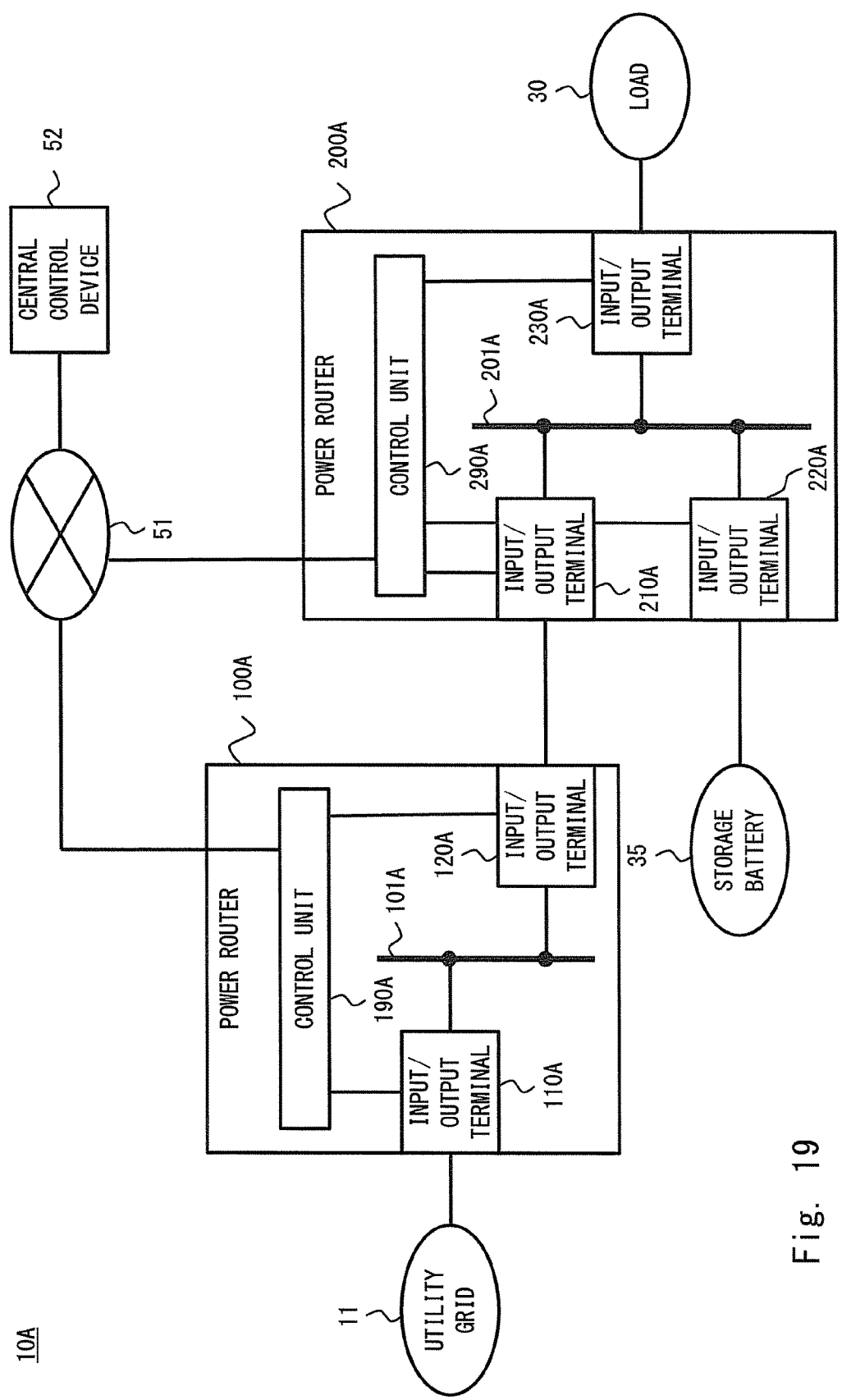
FIG. 19 is a block diagram showing a configuration of a power network system according to an example 1 of a power identification technique.

FIG. 19 is a block diagram showing a configuration of a power network system 10A according to Example 1 of the power identification technique. In the power network system 10A, a power router 100A, a power router 200A, and a central control device 52 are connected to each other through a communication network 51. The power router 100A is connected between a utility grid 11 and the power router 200A in such a manner that power can be transmitted between the utility grid 11 and the power router 200A. Further, the power router 200A is connected with the power router 100A, a storage battery 35, and a load 30 in such a manner that power can be transmitted among the power router 100A, the storage battery 35, and the load 30. Therefore, when power is transmitted from the utility grid 11 to the load 30, it is transmitted through the power routers 100A and 200A, which are connected in a multi-stage configuration. The power routers 100A and 200A belong to mutually different power cells (not shown) and connect their respective power cells to external power systems in an asynchronous manner. Note that the utility grid 11, the load 30, the storage battery 35, and the communication network 51 are similar to those explained above. Further, the connection destination of the power router 100A or 200A in FIG. 19 is merely an example and it is not limited to this example.

The power router 100A includes a DC bus 101A, an input/output terminal 110A, an input/output terminal 120A, and a control unit 190A. The input/output terminal 110A is connected to the utility grid 11 and the input/output terminal 120A is connected to an input/output terminal 210A of the power router 200A. Further, the power router 200A includes a DC bus 201A, an input/output terminal 210A, an input/output terminal 220A, an input/output terminal 230A, and a control unit 290A. The input/output terminal 210A is connected to the input/output terminal 120A and the input/output terminal 220A is connected to the storage battery 35. Further, the input/output terminal 230A is connected to the load 30. Each of the input/output terminals 110A, 120A, 210A, 220A and 230A may have a configuration corresponding to the above-described leg. Note that in Example 1 of the power identification technique, each of the input/output terminals 110A, 210A and 220A has to be capable of at least receiving power from a connection destination and outputting the received power to the DC bus 101A or 201A. Further, each of the input/output terminals 120A and 230A has to be capable of at least receiving power from the DC bus 101A or 201A and outputting the received power to a connection destination. Similarly to the previously-described DC bus, each of the DC buses 101A and 201A is maintained at a predetermined rated voltage. The control unit 190A performs various kinds of control for the input/output terminals 110A and 120A including the control of the operating mode. Similarly, the control unit 290A performs various kinds of control for the input/output terminals 210A, 220A and 230A including the control of the operating mode. Note that each of the control units 190A and 290A also has functions similar to those of the control unit 190 shown in FIG. 1.

Figure 20:
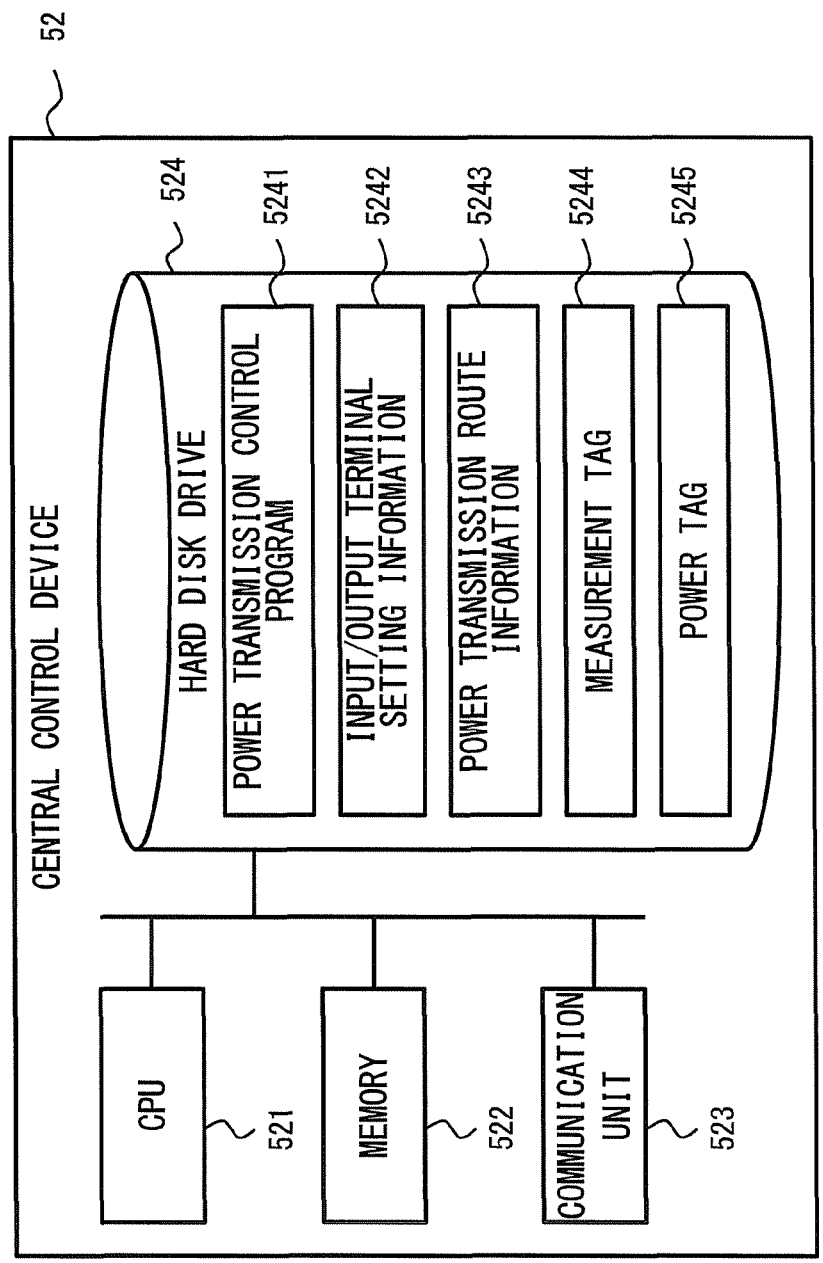
FIG. 20 is a block diagram showing a configuration of a central control device according to the example 1 of the power identification technique.

FIG. 20 is a block diagram showing a configuration of the central control device 52 according to Example 1 of the power identification technique. The central control device 52 is an information processing device that manages the power routers 100A and 200B and so on. The central control device 52 includes a CPU (Central Processing Unit) 521, a memory 522, a communication unit 523, and a hard disk drive 524.

The hard disk drive 524 is a nonvolatile storage device. The hard disk drive 524 stores an OS (not shown), a power transmission control program 5241, input/output terminal setting information 5242, power transmission route information 5243, a measurement tag 5244, a power tag 5245, and so on. Note that the power transmission control program 5241 is a computer program in which a power tag generation process (e.g., a process shown in FIG. 27, which is described later) and so on according to Example 1 of the power identification technique are implemented.

The input/output terminal setting information 5242 is information in which a start time, an end time, active power, and so on of an input or an output in each input/output terminal for the transmission of a predetermined amount of power from a given transmission source to a given transmission destination are defined in advance. The power transmission route information 5243 is information in which a power transmission route with a connection relation of each input/output terminal for the transmission of a predetermined amount of power from a given transmission source to a given transmission destination defined therein is defined.

The measurement tag 5244 is information including a measurement value for received power measured in each input/output terminal, a measurement time period, and identification information of an input/output terminal part where the measurement is carried out (hereinafter called "measured input/output terminal part"). The measurement tag 5244 includes, for example, a measurement tag ID, a power router ID, an input/output terminal ID, an input/output, a measurement start time, an end time, measurement power information (e.g., power [W] and energy (i.e., electric energy) [kWh]), and so on. However, it is not limited to the aforementioned information items.

The power tag 5245 is information that is obtained by combining additional information related to a transmission source for an input/output terminal part(s) included in the measurement tag with information in that measurement tag. The power tag 5245 includes, for example, a power tag ID, a power router ID, an input/output terminal ID, an input/output, a date, a time period, a transmission source, breakdown power information (e.g., power [W] and energy [kWh]), and so on. However, it is not limited to the aforementioned information items. Therefore, when power from a plurality of transmission sources are mixed with each other, the power tag 5245 is generated for each transmission source even if it is for the same input/output terminal and the same time period.

The CPU 521 controls various processes in the central control device 52, access to the memory 522, the communication unit 523, and the hard disk drive 524, and so on. The communication unit 523 communicates with external entities including the power routers 100A and 200B and so on.

In the central control device 52, the CPU 521 reads the OS, the power transmission control program 5241, or the like stored in the memory 522 or the hard disk drive 524, and executes the read program or the like. In this way, the central control device 52 can carry out a power tag generation process and so on.

Figure 21:
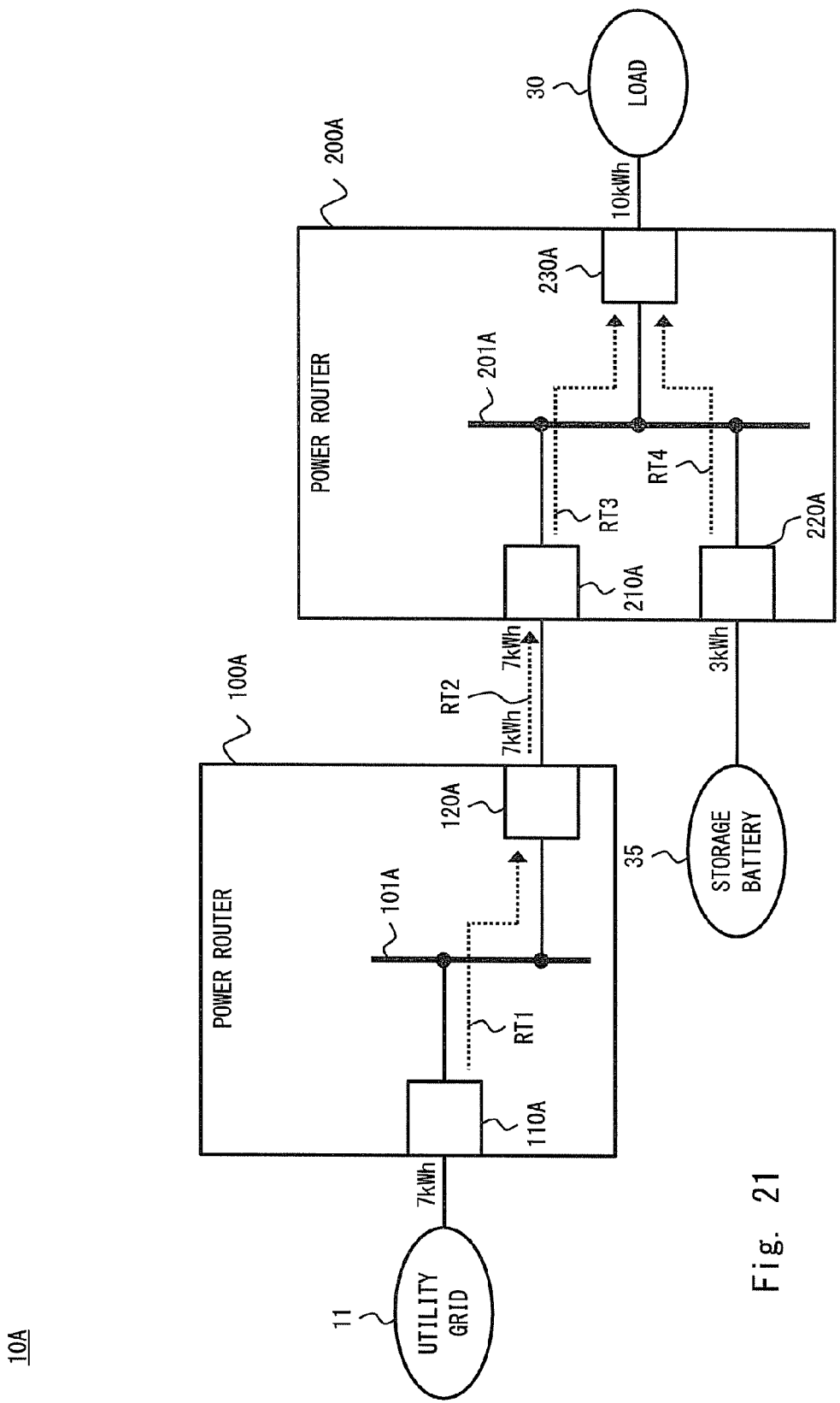
FIG. 21 shows an example of power transmission according to the example 1 of the power identification technique.

Here, the generation of power information that is performed when a predetermined amount of power is transmitted from a given transmission source to a given transmission destination in the power network system 10A is explained hereinafter. FIG. 21 shows an example of power transmission according to Example 1 of the power identification technique. That is, FIG. 21 shows a case where power from the utility grid 11 and that from the storage battery 35 are mixed with each other and the mixed power is transmitted to the load 30. Specifically, power of "7 kWh" is input from the utility grid 11 to the input/output terminal 110A of the power router 100A. Then, the power of "7 kWh" is fed from the input/output terminal 110A to the input/output terminal 120A through a route RT1; from the input/output terminal 120A to the input/output terminal 210A through a route RT2; and from the input/output terminal 210A to the input/output terminal 230A through a route RT3. Meanwhile, power of "3 kWh" is input from the storage battery 35 to the input/output terminal 220A of the power router 200A; and from the input/output terminal 220A to the input/output terminal 230A through a route RT4. Therefore, as a result, power of "10 kwh" is transmitted from the input/output terminal 230A to the load 30.

Figure 22:
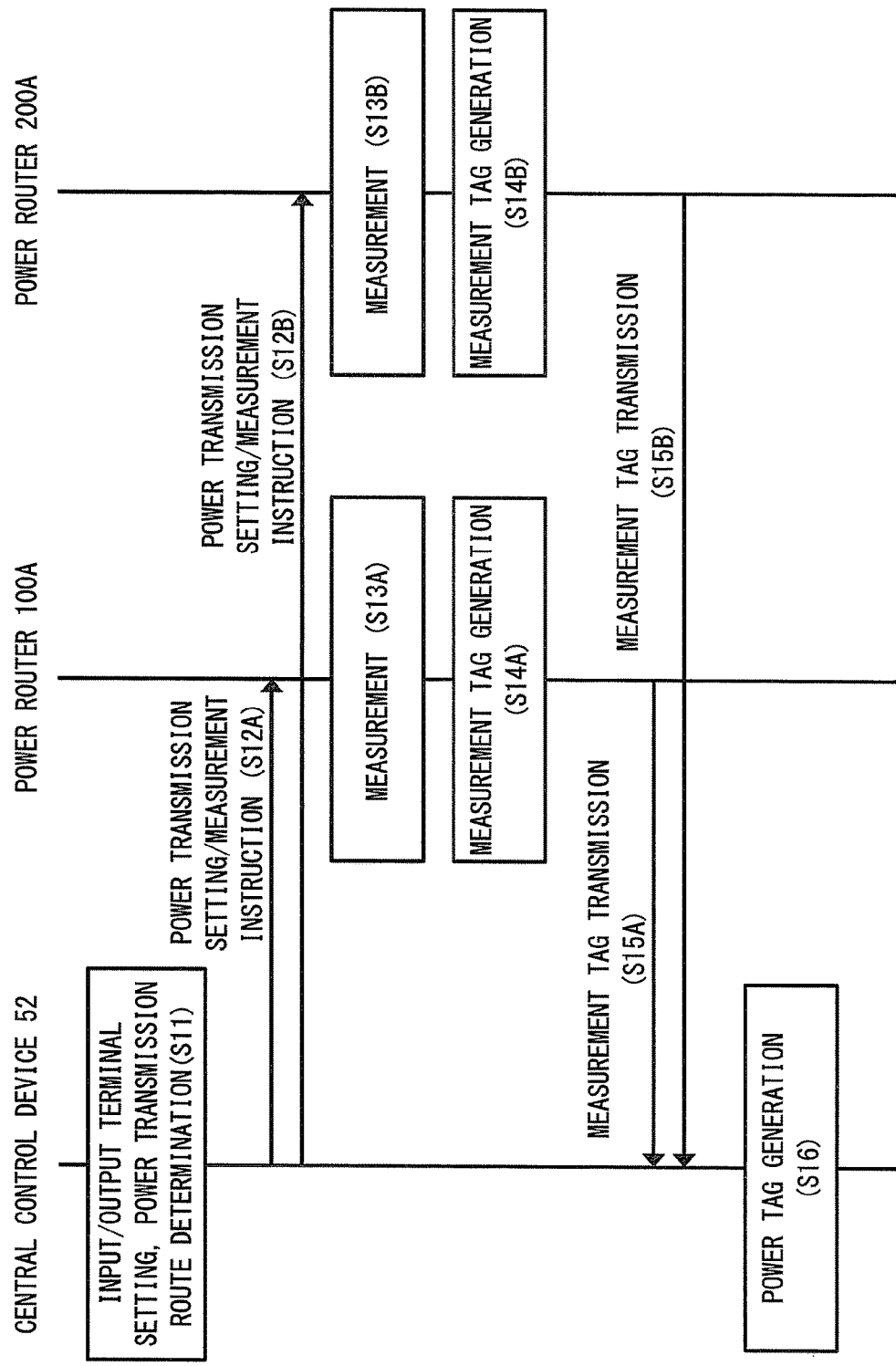
FIG. 22 is a sequence diagram of a power transmission process according to the example 1 of the power identification technique.

FIG. 22 is a sequence diagram of a power transmission process according to Example 1 of the power identification technique. Firstly, the central control device 52 sets input/output terminals and determines power transmission routes (S1). For example, the central control device 52 receives a request for power transmission shown in FIG. 21 from an external entity. Then, the central control device 52 sets input/output terminals and determines power transmission routes in order to carry out the power transmission according to this request.

Note that FIG. 23 shows an example of an input/output terminal setting management table according to Example 1 of the power identification technique. For example, the central control device 52 makes settings ST1 to ST5 as shown in FIG. 23 and stores the settings into the hard disk drive 524 as input/output terminal setting information 5242.

Further, FIG. 24 shows an example of power transmission route information according to Example 1 of the power identification technique. FIG. 24 shows an example in which identification information of input/output terminals that become transmission sources are associated with that of input/output terminals that become transmission destinations in a one-to-one relation irrespective of whether they are located inside power routers or not, and those associations are defined as their respective routes. For example, the input/output terminal 230A is the transmission destination of both of the routes RT3 and RT4. Therefore, this indicates that power from the input/output terminals 210A and 220A are mixed and the mixed power is received in the input/output terminal 230A. Note that the expressions of power transmission route information are not limited to the above-shown example. The central control device 52 defines, for example, the routes RT1 to RT4 as shown in FIG. 24 and stores them into the hard disk drive 524 as power transmission route information 5243.

Next, the central control device 52 instructs the power routers 100A and 200A to perform power transmission settings and power measurement (S12A and S12B). That is, the central control device 52 transmits the above-described instruction to the power routers 100A and 200A through the communication network 51. As a result, each of the control units 190A and 290A of the power routers 100A and 200A, respectively, instructs its internal input/output terminal(s) to perform power transmission and measure power received in each input/output terminal. For example, each of the control units 190A and 290A may set a measurement interval.

Then, each input/output terminal measures its received power (S13A and S13B). Note that each input/output terminal measures energy. Alternatively, each input/output terminal may measure a quantity other than the energy. After that, each input/output terminal notifies the control unit of the power router of the measured measurement value. Then, each control unit generates a measurement tag including the notified measurement value, a measurement time period, and identification information of the measured input/output terminal(s) (S14A and S14B) and transmits the generated measurement tag to the central control device 52 (S15A and S15B). FIG. 25 shows an example of measurement tags according to Example 1 of the power identification technique.

After that, the central control device 52 generates a power tag in the power transmission based on the measurement tags received from the control unit of each power router located on the power transmission route (S16). That is, the central control device 52 generates, as power information, a power tag including information about the power transmission sources for the input/output terminal parts included in the received measurement tags by using those measurement tags. Note that examples of the additional information include information that cannot be obtained by the measurement alone, such as the power selling price of power in its power transmission source, a $CO_2$ emission coefficient, the type of power generation (nuclear power, thermal power, pumping-up power, wind power, and so on), and a contract ID related to the power transmission. However, the additional information is not limited to the aforementioned information items. FIG. 26 shows an example of power tags according to Example 1 of the power identification technique.

Figure 27:
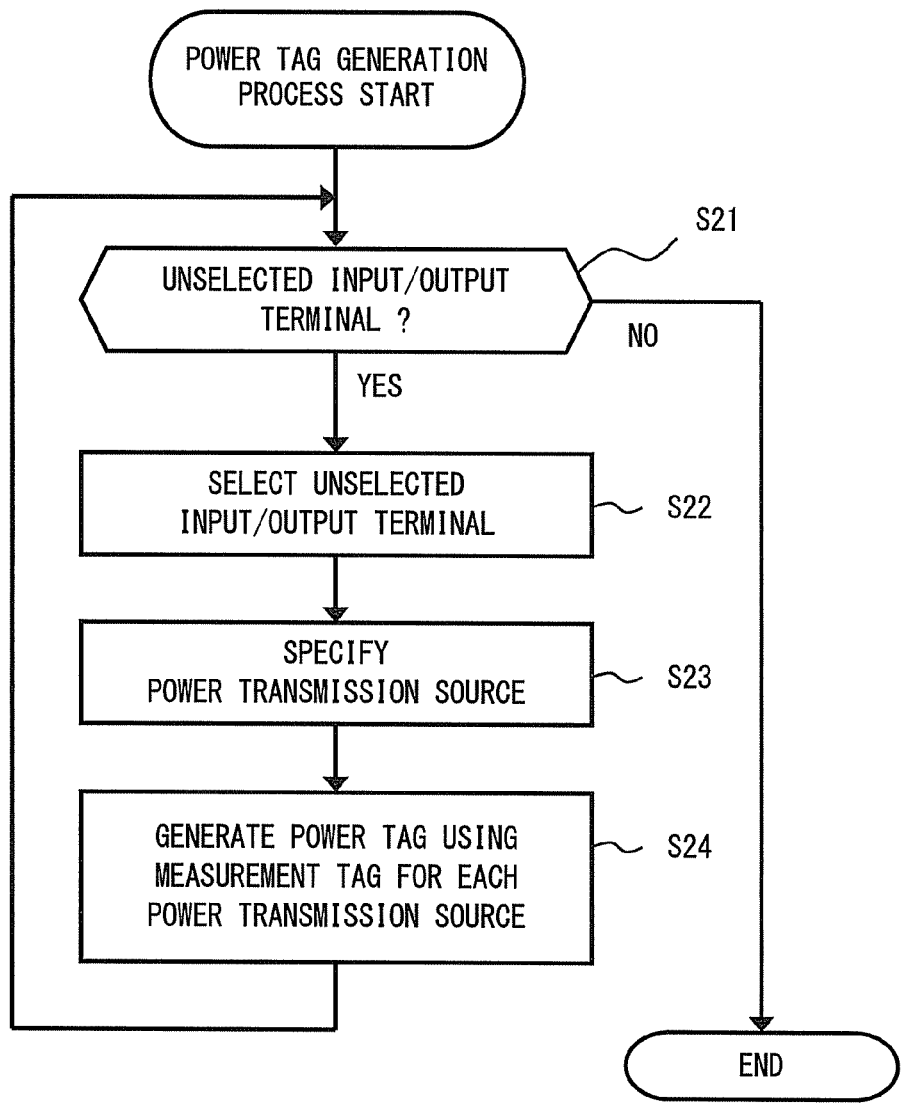
FIG. 27 is a flowchart showing a power tag generation process flow according to the example 1 of the power identification technique.

FIG. 27 is a flowchart showing a power tag generation process flow according to Example 1 of the power identification technique. Firstly, the central control device 52 determines whether or not there is any unselected input/output terminal (S21). That is, the central control device 52 determines whether or not there is an input/output terminal for which a power tag should be generated. Specifically, the central control device 52 determines, in a given time period in the power transmission, whether or not there is a measurement tag that corresponds to one of the input/output terminals located on the power transmission route but has not yet been processed.

When there is an unselected input/output terminal, the central control device 52 selects the unselected input/output terminal (S22). Then, the central control device 52 identifies the power transmission source of power received in each input/output terminal part in each power router located on the power transmission route based on the input/output terminal setting information 5242 (S23). It should be noted that when power received in the input/output terminal is mixed power, a plurality of power transmission sources are identified. Next, the central control device 52 generates a power tag for each of the identified power transmission sources by using the measurement tag (S24). That is, the central control device 52 generates a power tag by combining the above-described additional information with the measurement tag and stores the generated power tag into the hard disk drive 524.

After that, the central control device 52 repeats the processes in the steps S21 to S24 as long as there is an unselected input/output terminal. When there is no input/output terminal for which a power tag should be generated in the step S21, the power tag generation process is finished.

In this way, by using power tags, it is possible to recognize a breakdown of power (i.e., identify each of a plurality of power supply sources of power) received in a given input/output terminal based on a respective power tag. For example, based on a measurement tag MT5, "10.0 kWh" is received in total in the input/output terminal 230A (FIG. 25). Further, as its breakdown, it can be recognized that the power transmission source of "7.0 kWh" is the input/output terminal 210A and the power transmission source of "3 kWh" is the input/output terminal 220A (FIG. 26).

Note that in Example 1 of the power identification technique, it is also possible to recognize a breakdown of power by using power information other than the power tags. As a precondition, assume that: one of the input/output terminal parts of a first power router (e.g., power router 100A) among a plurality of power routers is a first power transmission source (e.g., input/output terminal 110A connected to the utility grid 11); one of the input/output terminal parts of a second power router (e.g., power router 200A) is a second power transmission source (e.g., input/output terminal 220A); another one of the input/output terminal parts of the second power router is a power transmission destination (e.g., input/output terminal 230A connected to the load 30); and an input/output terminal part(s) that is different from the second power transmission source and the power transmission destination and receives power from the first power transmission source is an intermediate input/output terminal(s) (or first input/output terminal part) (e.g., input/output terminal 210A). Further, it is assumed that a predetermined amount of power is transmitted to the input/output terminal part at the power transmission destination through the first input/output terminal part, the input/output terminal part at the second power transmission source, and the DC bus. Note that in the example shown in FIG. 19, the supply source of the power transmitted from the second power transmission source may be a supplementary power supply source for adjusting for the excess/deficiency of the power transmitted through the first power transmission source in the transmission of the predetermined amount of power.

Note that the power information about power received in the power transmission destination may include at least identification information of the first power transmission source and an intermediate measurement value, i.e., a measurement value of power received in the intermediate input/output terminal part in a predetermined time period. Note that the identification information of the first power transmission source is information for uniquely identifying each input/output terminal part in all the power routers in the power network system 10A. For example, the identification information of the first power transmission source may be expressed by a combination of a power router ID (e.g., an ID of the power router 100A) and a leg ID (e.g., an ID of the input/output terminal 110A). Note that the intermediate input/output terminal part(s) may be an input/output terminal part(s) in each power router through which the predetermined amount of power is transmitted. For example, the intermediate input/output terminal part(s) is the input/output terminals defined in the routes RT1 to RT5. Further, the intermediate input/output terminal part is an input/output terminal part that receives the power that is transmitted from the first power transmission source but has not yet been mixed with the power transmitted from the second power transmission source. For example, the power received in the input/output terminal 120A or the input/output terminal 210A is the power of "7 kWh" transmitted from the utility grid 11, which is the first power transmission source. Further, it is the power that has not mixed with the power of "3 kWh" transmitted from the storage battery 35, which is the second power transmission source.

Figure 28:
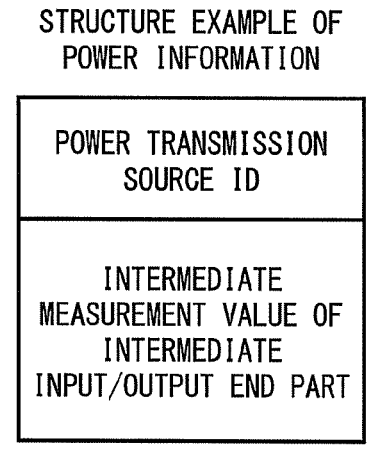
FIG. 28 shows a configuration example of power information according to the example 1 of the power identification technique.
Figure 29:
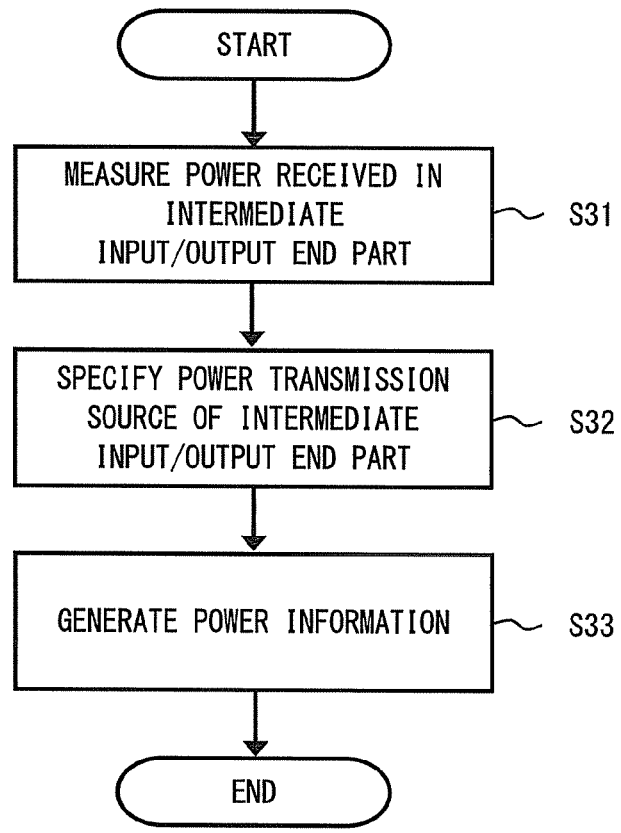
FIG. 29 is a flowchart showing a power information generation process flow according to the example 1 of the power identification technique.

FIG. 28 shows a structure example of power information according to Example 1 of the power identification technique. That is, the power information may include at least an ID of the power transmission source (e.g., the above-described "power router ID+leg ID") and an intermediate measurement value of power measured in the intermediate input/output terminal part in a predetermined time period. Note that when the predetermined time period is an arbitrary time period, the power information preferably includes the measurement time period itself. On the other hand, when the predetermined time period is a time period that is defined in advance, the power information does not necessarily have to include the measurement time period itself. FIG. 29 is a flowchart showing a power information generation process flow according to Example 1 of the power identification technique. Firstly, the intermediate input/output terminal part measures power received in the intermediate input/output terminal part itself (S31). Then, for example, the intermediate input/output terminal part transmits the intermediate measurement value to the central control device.

Next, the central control device identifies the (first) power transmission source of the intermediate input/output terminal part based on power transmission route information (S32). After that, the central control device generates power information including the intermediate measurement value and identification information of the identified first power transmission source (S33).

Therefore, by checking the power information, it is possible to recognize that, of the whole power indicated by the measurement value measured in the power transmission destination, at least power indicated by the intermediate measurement value has been transmitted from at least one of the plurality of power transmission sources (because losses in the power are ignored in this example). Therefore, it can also be recognized that the power measured at the power transmission destination includes power that has been transmitted from other(s) of the plurality of power transmission sources.

Further, the intermediate input/output terminal part is preferably an input/output terminal part that is located in a power router in which the power transmission destination is located and receives power from the other power router(s). For example, the intermediate input/output terminal part is preferably an input/output terminal 210B. This configuration improves the accuracy of the recognition (i.e., the identification) because the intermediate measurement value is a measurement value immediately prior to the mixing of the power.

Example 2 of the Power Identification Technique

Figure 30:
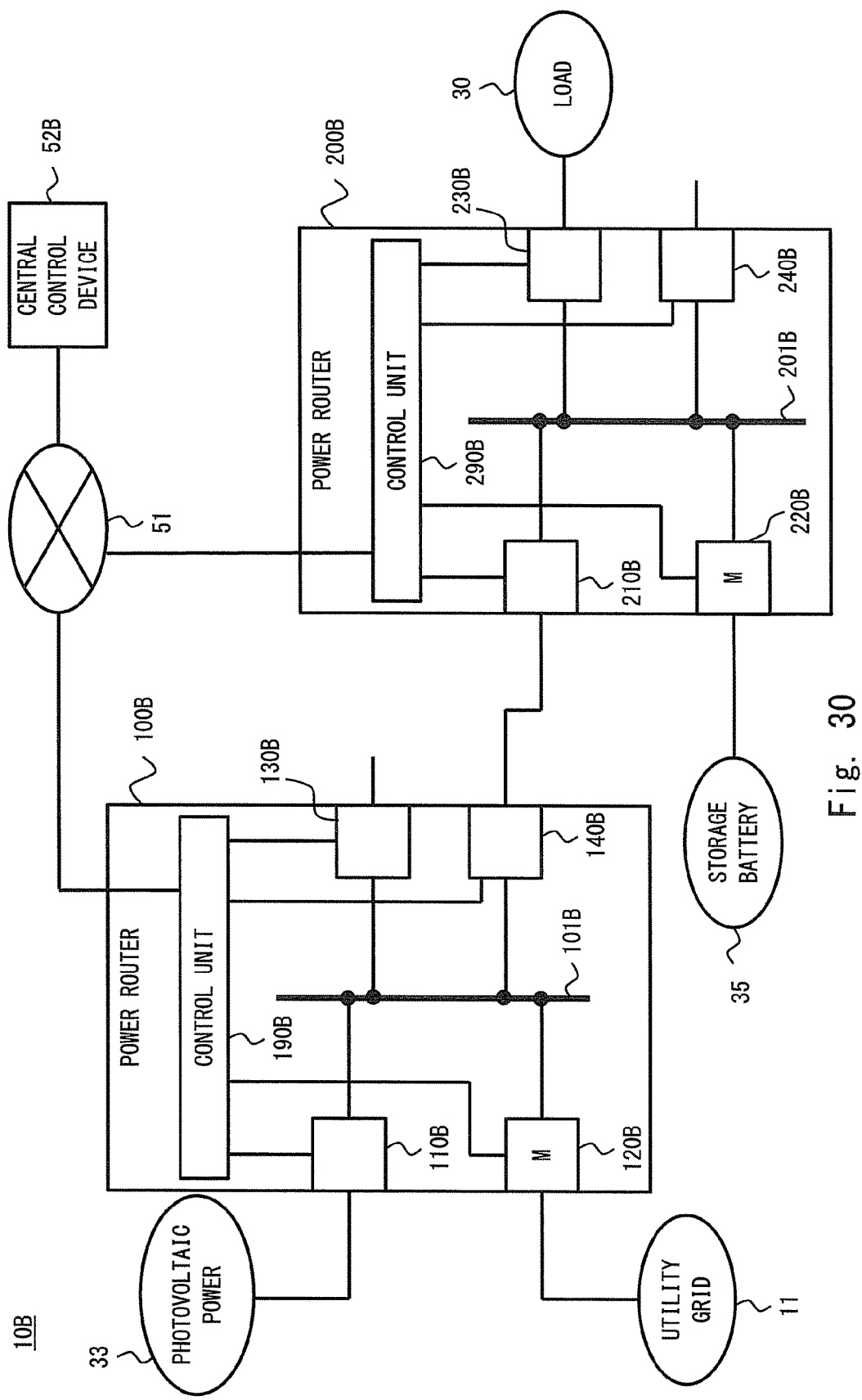
FIG. 30 is a block diagram showing a configuration of a power network system according to an example 2 of a power identification technique.

In Example 2 of the power identification technique, Example 1 of the power identification technique is modified so that a breakdown of power can be recognized (i.e., each power supply source is identified) even when losses in the power that occur during the power transmission are taken into account. FIG. 30 is a block diagram showing a configuration of a power network system 10B according to Example 2 of the power identification technique. In the power network system 10B, a power router 100B, a power router 200B, and a central control device 52B are connected to each other through a communication network 51. The power router 100B is connected with a utility grid 11, a solar panel 33, and a power router 200B in such a manner that power can be transmitted among the utility grid 11, the solar panel 33, and the power router 200B. Further, the power router 200B is connected with the power router 100B, a storage battery 35, and a load 30 in such a manner that power can be transmitted among the power router 100B, the storage battery 35, and the load 30. Further, the connection destination of the power router 100B or 200B in FIG. 30 is merely an example and it is not limited to this example.

The power router 100B includes a DC bus 101B, input/output terminals 110B, 120B, 130B and 140B, and a control unit 190B. The input/output terminal 110B is connected to the solar panel 33 and the input/output terminal 120B is connected to the utility grid 11. Further, the input/output terminal 140B is connected to an input/output terminal 210B of the power router 200B. Note that the input/output terminal 130B may be connected to an external entity.

The power router 200B includes a DC bus 201B, input/output terminals 210B, 220B, 230B and 240B, and a control unit 290B. The input/output terminal 210B is connected to the input/output terminal 140B and the input/output terminal 220B is connected to the storage battery 35. Further, the input/output terminal 230B is connected to the load 30. Note that the input/output terminal 240B may be connected to an external entity.

Note that the input/output terminals 120B and 220B are operated and controlled in the above-described master mode. Therefore, the input/output terminal 120B transmits/receives power to/from the utility grid 11 in order to maintain the DC bus 101B at its rated voltage. Similarly, the input/output terminal 220B transmits/receives power to/from the storage battery 35. For example, when power is transmitted from the solar panel 33 to the load 30 through the power routers 100B and 200B, there is a possibility that sufficient power could not be output from the input/output terminal 140B due to power losses occurring on the power transmission route even when the originally-determined power (e.g., power specified in a power buying contract) is received from the solar panel 33 in the input/output terminal 110B. In such cases, the input/output terminal 120B acquires power equivalent to the shortage from the utility grid 11 and supplies the acquired power to the DC bus 101B. Similarly, the input/output terminal 220B acquires power equivalent to the shortage from the storage battery 35 and supplies the acquired power to the DC bus 201B.

Therefore, when the solar panel 33 is the power supply source to be purchased in a power buying contract, the utility grid 11 and the storage battery 35 can serve as supplementary power supply sources. That is, although the utility grid 11 and the storage battery 35 are not entities from which power is directly bought, they can serve as entities which supply power depending on the power loss situation and for which payment is made for the supplied power.

For the other configuration, each component/structure of the power routers 100B and 200B may have a function similar to that of the power routers 100A and 100B shown in FIG. 19.

Figure 31:
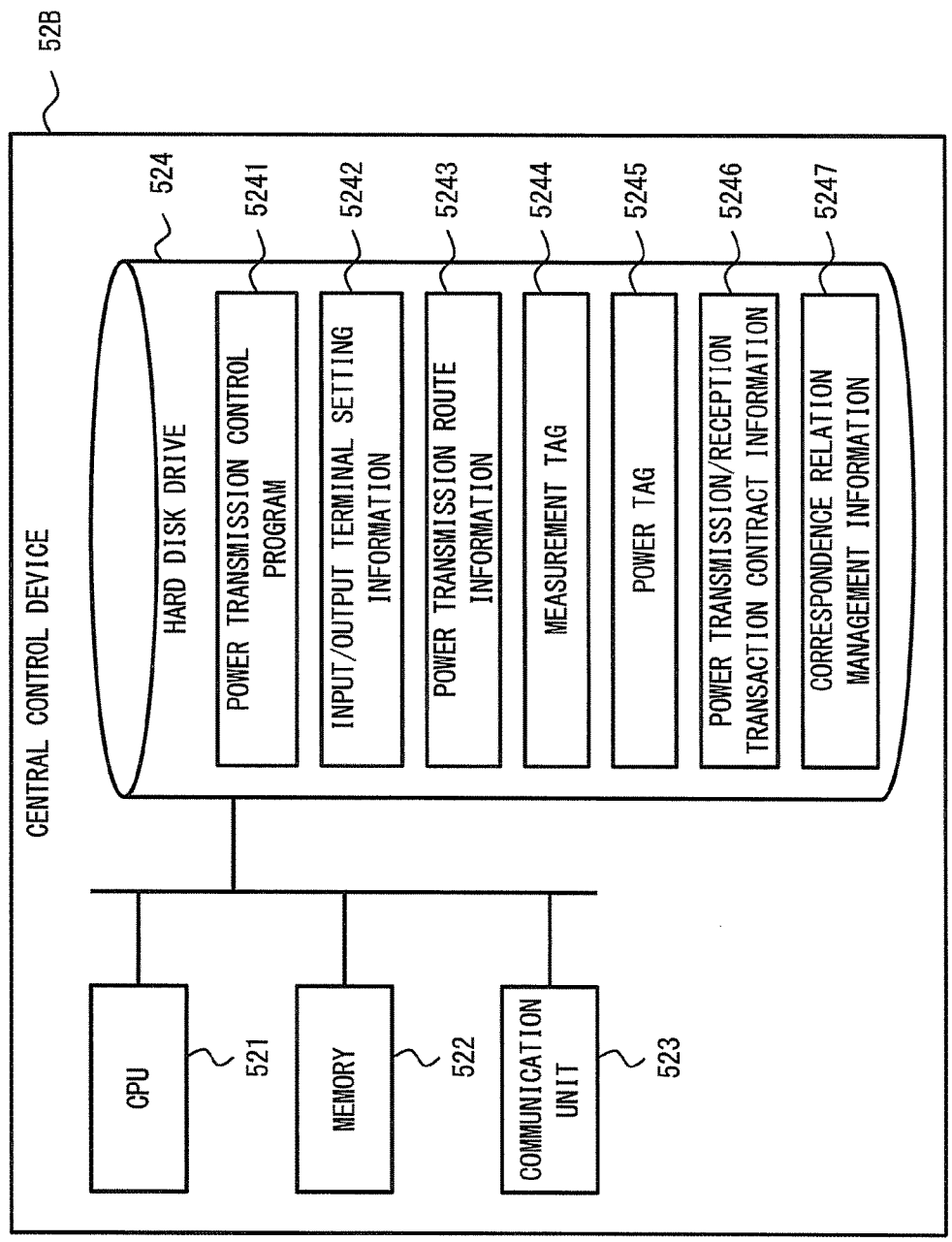
FIG. 31 is a block diagram showing a configuration of a central control device according to the example 2 of the power identification technique.

FIG. 31 is a block diagram showing a configuration of the central control device 52B according to the Example 2 of the power identification technique. A hard disk drive 524 of the central control device 52B stores power transmission/reception transaction contract information 5246 and correspondence relation management information 5247 in addition to the information items shown in FIG. 20. Note that the power transmission/reception transaction contract information 5246 is contract information for transmitting a predetermined amount of power from a first power transmission source (e.g., the input/output terminal 110B connected to the solar panel 33) to a power transmission destination (e.g., the input/output terminal 230B connected to the load 30). The power transmission/reception transaction contract information 5246 includes, for example, a contract ID, a power transmitter ID, a power receiver ID, a date, a time period, a contract time, a transaction energy, a price, a $CO_2$ emission coefficient, the type of power generation, and so on. However, the power transmission/reception transaction contract information 5246 does not need to include all of them and may include other information items. Further, the correspondence relation management information 5247 is a table for managing associations between contract IDs and setting IDs. Note that the way of managing the association between the power transmission/reception transaction contract information 5246 and the correspondence relation management information 5247 is not limited to the above-described table.

Further, the central control device 52B may function as a power transaction device in addition to having functions similar to those of the central control device 52 shown in FIG. 20. The power transaction device is, for example, an information system that supports a power transaction contract between a power vendor and a power buyer. Note that the power transaction device may be implemented by a computer independent of the central control device 52B. In that case, the power transaction device may be connected to another communication network connected to the communication network 51 or the central control device 52B.

Further, the central control device 52B sets power transmission route information 5243 by defining a connection relation of each input/output terminal part based on the power transmission/reception transaction contract information 5246. Note that the power transmission route information 5243 does not need to include the connection relation of each input/output terminal part but does need to specify at least the definitions of input/output terminals for generating power information.

Note that in the power router 100B according to the Example 2 of the power identification technique, power can be supplied from external entities through a plurality of input/output terminals, and through the DC bus 101B, power is output to external entities from a plurality of input/output terminals. In such cases, there are several methods for carrying out the distribution of power from the DC bus 101B to a plurality of input/output terminals. Examples of those methods include ones shown in FIGS. 32 and 33.

Figure 32:
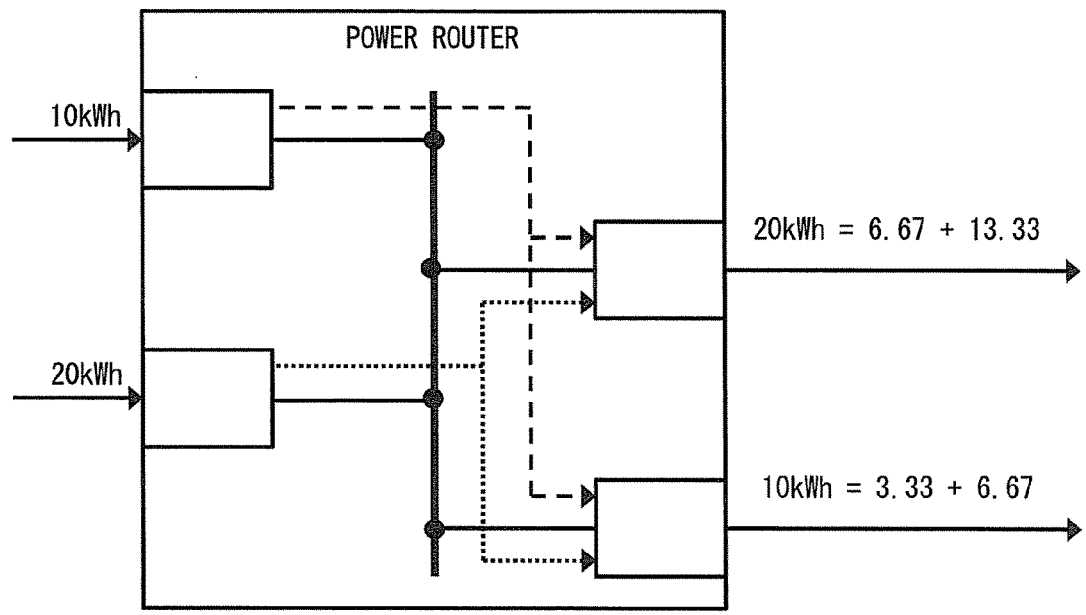
FIG. 32 shows an example of correspondence between input voltages and output voltages according to the example 2 of the power identification technique.
Figure 33:
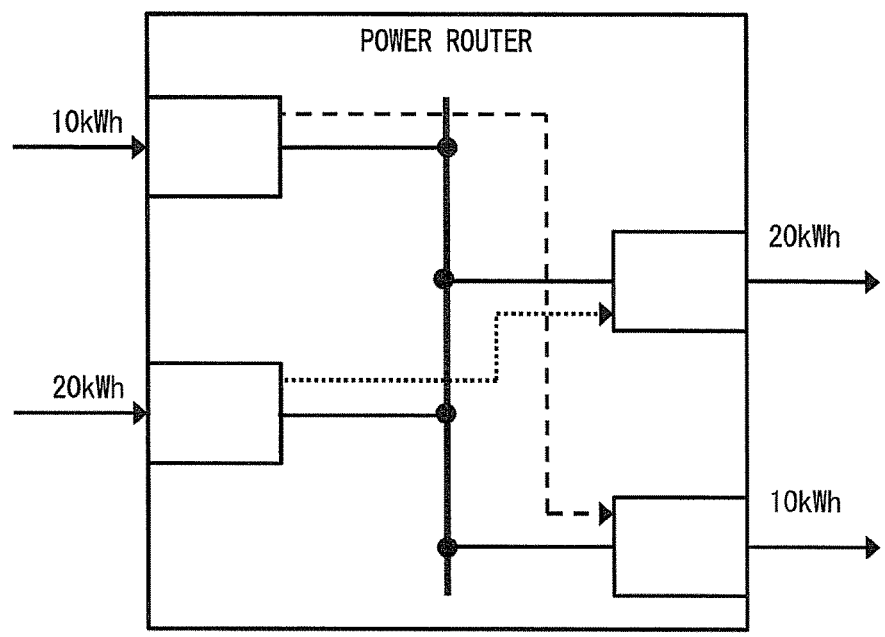
FIG. 33 shows an example of correspondence between input voltages and output voltages according to the example 2 of the power identification technique.

FIG. 32 shows an example of an association between input power and output power according to the Example 2 of the power identification technique. In this example, power is supplied from each of two terminals and the supplied power is distributed to other two terminals in the same ratio as the ratio at which the power is supplied. FIG. 33 shows another example of an association between input power and output power according to the Example 2 of the power identification technique. In this example, power is also supplied from each of two terminals and the supplied power is distributed to other terminals in such a manner that the supply source terminals are associated with the output destination terminals in a one-to-one relation. Note the above-described power distribution methods are also applied to the power router 200B and the power distribution methods are not limited to the above-described methods.

Figure 34:
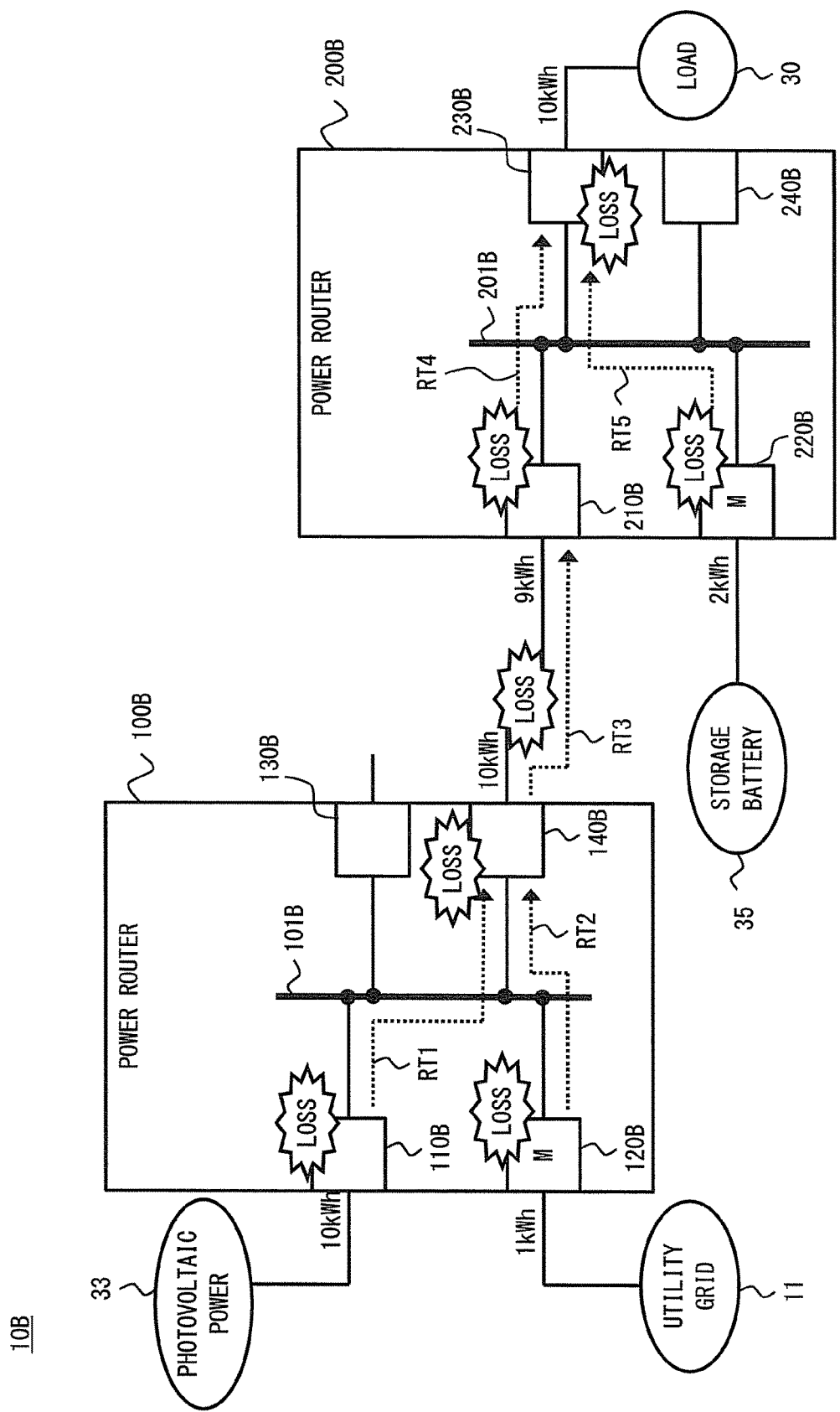
FIG. 34 shows an example of a power interchange according to the example 2 of the power identification technique.

Here, the generation of power information in a case where a power interchange is performed when a predetermined amount of power is transmitted from a given power transmission source to a given power transmission destination in the power network system 10B is explained hereinafter. FIG. 34 shows an example of a power interchange according to the Example 2 of the power identification technique. In this example, it is assumed that power of "10 kWh" is transmitted from a solar panel 33 to a load 30 in a predetermined time period according to a power transaction contract.

For example, the above-described power transaction device transmits information about a power transaction contract concluded between a power vendor and a power buyer and a power interchange request to the central control device 52B based on that information. Then, the central control device 52B stores the received information into the hard disk drive 524 as power transmission/reception transaction contract information 5246.

FIG. 35 shows an example of a power transmission/reception transaction contract information management table according to the Example 2 of the power identification technique. For example, a contract C3 in FIG. 35 corresponds to the above-described contract. Note that as shown in FIG. 35, a plurality of power transaction contracts are made, and their dates and time periods can overlap each other. Note that the information held by the power transmission/reception transaction contract information management table is not limited to the above-described information items.

After that, the central control device 52B sets input/output terminals and determines power transmission routes according to the sequence shown in FIG. 22 (S11) and instructs the power routers 100B and 200B to perform power transmission settings and power measurement (S12A and S12B).

Note that FIG. 36 shows an example of an input/output terminal setting management table according to the Example 2 of the power identification technique. Note that input/output terminal setting management table may include other setting information such as active/reactive power ramp rate in addition to the information items shown in FIG. 36. Note that it is assumed that the central control device 52B makes settings ST1 to ST4 for directly carrying out the contact C3. That is, no setting for the input/output terminals 120B and 220B connected to the utility grid 11 and the storage battery 35, which are supplementary power supply sources, is made.

Further, FIG. 37 shows an example of a correspondence table between power transmission/reception contract information and an input/output terminal setting according to the Example 2 of the power identification technique. In this table, only the setting ST1, which is associated with the contract C3, among the settings ST1 to ST4 is shown because the following explanation is given for the contract C3. Since only the setting for the input/output terminal directly connected to the system or the power supply is managed (or stored), there is no need to manage (or store) all the correspondence relations, thus enabling the data capacity to be efficiently used.

Further, when the central control device 52B determines power transmission routes, the central control device 52B determines them while including power transmission routes for supplementary power for carrying out the contract C3. FIG. 38 shows an example of power transmission route information according to the Example 2 of the power identification technique. For example, routs RT2 and RT5 correspond to the power transmission routes for supplementary power for carrying out the contract C3.

After that, the transmission of power is actually started. Each input/output terminal measures power every time the power transmission is started (S13A and S13B). Further, each control unit generates a measurement tag (S14A and S14B) and transmits the generated measurement tag to the central control device 52B (S15A and S15B). After that, the central control device 52B performs a power tag generation process (S16).

However, it is assumed in Example 2 of the power identification technique that power losses occur in various places on the power transmission routes as shown in FIG. 34. A power interchange flow in this example is explained hereinafter.

Firstly, the input/output terminal 110B receives power of "10 kWh" from the solar panel 33 based on the setting ST1 and outputs the received power to the DC bus 101B. Further, the input/output terminal 140B tries to receive power of "10 kWh" from the DC bus 101B based on the setting ST2. In this process, power losses related to the input/output terminal 110B occur. Therefore, in actuality, the power of "10 kWh" is not entirely output from the input/output terminal 110B to the DC bus 101B. Therefore, the input/output terminal 120B receives power equivalent to the deficiency from the utility grid 11 and outputs the received power to the DC bus 101B in order to maintain the DC bus 101B at its rated voltage. However, power losses related to the input/output terminals 120B and 140B also occur. Therefore, it is assumed that power values shown in FIG. 35 are actually measured. Then, measurement tags MT1 to MT3 shown in FIG. 39 are generated. FIG. 39 shows an example of measurement tags according to the Example 2 of the power identification technique.

Next, power losses also occur in the power transmission from the input/output terminal 140B to the input/output terminal 210B. Further, power losses related to each of the input/output terminals 210B, 220B and 230B occur. Therefore, measurement tags MT4 to MT6 shown in FIG. 39 are generated. With the precondition that the measurement tags MT1 to MT 6 shown in FIG. 39 have been generated and stored in the central control device 52B as described above, a power tag generation process according to Example 2 of the power identification technique is explained hereinafter.

Figure 40:
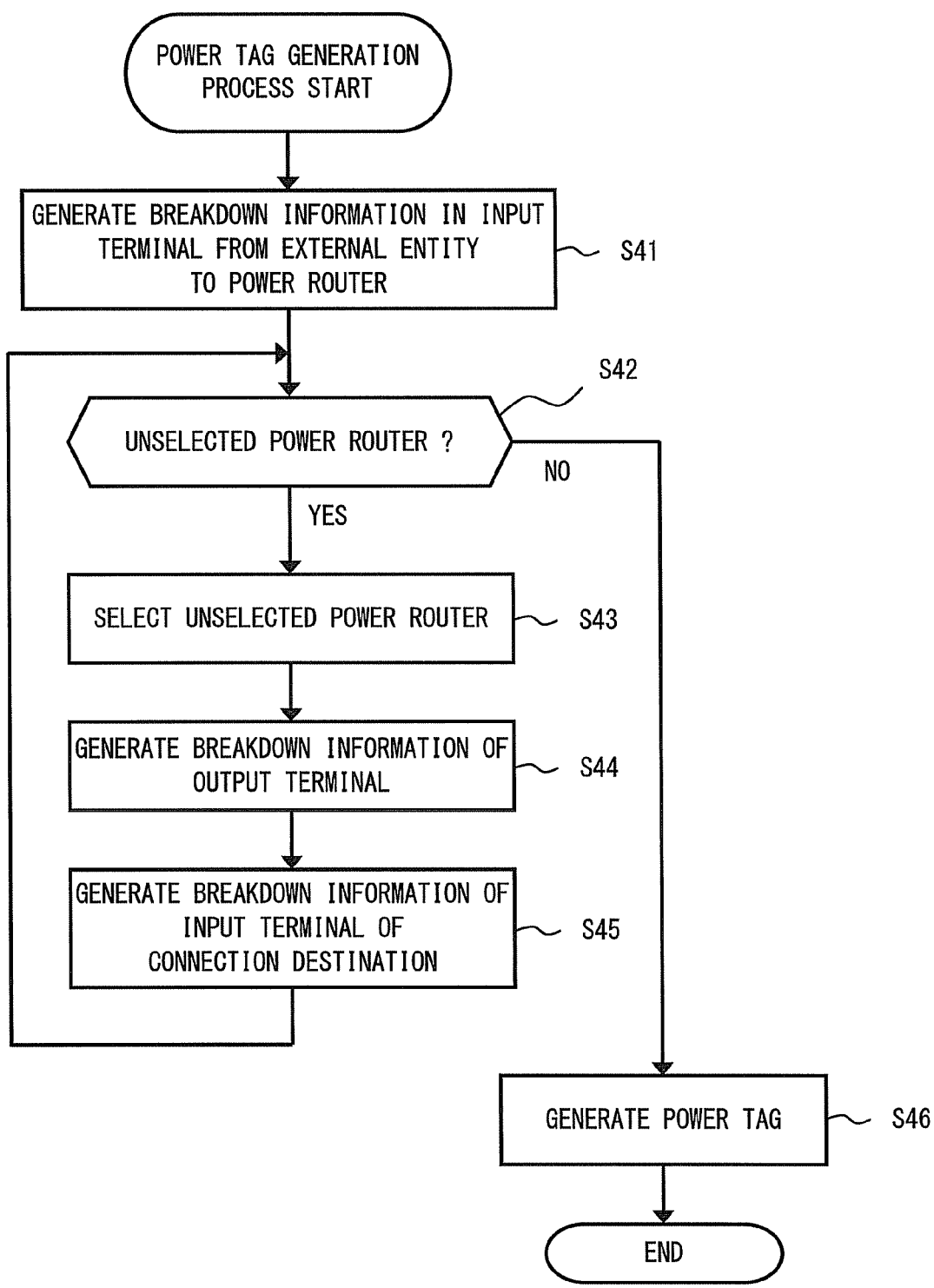
FIG. 40 is a flowchart showing a power tag generation process flow according to the example 2 of the power identification technique.

FIG. 40 is a flowchart showing a power tag generation process flow according to the Example 2 of the power identification technique. Further, FIG. 41 shows an example of breakdown information according to the Example 2 of the power identification technique. FIG. 42 shows a calculation example of breakdown information according to the Example 2 of the power identification technique. FIG. 43 shows an example of power tags according to the Example 2 of the power identification technique. In the following explanation, a power tag generation process is explained while referring to FIGS. 41, 42 and 43 as required.

Firstly, the central control device 52B generates breakdown information in an input terminal located between an external entity and a power router (S41). That is, the central control device 52B selects an input/output terminal(s) among input/output terminals of a plurality of power routers that receives power from an external power system. For example, the central control device 52B selects input/output terminals 110B, 120B and 220B. Then, the central control device 52B generates first breakdown information including an energy received in the selected input/output terminal and identification information of the power transmission source of the received power based on a measurement tag. For example, the central control device 52B generates breakdown information including energy of "10.0 kWh" received in the selected input/output terminal 110B and identification information of the solar panel 33, which is the power transmission source of the power, based on the measurement tag MT1 (FIG. 41). Further, the central control device 52B also generates breakdown information for each of the input/output terminals 120B and 220B in a similar manner.

Next, the central control device 52B determines whether or not there is unselected power router (S42). That is, the central control device 52B determines whether or not there is an input/output terminal for which breakdown information should be generated. Specifically, the central control device 52B determines whether or not there is a power router that has not yet been processed among the power routers for which all the breakdown information of the input power has already been generated.

When there is an unselected power router, the central control device 52B selects the unselected power router (S43). At this point, the breakdown information of the input/output terminals 110B and 120B has already been generated in the step S41, the central control device 52B selects the power router 100B.

The central control device 52B generates breakdown information of an output terminal (S44). That is, the central control device 52B generates second breakdown information including an energy output from the selected power router and identification information of the power transmission source of the output power based on a measurement tag.

For example, the central control device 52B first identifies an input/output terminal 140B, which is the output terminal in the selected power router 100B. Then, the central control device 52B determines that the power transmission source of the input/output terminal 140B is the input/output terminals 110B and 120B based on the power transmission route information 5243. Then the central control device 52B calculates breakdown energy for each power transmission source by using the below-shown Expression (1). (Breakdown energy)=(Measurement value in power transmission source)/(Measurement value in all power transmission sources)×(Measurement value in power transmission destination) (1)

For example, the central control device 52B refers to the measurement tags MT1 and MT3 for the input/output terminal 110B, which is one of the power transmission sources, and calculates a breakdown energy as "9.1 kWh" by Expression (1) (FIG. 42). The central control device 52B also calculates breakdown energy for the input/output terminal 120B, which is also one of the power transmission sources, in a similar manner.

Next, the central control device 52B generates breakdown information for the input terminal at the connection destination (S45). That is, the central control device 52B generates first breakdown information in the other power router connected to the selected power router by using a measurement tag in an input/output terminal part in the other power router. In this way, it is possible to generate breakdown information in which power losses are taken into account. For example, the central control device 52B refers to the power transmission route information 5243 and thereby identifies an input/output terminal 210B as the connection destination of the input/output terminal 140B. Note that the input/output terminal 210B is an input/output terminal in the other power router 200B connected to the above-described selected power router 100B. Further, the central control device 52B refers to the power transmission route information 5243 and thereby determines that the power transmission sources of the input/output terminal 210B are the input/output terminals 110B and 120B. Then, the central control device 52B calculates breakdown power for each power transmission source by using the above-shown Expression (1).

For example, the central control device 52B refers to the measurement tags MT3 and MT4 for the input/output terminal 110B, which is one of the power transmission sources, and calculates breakdown power as "8.2 kWh" by Expression (1) (FIG. 42). The central control device 52B also calculates breakdown power for the input/output terminal 120B, which is also one of the power transmission sources, in a similar manner.

After that, the process returns to the step S42. Since there is an unselected power router 200B, the process proceeds to the step S43. At this point, the breakdown information of the input/output terminals 220B and 210B has already been generated in the steps S41 and S45, the central control device 52B selects the power router 200B.

Next, the central control device 52B identifies an input/output terminal 230B as the output terminal in the selected power router 200B. Then, the central control device 52B determines that the power transmission sources of the input/output terminal 230B are the input/output terminals 110B, 120B and 220B based on the power transmission route information 5243. Then, the central control device 52B refers to the measurement tags MT4 and MT6 for the input/output terminal 110B, which is one of the power transmission sources, and calculates breakdown power as "7.5 kWh" by Expression (1) (FIG. 42). The central control device 52B also calculates breakdown power for the input/output terminals 120B and 220B, which are also power transmission sources, in a similar manner.

Since there is no input terminal of the connection destination of the input/output terminal 230B (S45) and there is no unselected power router (S42), the central control device 52B generates power tags (S46). That is, the central control device 52B generates power tags based on the first breakdown information and the second breakdown information. Note that a power tag may be generated in each of the steps S41, S44 and S45. For example, the central control device 52B generates each pf power tags PT1 to PT10 shown in FIG. 43 based on breakdown information shown in FIGS. 41 and 42, and stores the generated power tags PT1 to PT10 into the hard disk drive 524.

By using measurement tags and power tags according to Example 2 of the power identification technique as described above, various information items related to power flowing in the power network system 10B can be managed. Examples of the information items include a measurement time, a measurement point (locations of a power router and an input/output terminal), a measured value, additional information, and so on. Further, a breakdown of mixed power can also be recognized by using the above-described breakdown information. Therefore, the central control device 52B may store the breakdown information into the hard disk drive 524.

Example 3 of Power Identification Technique

In Example 3 of the power identification technique, the above-described Example 2 of the power identification technique is modified. That is, a central control device according to Example 3 of the power identification technique resets (i.e., creates), when an abnormality related to an intermediate input/output terminal part is detected, power transmission route information for transmitting power equivalent to a predetermined amount of power to a power transmission destination without using the input/output terminal part where the abnormality is detected among input/output terminal parts of a plurality of power routers. In this way, even when power cannot be transmitted through the originally-set power transmission route, power can be interchanged in accordance with a contract by transmitting the power through an alternate route.

Further, a control unit according to the Example 3 of the power identification technique transmits a measurement tag to a central control device while making the status of the measurement tag an undetermined status, and the central control device changes the status of the received measurement tag to a determined status when there is no abnormality related to an input/output terminal part corresponding to the measurement tag in a measurement time included in the measurement tag, and stores that measurement tag into a storage device. This can improve the reliability of the measurement tag.

Further, when a control unit in a power router detects an abnormality for an input/output terminal in which power is measured in a measurement time period, the control unit may set, for example, "abnormality (C, T)" or the like in a status attribute of the measurement tag. Note that "C" may be a cause of the abnormality. For example, "stop", "power shortage", or the like may be set. Further, "T" may be a time period in which the abnormality occurs. For example, "10:01:31-10:01:47" or the like may be set. This can enable a measurement tag to manage an effective time period.

Further, when the central control device resets (i.e., creates) an alternate power transmission route and power starts to flow again, the central control device may set "restoration (T)" in a status attribute of a measurement tag that is generated for an input/output terminal forming the alternate route. Note that "T" may be a measurement time period in power transmission through the alternate route. For example, "10:01:58-10:10:00" or the like may be set.

Note that regarding the first and second power transmission sources in the above-described first exemplary embodiment, the first power transmission source may be an entity with which a transaction is contracted and the second power transmission source may be a supplementary power supply source. That is, Example 1 of the power identification technique can be applied when power losses can be ignored.

Further, in Example 1 of the power identification technique, no power may be supplied from the second power transmission source. That is, in a state where: one input/output terminal part in one power router among a plurality of power routers is a first power transmission source; and one input/output terminal part in another power router is a power transmission destination, when a predetermined amount of power is transmitted from the first power transmission source to the power transmission destination, power information about power received in the power transmission destination may include identification information of the first power transmission source and an intermediate measurement value that is a measurement value of power received in an intermediate input/output terminal part that is an input/output terminal part in a power router located on a power transmission route of the predetermined amount of power and is different from the first power transmission source and the power transmission destination.

Object of the Present Invention

Objects that we want to achieve by the present invention are explained hereinafter one by one. Firstly, as a precondition for the present invention, it is assumed that the use of the above-described power router or the like can make it possible to arbitrarily control input/output power in each leg. Further, it is assumed that the use of the above-described power identification technique or the like makes it possible to identify the supply source of received power in a state where power supplied from a plurality of power supply sources is mixed and received in the mixed state in the power receiving end of the power.

With the above-described assumptions, it is possible to predict changes in the power value that will be required in the future from the load, which is the demander of the power, according to the power consumption situation in the power receiving end. Therefore, when the current received power value received in the power receiving end is maintained, an excess/deficiency in the power could occur in the future. Accordingly, it is necessary to adjust the output power (supply power) in the power supply source (or in the power transmitting end connected to the supply source) in order to solve the excess/deficiency in the power.

Note that as described above, power from a plurality of power supply sources (power transmitting ends) is mixed and received in the mixed manner in the power receiving end. Therefore, to solve the excess/deficiency in the power, there is a problem that how much the power should be adjusted in which of the plurality of power transmitting ends. Accordingly, it is conceivable that the power excess/deficiency is solved in an orderly manner by setting a priority order for adjusting the power among the plurality of power transmitting ends.

However, the priority order for each power transmitting end is not necessarily the same as each other among the plurality of power receiving ends to which the power is supplied from the plurality of power transmitting ends. For example, while one customer belonging to one power receiving end may desire that power should be preferentially supplied from a power supply that puts a small burden on the environment and hence increase the priority for a power supply of photovoltaic power, another customer belonging to another power receiving end may increase the priority for an XX-generator among thermal power generators in order to increase the ratio of power fed from the low-cost power supply. Therefore, there is a problem that if the priorities for the transmitting ends of the power system are all the same, it would be impossible to cope with the various power adjustment needs from a plurality of customers.

Further, since there is a limit on the maximum power that the power system can supply, it is necessary to give a higher priority to public customers such as transport facilities and medical facilities than that for other customers. However, if power supplied from a power supply source having a high priority to a certain customer is increased in response to a request from that customer, it would affect the requests for power adjustments from the other customers. Therefore, there is another object that it is necessary to take both the priorities for power supply among customers and the priorities for the power supply source in each customer into consideration in a comprehensive manner.

As a result of diligent studies, the inventors of the present application have successfully developed a technique for effectively adjusting power among a plurality of power cells while taking various situations into consideration in a comprehensive manner when a new power sell is provided.

First Exemplary Embodiment

FIG. 44 is a block diagram showing a configuration of a power network system 10C according to a first exemplary embodiment of the present invention. In the power network system 10C, power routers 81-84 and a central control device 52C are connected through a communication network 51. Further, the power router 81 is connected to a solar panel 33, a storage battery 35, and a power network 53 through legs 811, 812 and 813, respectively, so that power can be transmitted therebetween. Further, the power router 81 can transmit power among the legs 811-813 through a DC bus 810. The power router 82 is connected to a utility grid 11 and the power network 53 through legs 821 and 822, respectively, so that power can be transmitted therebetween. Further, the power router 82 can transmit power between the legs 821 and 822 through a DC bus 820. The power router 83 is connected to the power network 53 and a load 30A through legs 831 and 832, respectively, so that power can be transmitted therebetween. Further, the power router 83 can transmit power between the legs 831 and 832 through a DC bus 830. The power router 84 is connected to the power network 53, a load 30B, and a load 30C through legs 841, 842 and 843, respectively, so that power can be transmitted therebetween. Further, the power router 84 can transmit power among the legs 841-843 through a DC bus 840.

It is assumed that the other configuration of each of the power routers 81-84 is similar to that of the above-described power router 100 or the like. Further, the power supply sources connected to the power routers 81 and 82 are not limited to the above-described power supply sources. Further, the entities to which the power routers 83 and 84 are connected do not necessarily have to be loads. For example, they may be connected to external power routers or the like and may transmit received power to them.

Here, it is shown that the power routers 81-84 are connected to the above-described entities through the legs 813, 822, 831 and 841, which are their respective input/output end parts. Further, each of the legs 811, 812 and 821, which are connected to the power supply sources, may be called a "power transmitting end". In contrast to this, each of the legs 832, 842 and 843, which are connected to the loads, may be called a "power receiving end". Further, the only requirement for the power network system 10C according to the first exemplary embodiment of the present invention is that the power network system 10C includes at least two power transmitting ends and two power receiving ends. For example, the power router may be formed from the power router 81 (first power router) and the power router 84 (second power router). Alternatively, the leg 811 of the power router 81 and the leg 821 of the power router 82 may be used as power transmitting ends, and the leg 832 of the power router 83 and the leg 842 of the power router 84 may be used as power receiving ends.

That is, the power transmitting end is a terminal through which supply power supplied from one of a plurality of power supply sources is supplied to the second power router. Further, the power receiving end is a terminal which receives supply power supplied from each of the plurality of power transmitting ends through the DC bus and supplies the received power to one of a plurality of power demanders.

Figure 45:
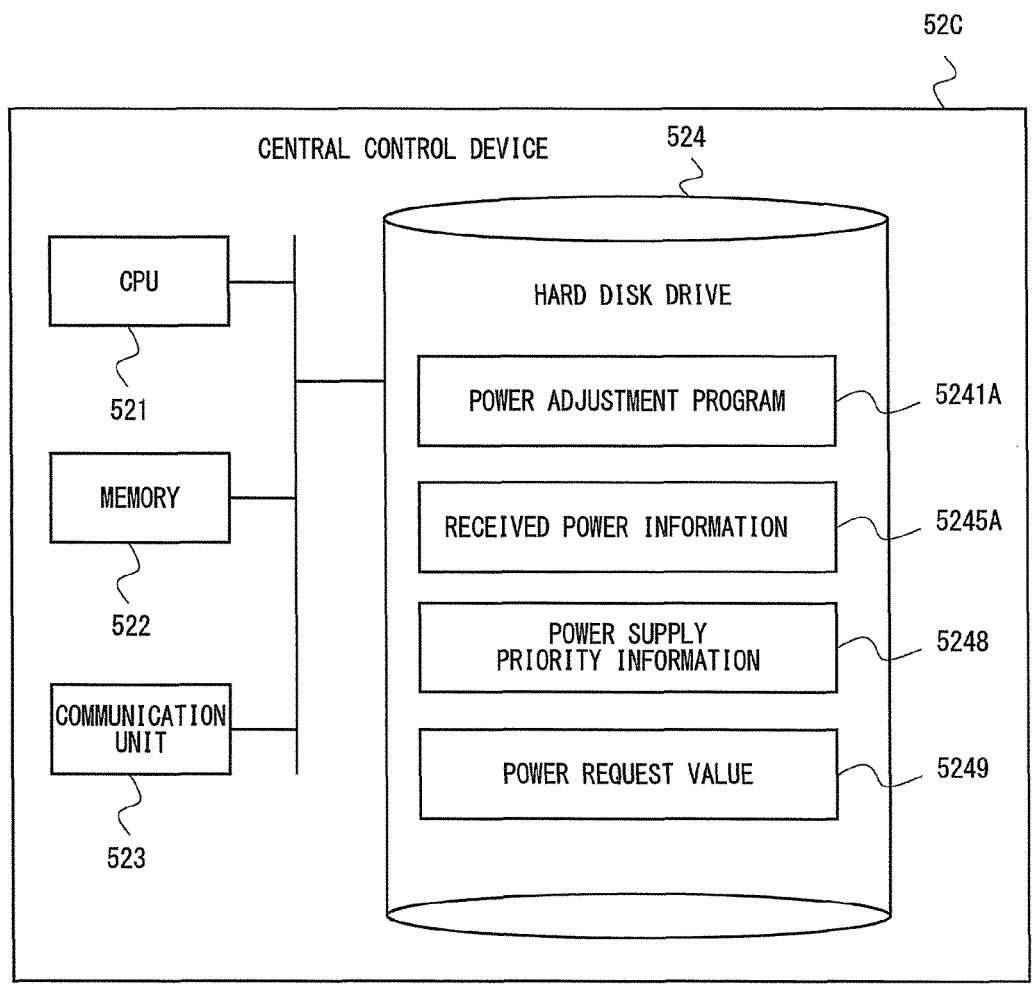
FIG. 45 is a block diagram showing a configuration of a central control device according to the first exemplary embodiment of the present invention.

FIG. 45 is a block diagram showing a configuration of the central control device 52C according to the first exemplary embodiment of the present invention. The central control device 52C includes a CPU 521, a memory 522, a communication unit 523, and a hard disk drive 524 similar to those of the above-described central control device 52B. Further, in the hard disk drive 524, a power adjustment program 5241A, received power information 5245A, power supply priority information 5248, power request value 5249, and so on are also stored. Note that in the case where the received power information 5245A is a power tag 5245, it is assumed that the other components in the hard disk drive 524 shown in FIG. 31 are also stored in the hard disk drive 524 but their illustration in the figure is omitted in FIG. 45.

The power adjustment program 5241A is a computer program in which a power adjustment process according to the first exemplary embodiment of the present invention (e.g., a later-described process shown in FIG. 47) is implemented.

The received power information 5245A is information including, for received power in a plurality of power receiving ends, at least identification information of each of the plurality of power transmitting ends and the value of supply power supplied from each of the power transmitting ends included in the received power. Further, the received power information 5245A is managed for each power receiving end. For example, the received power information 5245A may be obtained by having the central control device 52C collect those acquired by power routers including respective power receiving ends from those power routers and store therein. Further, received power information preferably includes, for each power transmitting end, attribute information in the supply source that supplies the power.

Note that attribute information is information including, for each power transmitting end, a plurality of attribute types and attribute values corresponding to the respective attributes types. Note that examples of the attribute type include a power supply type, a price, a power supply owner, and so on. Further, the attribute value corresponding to the power supply type is, for example, information indicating solar power, thermal power, nuclear power, or the like. The attribute value corresponding to the price is, for example, a purchase price of the power supply or the like. Further, the attribute value corresponding to the power supply owner is, for example, the identification information of the owner or the like.

Note that the received power information may be, for example, the above-described power information, the power tag, or the like. In such cases, the attribute information may be the above-described additional information. Therefore, each of the power routers 83 and 84 may acquire received power information in the legs 832, 842 and 843 by the above-described power identification technique.

The power supply priority information 5248 is information defining, for each power receiving end, a priority for determining the power transmitting end for which the adjustment of the power to be supplied to the power receiving end should be prioritized. For example, the power supply priority information 5248 may be identification information of a power transmitting end with a priority associated therewith. In such cases, it is preferable to set different priorities for when supply power is increased and when supply power is decreased. Alternatively, the power supply priority information 5248 may be information defining the priority of attribute information. That is, it may be information defining an index for determining the priority of a power transmitting end.

Figure 46:
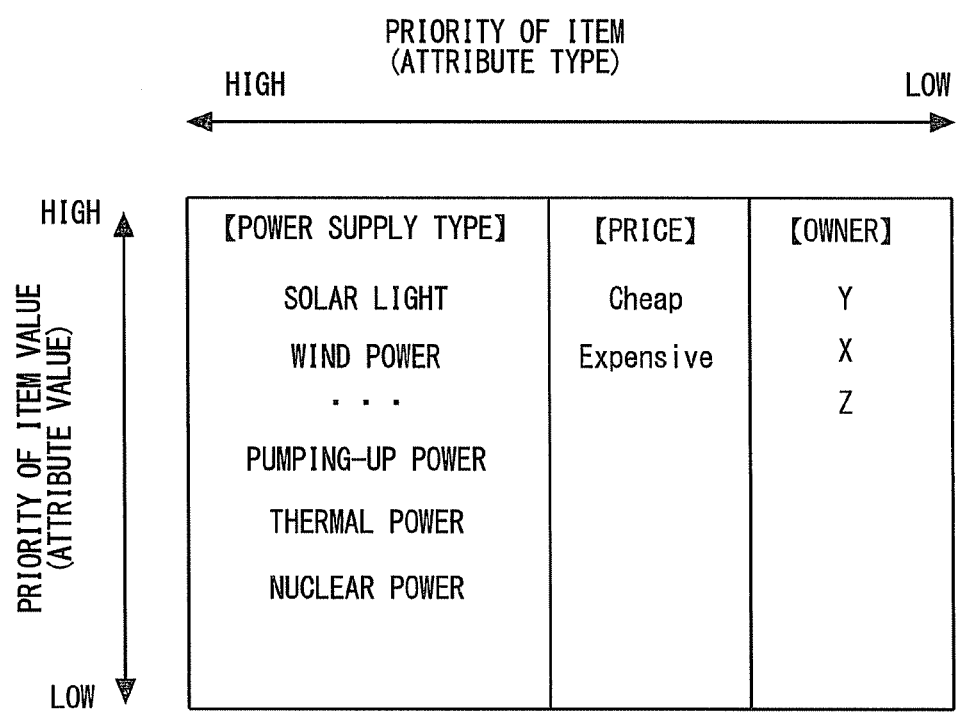
FIG. 46 shows an example of power supply priority information according to the first exemplary embodiment of the present invention.

FIG. 46 shows an example of the power supply priority information according to the first exemplary embodiment of the present invention. In this example, attribute types are defined as a "power supply type", a "price", and an "owner" in the descending order of their priorities. Further, in the case of the "power supply type", for example, "solar power", "wind power", . . . , "pumping-up power", "thermal power", and "nuclear power" are defined as the priorities of the attribute values in the descending order of their priorities.

Further, it is assumed that the power supply priority information 5248 includes information in the case where it is defined in such a manner that the priorities of the attribute types or the priorities of the attribute values differ among the plurality of power receiving ends. That is, the power supply priority information 5248 is independently defined for each power receiving end and managed in association with the power receiving end. This makes it possible to cope with the various needs of a plurality of customers.

Further, for the power supply priority information 5248, the priority of the item may be preferentially evaluated, for example, and then the priority of the value of the item may be evaluated. Note that although the power supply priority information 5248 is expressed by using two types of criteria, i.e., the priority of the item and the priority of the item value, it is not limited to such an example. For example, a predetermined coefficient may be assigned to each item. Then, for each power transmitting end, the value of each item may be multiplied with the coefficient and their total value may be used as a priority index.

The power supply priority information 5248 may be set by a power router including a respective power receiving end or may be set by the central control device 52C.

The power request value 5249 is a future received power request value in each power receiving end. That is, the power request value 5249 is a value individually set for each power receiving end. The power request value 5249 may be set by a power router including a respective power receiving end or may be collectively set by the central control device 52C. Further, the power request value 5249 may be manually set by a customer in each power receiving end. Further, received power may be measured in each power receiving end and the power request value 5249 may be calculated based on the measurement value or the like.

In the central control device 52C, the CPU 521 reads the OS, the power transmission control program 5241A, or the like stored in the memory 522 or the hard disk drive 524, and executes the read program or the like. In this way, the central control device 52C can function as a power adjustment unit (not shown) and carry out a power adjustment process and the like. Note that the power adjustment unit can acquire power supply priority information by having the CPU 521 of the central control device 52C read the power supply priority information 5248 from the hard disk drive 524. Alternatively, when the power supply priority information 5248 is not stored in advance in the hard disk drive 524, the power adjustment unit can acquire power supply priority information by externally receiving the power supply priority information.

Note that the power adjustment unit adjusts supply power supplied through a plurality of power transmitting ends according to the power request value 5249 requested in each of a plurality of power receiving ends. In particular, the power adjustment unit acquires the received power information 5245A for each of the plurality of power receiving ends. Then, the power adjustment unit determines, for each of the plurality of power receiving ends, a power transmitting end for which the supply power is adjusted from among the plurality of power transmitting ends based on the received power information 5245A acquired for each power receiving end and the priority defined in the power supply priority information 5248. Then, the power adjustment unit adjusts the supply power in the determined power transmitting end so that the power value received in each power receiving end becomes closer to the power request value.

Further, the power adjustment unit determines, for each of the plurality of power receiving ends, a power transmitting end having the highest priority from among the plurality of power transmitting ends based on the received power information 5245A and the power supply priority information 5248. Then, if the power value received in each power receiving end can still be brought closer to the power request value by the adjustment for the determined power transmitting end, the power adjustment unit determines a power transmitting end having the next highest priority from among the plurality of power transmitting ends. In other words, the power adjustment unit first adjusts, for each of the plurality of power receiving ends, the supply power of the determined power transmitting end having the highest priority based on the received power information 5245A and the power supply priority information 5248. Further, after this adjustment, the power adjustment unit determines the power transmitting end having the next highest priority as the power transmitting end for which the supply power is adjusted based on the received power information 5245A and the power supply priority information 5248.

Further, the power adjustment unit preferably refers to the power supply priority information 5248, specifies attribute information corresponding to a predetermined priority, refers to the received power information 5245A, and determines a power transmitting end corresponding to the specified attribute information.

Further, when the power adjustment unit externally receives the power request value 5249, the power adjustment unit may calculate the difference between the received power request value and the current received power value (i.e., the received power value at the present time). Then, when the difference is equal to or greater than a predetermined value, the power adjustment unit may adjust the supply power. Alternatively, the power adjustment unit may measure the current received power value in each power receiving end at a predetermined interval. Then, when the difference between the measured received power value and the power request value 5249 is equal to or greater than a predetermined value, the power adjustment unit may adjust the supply power.

Next, a power adjustment process according to the first exemplary embodiment of the present invention is explained. Firstly, as a precondition, the definitions of variables and criteria for evaluating conditions used in the following explanation are shown below.

s: power transmitting end (source)
d: power receiving end (destination)
p: priority index
D(d): difference value between power request value and current received power value in d
D(d)>0: received power value is increased
D(d)<0: received power value is decreased
S(d): power transmitting end for which power increase/decrease request is applied in d
P(d): current received power value of power that is transmitted from S(d) and received in d
R(d): increase/decrease request value for power that is transmitted from S(d) and received in d $$R(d)=R_+(d)+R_-(d)$$

R$_+$(d): increase request value for power that is transmitted from S(d) and received in d
R$_-$(d): decrease request value for power that is transmitted from S(d) and received in d
C(d): remaining power request value (remnant power request value, credit) in d
Initial value for C(d): |D(d)|
σ(s): total value of increase request value and decrease request value in s
Bl(s): transmitted power lower limit value in s
Bu(s): transmitted power upper limit value in s
G(s): transmitted power predetermined value in s (initialized to current transmitted power value)
U(d): increased/decreased amount determined value for power that is transmitted from S(d) and received at d
S(d, p): power transmitting end for which p-th priority index power increases/decreases at d is determined
U(d, p): p-th priority index power increased/decreased amount determined value in d Note that for the transmitted power lower limit value Bl(s), in such cases in which, for example, when the transmitted power decreases below this limit value, the operation could become a low-load operation because of the power generation efficiency and hence the generator has to be stopped, a value greater than zero is set to the limit value.

Figure 47:
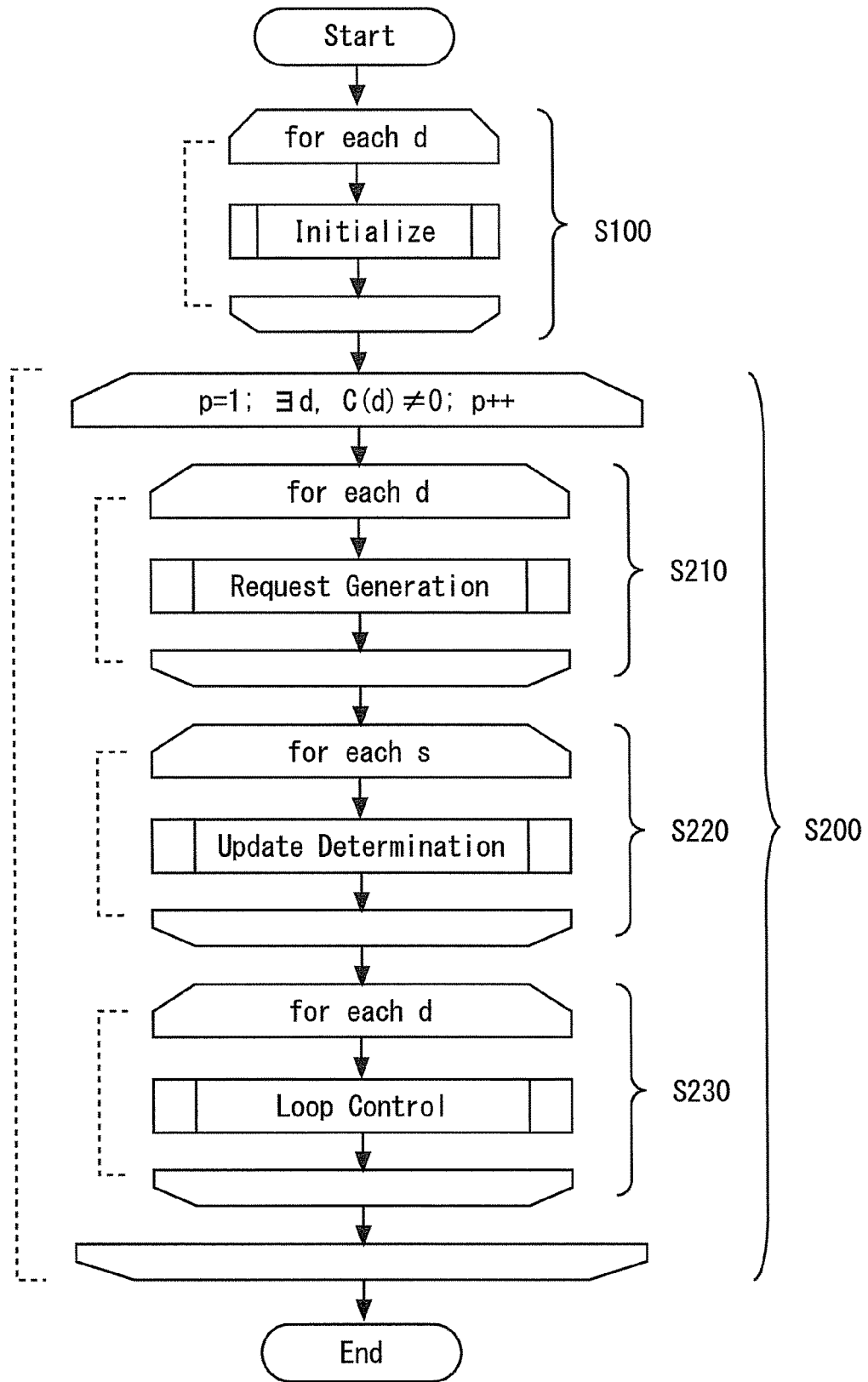
FIG. 47 is a flowchart showing an outline of a power adjustment process according to the first exemplary embodiment of the present invention.
Figure 48:
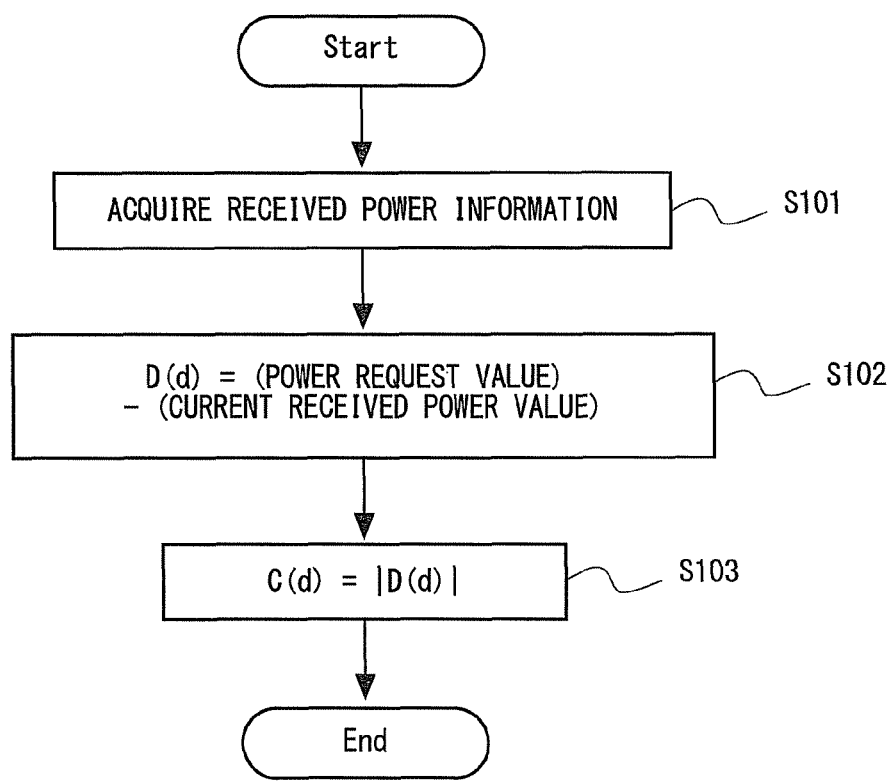
FIG. 48 is a flowchart showing an Initialize subroutine flow in the power adjustment process according to the first exemplary embodiment of the present invention.

FIG. 47 is a flowchart showing an outline of the power adjustment process according to the first exemplary embodiment of the present invention. Firstly, the central control device 52C executes an Initialize subroutine for each power receiving end d (S100). Here, FIG. 48 is a flowchart showing the Initialize subroutine flow in the power adjustment process according to the first exemplary embodiment of the present invention.

Firstly, the central control device 52C acquires received power information (s101). Specifically, the central control device 52C acquires received power information in the leg 832 from the power router 83 and acquires received power information in the legs 842 and 843 from the power router 84.

Next, the central control device 52C calculates a difference value D(d) between the power request value 5249 and the current received power value (i.e., the received power value at the present time) (S102). Specifically, the central control device 52C reads the power request value 5249 in each power receiving end from the hard disk drive 524. Then, the central control device 52C extracts the current received power value included in the received power information 5245A in each power receiving end. After that, the central control device 52C calculates the value D(d) by the below-shown Expression (1). That is, the central control device 52C obtains the excess/deficiency of the power in each power receiving end by calculating the difference value.

$$D(d)=(\text{Power request value})-(\text{Current received power value}) \quad (1)$$

Further, the central control device 52C initializes the remnant power request value C(d) by the below-shown Expression (2) (S103).

$$C(d)=|D(d)| \quad (2)$$

Referring to FIG. 47 again, the central control device 52C calculates increase/decrease power while decreasing the priority to be processed by one at a time until all the remnant power request values C(d) become zero (S200). That is, the central control device 52C performs steps S210, S220 and S230 for each of the priorities to be processed.

Figure 49:
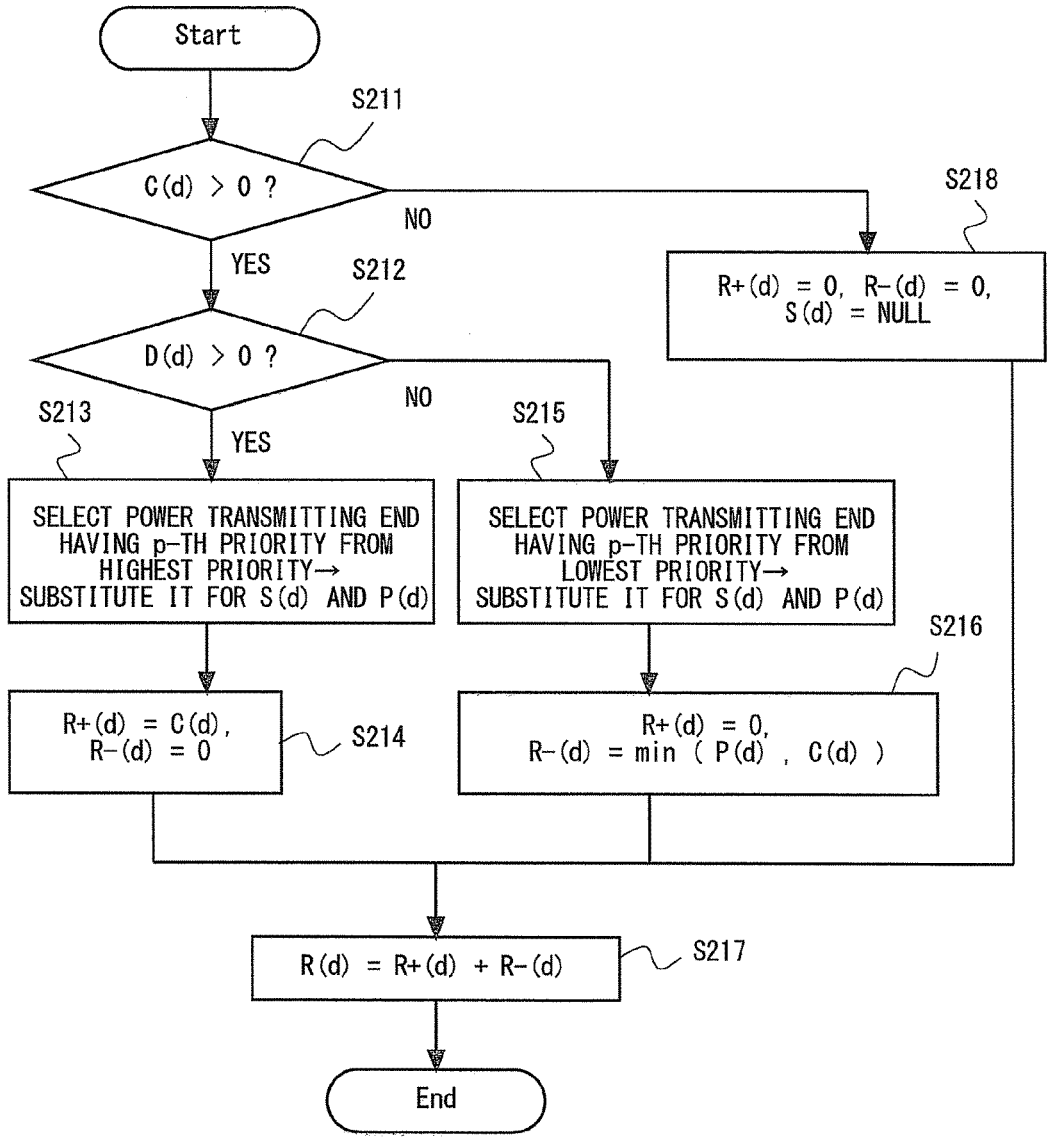
FIG. 49 is a flowchart showing a Request Generation subroutine flow in the power adjustment process according to the first exemplary embodiment of the present invention.

Firstly, the central control device 52C executes a Request Generation subroutine for each power receiving end d (S210). Here, FIG. 49 is a flowchart showing the Request Generation subroutine flow in the power adjustment process according to the first exemplary embodiment of the present invention.

Firstly, the central control device 52C determines whether the received power should be increased beyond C(d) and D(d) or decreased below C(d) and D(d). That is, the central control device 52C determines whether C(d) is positive or not (S211). When C(d) is not positive, there is no need to change the received power. Therefore, each variable is cleared (i.e., set) to zero or NULL by the below-shown Expression (3).

$$R_+(d)=0, R_-(d)=0, S(d)=\text{NULL} \quad (3)$$

On the other hand, when C(d) is positive in the step S211, the central control device 52C determines whether D(d) is positive or not (S212). When D(d) is determined to be greater than zero in this step, it is determined to be an increase request. Therefore, the central control device 52C selects the power transmitting end having the p-th priority as counted from the highest priority and substitutes the selected power transmitting end for S(d) and P(d) (S213). Specifically, the central control device 52C specifies the attribute information having the p-th priority from the highest priority in the power supply priority information 5248 corresponding to the power receiving end to be processed and determines the power transmitting end corresponding to the specified attribute information among the power transmitting ends included in the received power information 5245A in the power receiving end to be processed. Then, the identification information of the determined power transmitting end is substituted for S(d) and the received power value from the determined power transmitting end included in the received power information 5245A is substituted for P(d). For example, assuming that the power supply priority information 5248 corresponding to a given power receiving end is the one shown in FIG. 46, the central control device 52C first evaluates the items in the descending order of their priorities. That is, the central control device 52C evaluates the items in the priority order of the "power supply type", the "price", and the "owner". Then, the central control device 52C evaluates the item values in each item in the descending order of their priorities. That is, the difference in the power supply type in the power transmitting ends is evaluated more preferentially than any other items. Further, when the power supply types are the same as each other, a higher priority is given to the power transmitting end having a lower price. Further, when the prices are the same as each other, the power transmitting end is evaluated based on the difference in the owners. Therefore, the central control device 52C gives the highest priority to the "solar power" among the item values of the power supply type. Accordingly, the central control device 52C determines (i.e., selects) the power transmitting end whose "power supply type" is the "solar power" among the power transmitting ends included in the received power information 5245A in the power receiving end. Further, there are cases where other power receiving ends have different corresponding power supply priority information 5248. Therefore, there are cases where although power is received from a common power transmitting end, the power transmitting end having the highest priority differs among the power receiving ends.

Next, the central control device 52C sets an increase request value and a decrease request value by the below-shown Expression (4) (S214).

$$R_+(d)=C(d), R_-(d)=0 \quad (4)$$

Meanwhile, when D(d) is smaller than zero in the step S212, it is determined to be a decrease request. Therefore, the central control device 52C selects the power transmitting end having the p-th priority as counted from the lowest priority and substitutes the selected power transmitting end for S(d) and P(d) (S215). Specifically, the central control device 52C specifies the attribute information having the p-th priority from the lowest priority in the power supply priority information 5248 corresponding to the power receiving end to be processed and determines the power transmitting end corresponding to the specified attribute information among the power transmitting ends included in the received power information 5245A in the power receiving end to be processed. Then, the identification information of the determined power transmitting end is substituted for S(d) and the received power value from the determined power transmitting end included in the received power information 5245A is substituted for P(d). For example, assuming that the power supply priority information 5248 corresponding to a given power receiving end is the one shown in FIG. 46, the central control device 52C first evaluates the items in the ascending order of their priorities. That is, the central control device 52C evaluates the items in the priority order of the "owner", the "price", and the "power supply type". Then, the central control device 52C evaluates the item values in each item in the ascending order of their priorities. That is, the power transmitting end whose owner is "Z" is evaluated as the lowest order. Further, when the owners are the same as each other, a higher priority is given to the power transmitting end having a higher price. Further, when the prices are the same as each other, the power transmitting end is evaluated based on the difference in the power supply type. That is, the evaluation order for the power supply priority information 5248 is reversed depending on the positive/negative of the difference value D(d). Further, similarly to the previously-described example, since the definition of the power supply priority information 5248 differs among the different power receiving ends, the power transmitting end having the lowest priority differs among the power receiving ends.

Next, the central control device 52C sets an increase request value and a decrease request value by the below-shown Expression (5) (S216).

$$R_+(d)=0,$$

$$R_-(d)=\min(P(d),C(d)) \tag{5}$$

It is assumed in this example that the smaller one of the power P(d) from the selected S(d) and the remnant power request value C(d) is used as the decrease request value $R_-(d)$.

After the step S214, S216, or S218, the central control device 52C calculates the request value R(d) by the the below-shown Expression (6) (S217).

$$R(d)=R_+(d)+R_-(d) \tag{6}$$

Figure 50:
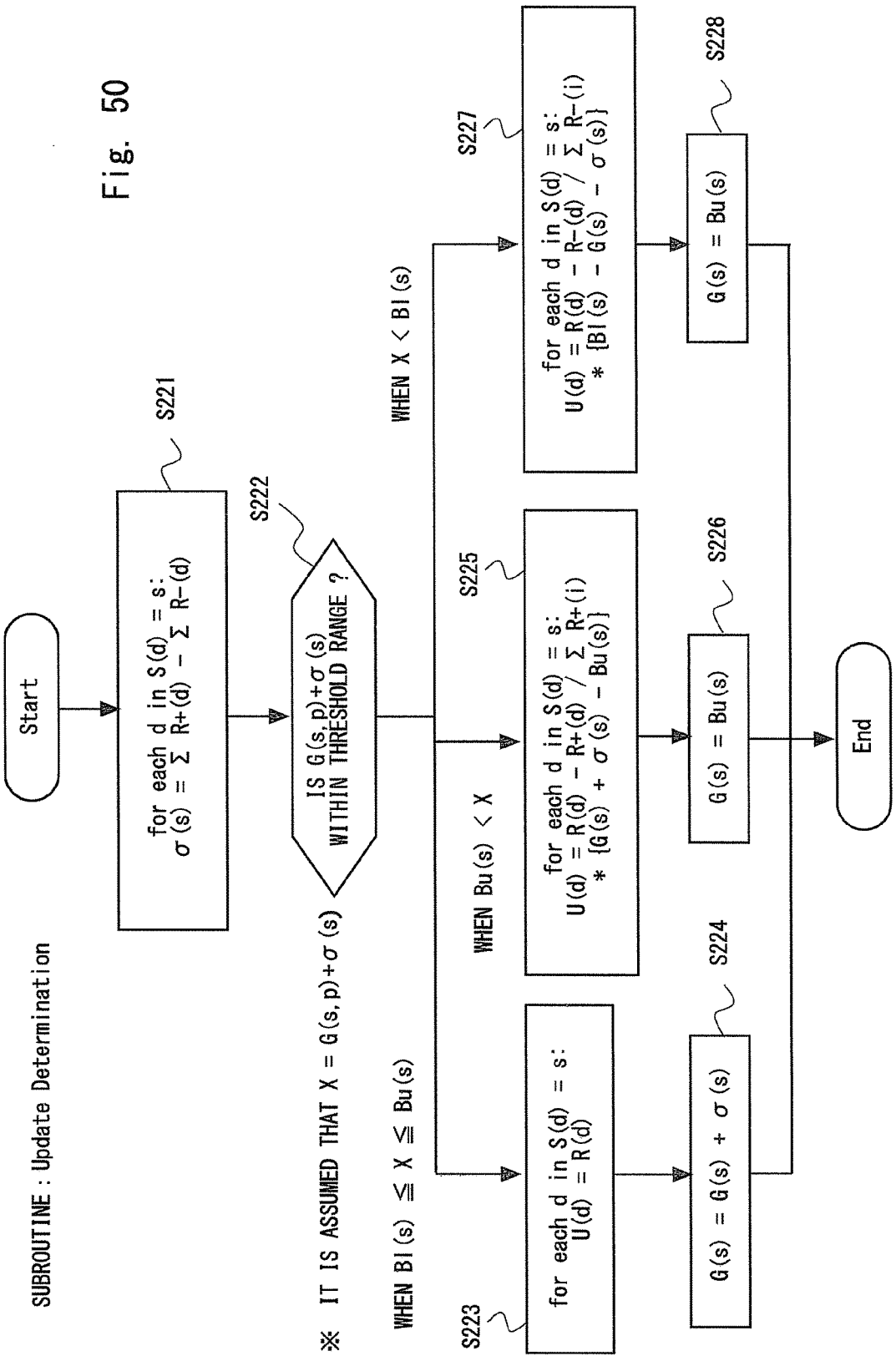
FIG. 50 is a flowchart showing an Update Determination subroutine flow in the power adjustment process according to the first exemplary embodiment of the present invention.

Referring to FIG. 47 again, the central control device 52C next performs an Update Determination subroutine for each power transmitting end s (S220). Here, FIG. 50 is a flowchart showing the Update Determination subroutine flow in the power adjustment process according to the first exemplary embodiment of the present invention. As a precondition, it is assumed that the transmitted power predetermined value G(s) has already been initialized to the current transmitted power value in the power transmitting terminal s.

Firstly, the central control device 52C calculates the sum total σ(s) of the power request values for each power transmitting end s (S221). Specifically, the central control device 52C calculates the sum total of the increase request values and the sum total of the decrease request values of all the power receiving ends d for which the power transmitting end is the power transmitting end s by the below-shown Expression (7).

$$\sigma(s)=\Sigma R_+(d)-\Sigma R_-(d) \tag{7}$$

Next, the central control device 52C calculates the increased/decreased amount determined value U(d) based on the excess/deficiency of the power generating capacity. That is, the central control device 52C determines the increased/decreased amount determined value U(d) by using the upper/lower limit values for the transmitted power in the power transmitting end s as thresholds. Therefore, the central control device 52C determines whether the value "G(s, p)+σ(s)" is within the threshold range or not (S222).

Here, when the below shown Expression (8) holds in the step S222, the central control device 52C sets the increased/decreased amount determined value U(d) by the below-shown Expression (9) for all the power receiving ends d for which the power transmitting end is the power transmitting end s (S223). That is, when the value "G(s, p)+σ(s)" is within the upper/lower limit range, the update value is set to a value exactly equal to the request value.

$$Bl(s) \leq G(s)+\sigma(s) \leq Bu(s) \tag{8}$$

$$U(d)=R(d) \tag{9}$$

Then, the central control device 52C updates the transmitted power predetermined value G(s) by the below-shown Expression (10) (S224).

$$G(s)=G(s)+\sigma(s) \tag{10}$$

Further, when the below shown Expression (11) holds in the step S222, the central control device 52C sets the increased/decreased amount determined value U(d) by the below-shown Expression (12) for all the power receiving ends d for which the power transmitting end is the power transmitting end s (S225). That is, when the value "G(s, p)+σ(s)" exceeds the upper limit, the increased/decreased amount determined value U(d) is set to a value that is obtained by subtracting the product of the "amount by which the value "G(s, p)+σ(s)" is greater than the upper limit" and the "weight calculated based on the increase request value" from the increase/decrease request value R(d).

$$Bu(s)<G(s)+\sigma(s) \tag{11}$$

$$U(d)=R(d)-R_+(d)/\Sigma R_+(i)*\{G(s)+\sigma(s)-Bu(s)\} \tag{12}$$

Then, the central control device 52C updates the transmitted power predetermined value G(s) by the below-shown Expression (13) (S226).

$$G(s)=Bu(s) \tag{13}$$

Further, when the below shown Expression (14) holds in the step S222, the central control device 52C sets the increased/decreased amount determined value U(d) by the below-shown Expression (15) for all the power receiving ends d for which the power transmitting end is the power transmitting end s (S227). That is, when the value "G(s, p)+σ(s)" is below the lower limit, the increased/decreased amount determined value U(d) is set to a value that is obtained by subtracting the product of the "amount by which the value "G(s, p)+σ(s)" is smaller than the the lower limit" and the "weight calculated based on the decrease request value" from the increase/decrease request value R(d).

$$G(s)+\sigma(s)<Bl(s) \tag{14}$$

$$U(d)=R(d)-R_-(d)/\Sigma R_-(i)*\{Bl(s)-G(s)-\sigma(s)\} \tag{15}$$

Then, the central control device 52C updates the transmitted power predetermined value G(s) by the below-shown Expression (16) (S228).

$$G(s)=Bl(s) \tag{16}$$

That is, in the Update Determination subroutine, even when the value "G(s, p)+σ(s)" exceeds the threshold range, its upper limit value or lower limit value is used as an adjustment value and the amount by which the value "G(s, p)+σ(s)" exceeds the threshold range is adjusted in the next priority process.

Figure 51:
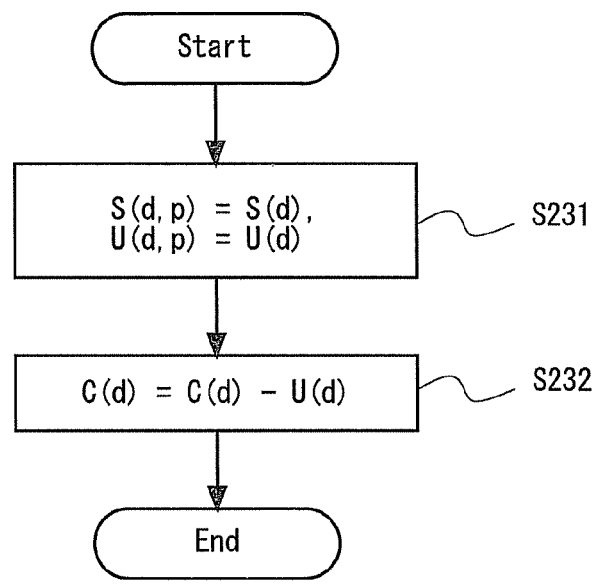
FIG. 51 is a flowchart showing a Loop Control subroutine flow in the power adjustment process according to the first exemplary embodiment of the present invention.

Referring to FIG. 47 again, the central control device 52C next performs a Loop Control subroutine for each power receiving end d (S230). Here, FIG. 51 is a flowchart showing the Loop Control subroutine flow in the power adjustment process according to the first exemplary embodiment of the present invention.

Firstly, the central control device 52C calculates increase/decrease power and its power transmitting end by the below-shown Expression (17) (S231). That is, for the p-th priority, the power transmitting end S(d, p) for which the power increase/decrease has been determined and the power increased/decreased amount determined value U(d, p) are set.

$$S(d,p)=S(d),U(d,p)=U(d) \tag{17}$$

Further, the central control device 52C subtracts an amount equivalent to the increased/decreased amount determined value U(d) from the remnant power request value C(d) and thereby updates the remnant power request value C(d).

$$C(d)=C(d)-U(d) \tag{18}$$

After that, when all the remnant power request values C(d) become zero, the central control device 52C changes the output power value of each power transmitting end based on the power transmitting end S(d, p) and the power increased/decreased amount determined value U(d, p). In this way, the power supplied to each power receiving end is adjusted.

Further, the above-described power adjustment process can also be expressed as follows. That is, the power adjustment unit calculates, for each of a plurality of power receiving ends, a difference between the current received power value and the power request value, selects a priority to be processed in the descending order from the highest priority to the lowest priority based on the power supply priority information, performs an adjustment process every time the priority to be processed is selected until the difference is cancelled out, and adjusts the supply power in each power transmitting end based on the adjustment value of the supply power determined by the adjustment process.

Note that in the adjustment process, the power transmitting end corresponding to the priority to be processed among the power transmitting ends included in the received power information is specified for each of the plurality of power receiving ends. Then, the power value supplied from the specified power transmitting end included in the current received power value is specified based on the received power information and this specified power value is set as an increase/decrease request value for the specified power transmitting end. Then, a total increase/decrease request value is calculated by summing up the increase/decrease request value sets for each power transmitting end. Then, it is determined whether or not the total value of the current supply power value and the total increase/decrease request value in each power transmitting end is within a predetermined threshold range. In this process, when the total value is determined to be within the threshold range, the increase/decrease request value set for each power transmitting end is determined as the adjustment value of the supply power for the power transmitting end for which the determination is made. On the other hand, when the total value is determined to be outside the threshold range, the increase/decrease request value set for each power transmitting end is corrected so that it falls within the threshold range and the corrected increase/decrease request value is determined as the adjustment value of the supply power for the power transmitting end for which the determination is made.

Figure 52:
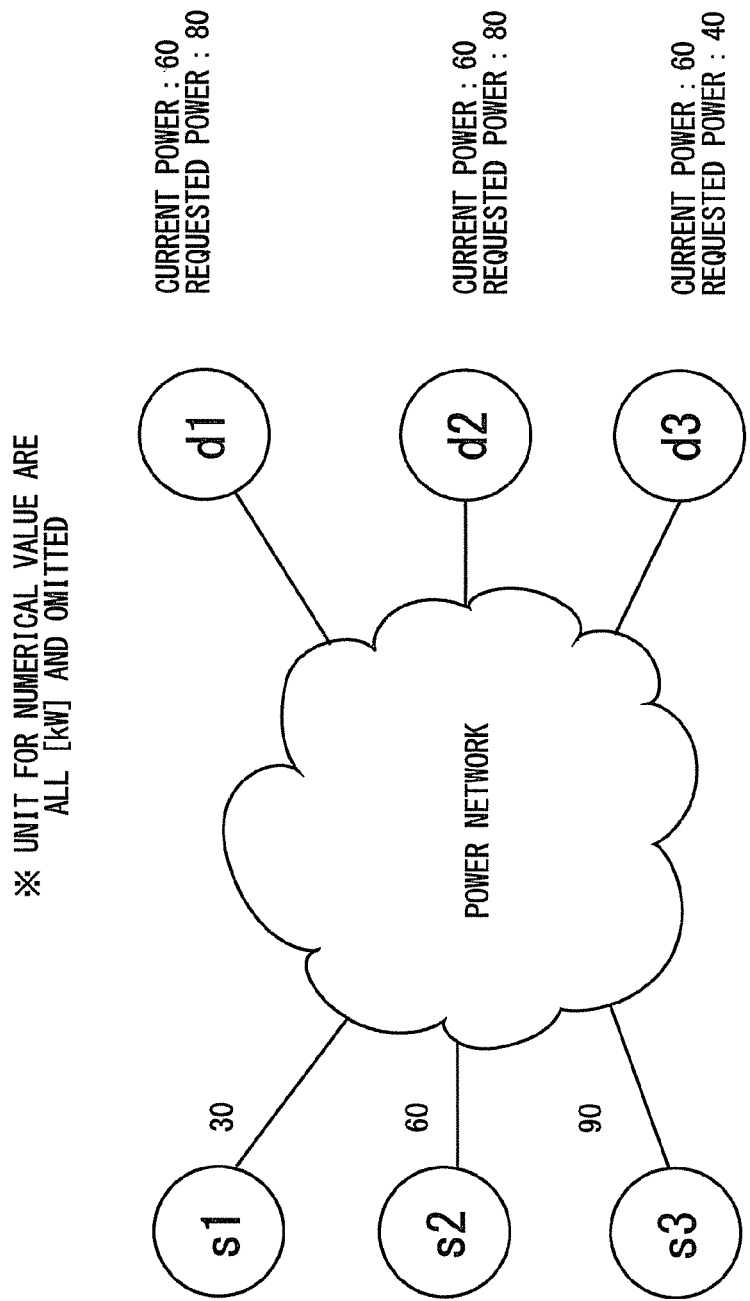
FIG. 52 shows an example of a power adjustment according to the first exemplary embodiment of the present invention.

Next, examples of the power adjustment according to the first exemplary embodiment of the present invention are explained with reference to FIGS. 52 to 64. Note that the unit for all the numerical values in FIGS. 52 to 62 is "kW" and the illustration of the unit "kW" is omitted in the figures. Further, the term "power network" in FIGS. 52 to 62 means the power network 53. In this example, power is adjusted in a state where power is transmitted from power transmitting ends s1 to s3 to power receiving ends d1 to d3 through the power network 53. Firstly, as shown in FIG. 52, 30 kW, 60 kW and 90 kW are supplied from the power transmitting ends s1, s2 and s3, respectively, to the power network 53. Further, each of the power receiving ends d1 to d3 receives 60 kW through the power network 53. It is assumed that the requested powers in the power receiving ends d1, d2 and d3 are "80", "80" and "40", respectively.

Figure 53:
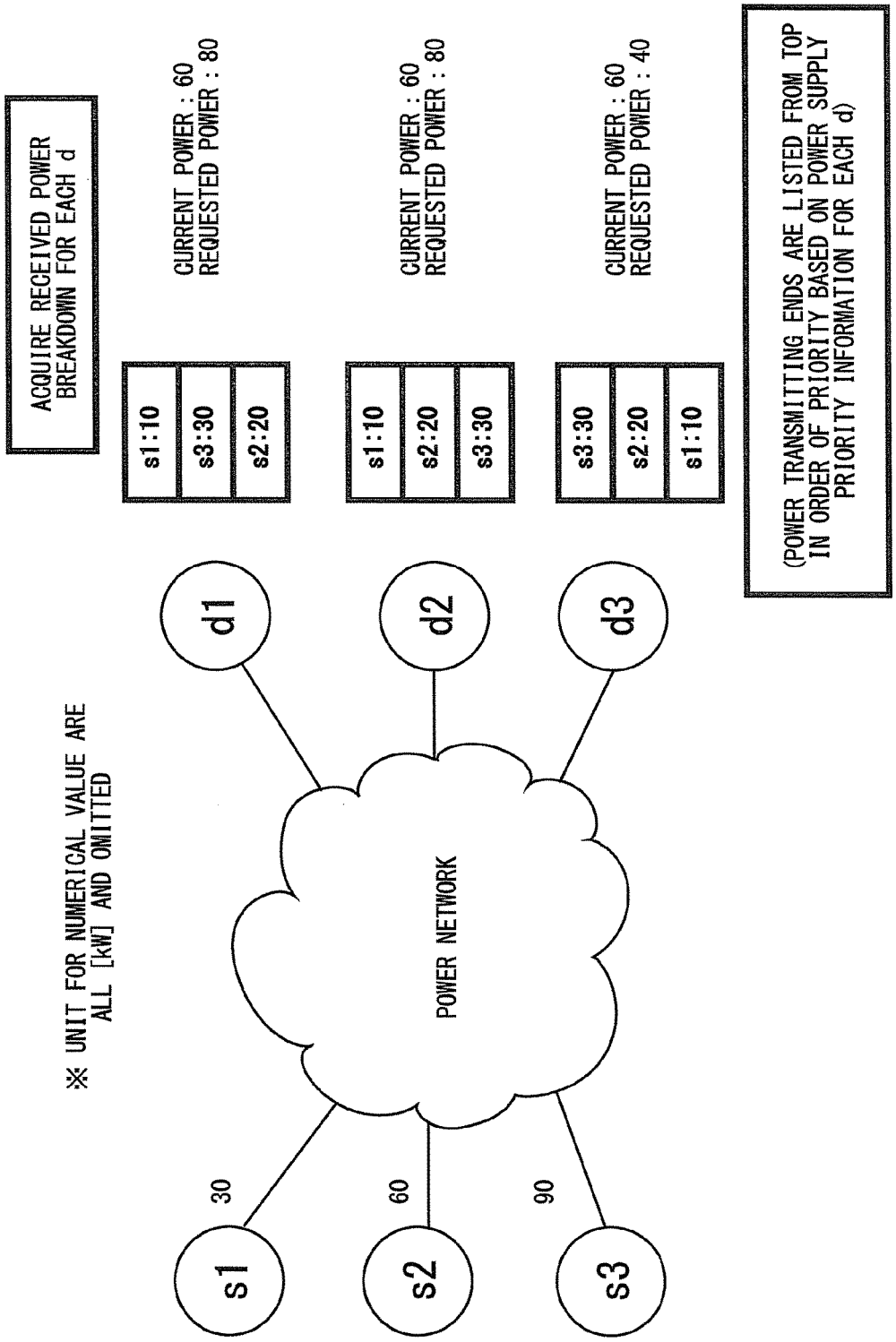
FIG. 53 shows an example of a power adjustment according to the first exemplary embodiment of the present invention.
Figure 54:
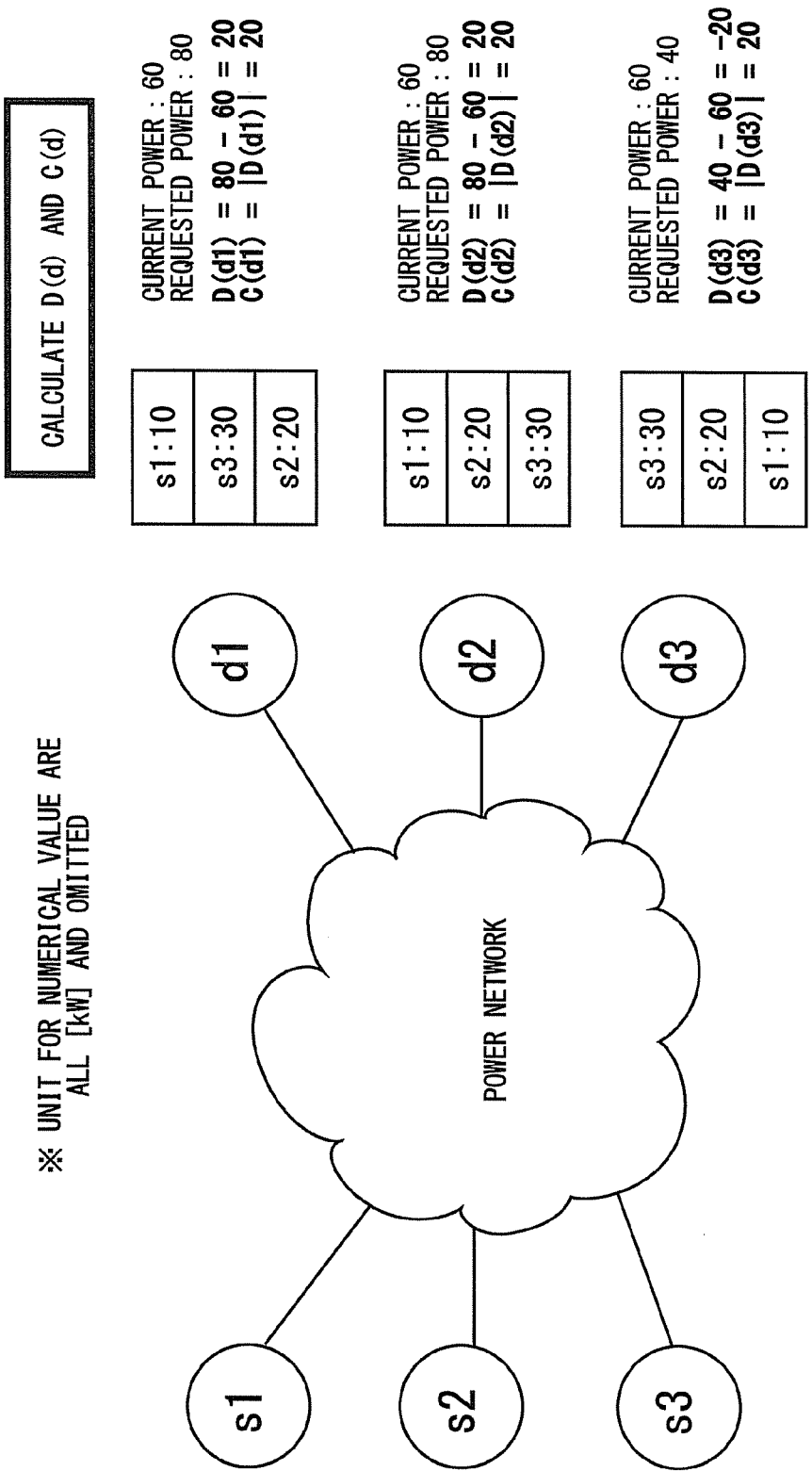
FIG. 54 shows an example of a power adjustment according to the first exemplary embodiment of the present invention.

Next, as shown in FIG. 53, each of the power receiving ends d1 to d3 receives received power information, which is the breakdown of the received power (S101 in FIG. 48). That is, each receiving end receives its received power breakdown. Note that in FIG. 53, in each power receiving end, breakdown power for each power transmitting end is shown in accordance with the priority defined in a priority table (power supply priority information 5248). That is, in FIG. 53, for each power receiving end, power transmitting ends are listed from the top in their priority order based on the power supply priority information 5248 and numerical values written on the right side of the listed power transmitting ends indicate the current received power values. Further, as shown in FIG. 54, the central control device 52C calculates D(d) and C(d) for each of the power receiving ends d1 to d3 (S102 and S103 in FIG. 48).

Figure 55:
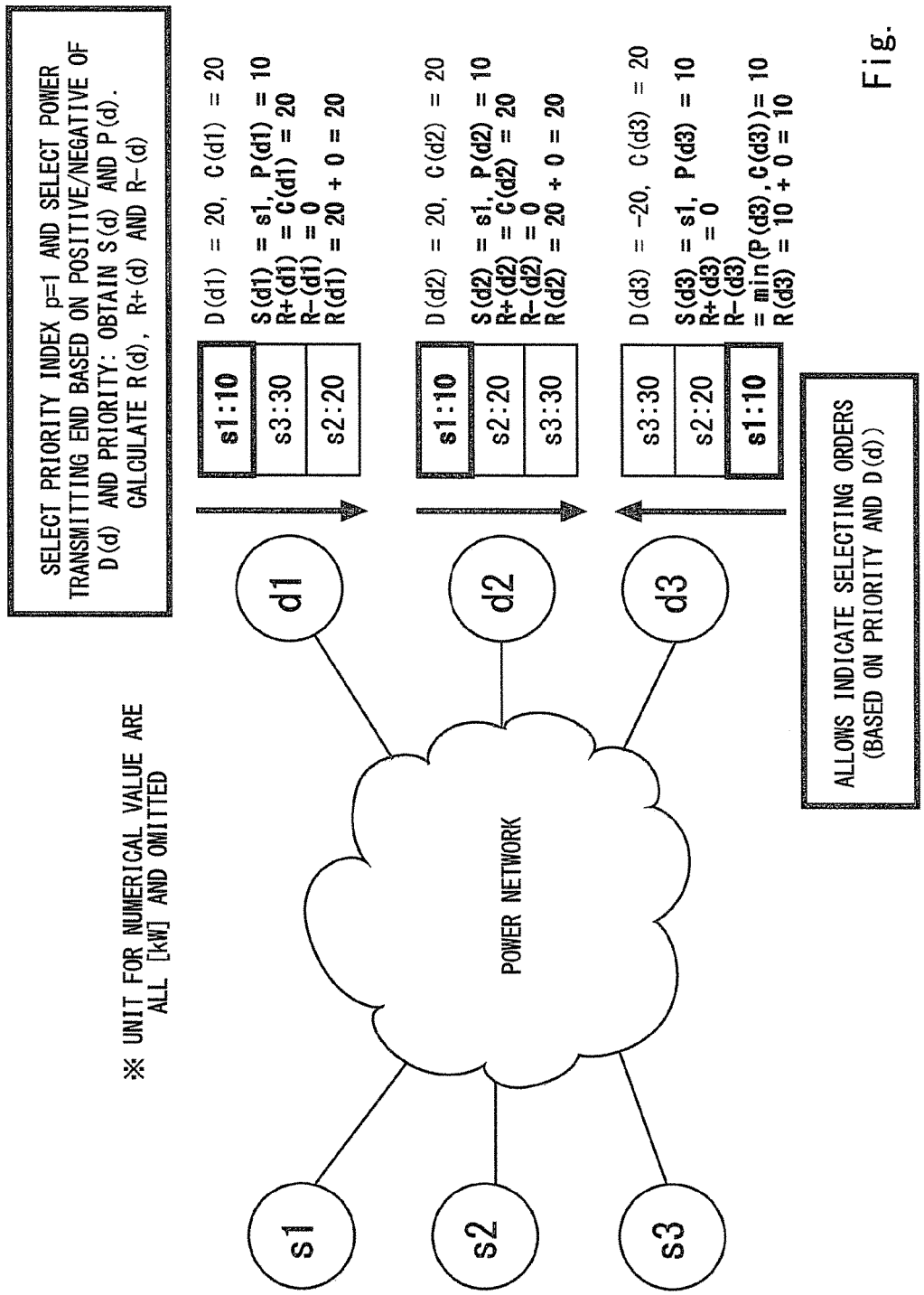
FIG. 55 shows an example of a power adjustment according to the first exemplary embodiment of the present invention.

Here, the central control device 52C selects a priority index p=1 as the priority to be processed. Then, the central control device 52C selects a power transmitting end based on the positive/negative of D(d) and the priority p=1, obtains S(d) and P(d), and calculates R(d), R$_+$(d), and R$_-$(d) (S212 to S217 in FIG. 49, and FIG. 55). As shown in FIG. 55, since D(d1) and D(d2) are positive (20) for the power receiving ends d1 and d2, the central control device 52C selects the power transmitting end s1 having the highest priority in each of the power receiving ends d1 and d2. Meanwhile, since D(d3) is negative (−20) for the power receiving end d3, the central control device 52C selects the power transmitting end s1 having the lowest priority in the power receiving end d3. Note that vertical arrows in FIGS. 55-61 and 63 indicate selecting orders for the power transmitting ends based on the priorities and D(d1).

Figure 56:
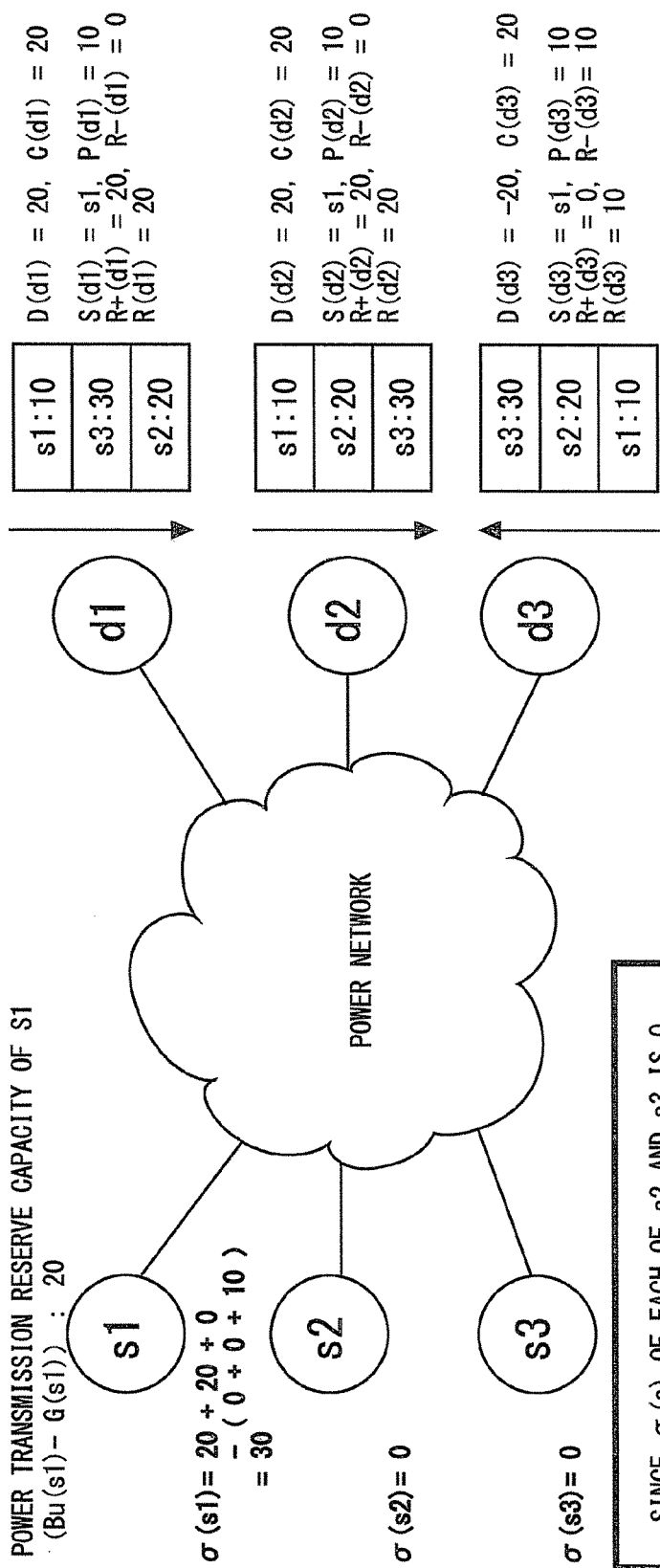
FIG. 56 shows an example of a power adjustment according to the first exemplary embodiment of the present invention.

After that, as shown in FIG. 56, the central control device 52C calculates σ(d) (S221 in FIG. 50). It is assumed that at this point, the power transmission reserve capacity (Bu(s1)-G(s1)) of the power transmitting end s1 is 20 kW. Note that since σ(s) of each of the power transmitting ends s2 and s3 is zero, all the requests are accepted (however, since the requests are empty sets, no process is actually performed). Therefore, a case where s=s1 is shown in the figures and explained hereinafter.

Figure 57:
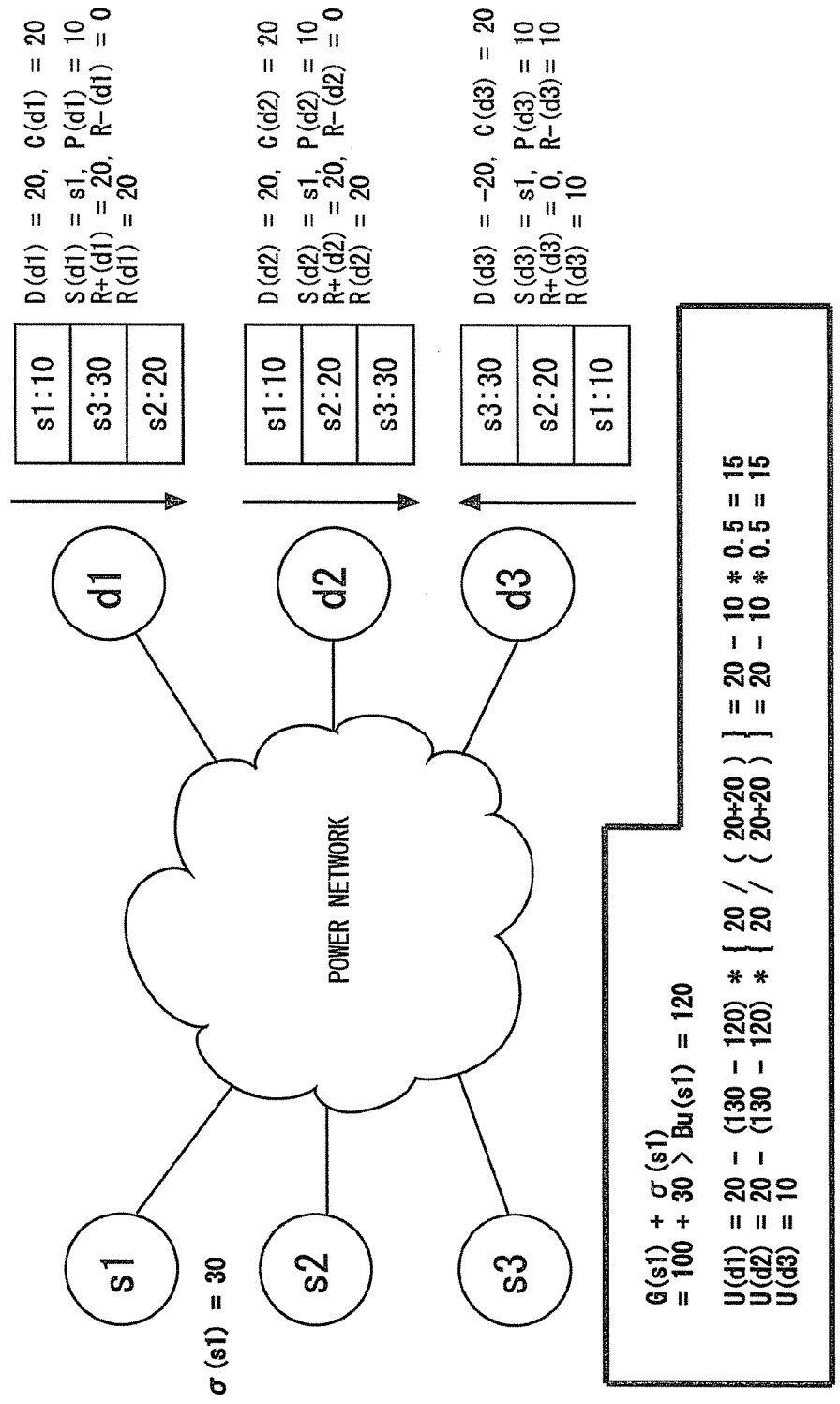
FIG. 57 shows an example of a power adjustment according to the first exemplary embodiment of the present invention.
Figure 58:
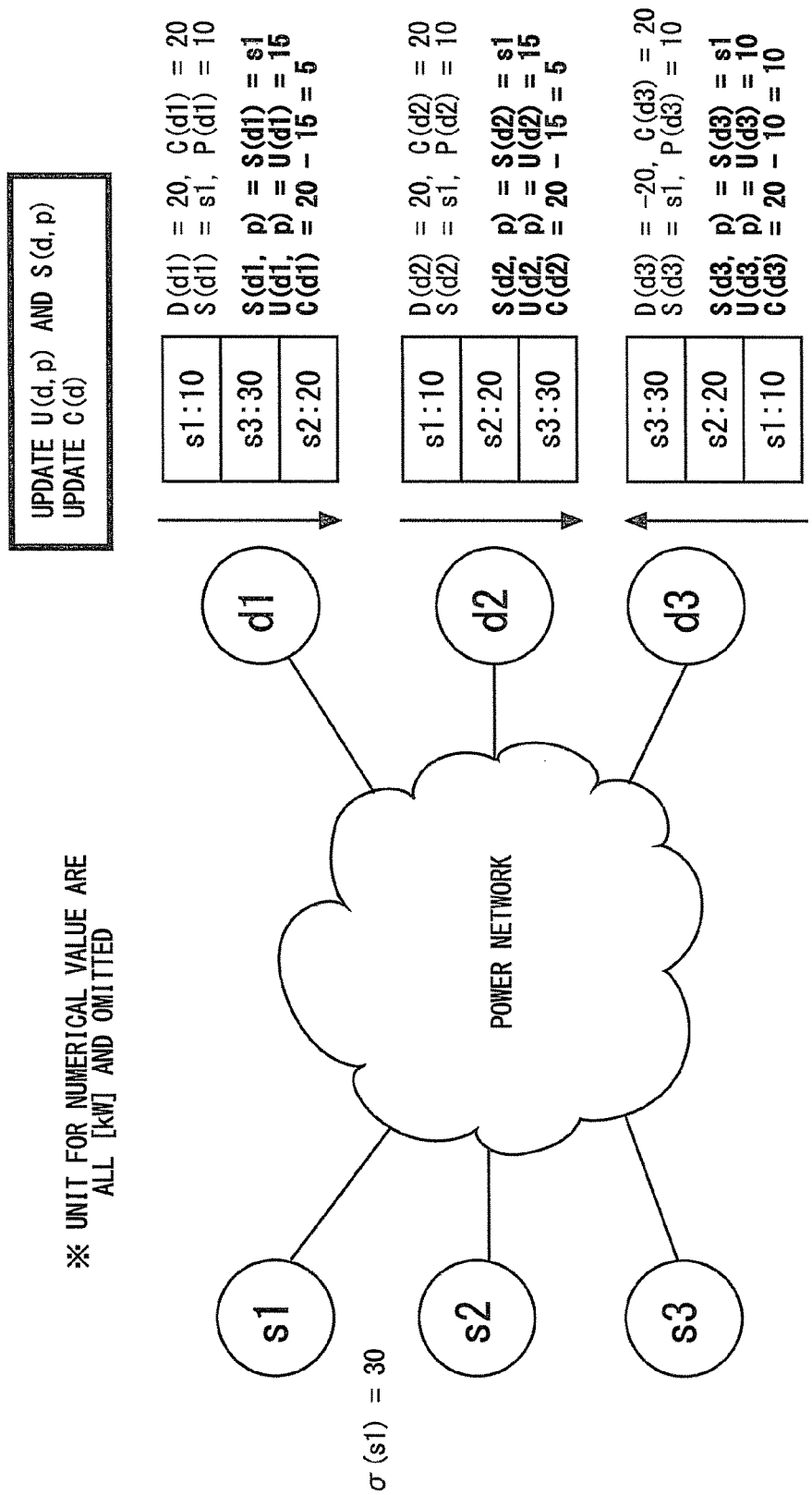
FIG. 58 shows an example of a power adjustment according to the first exemplary embodiment of the present invention.

Then, as shown in FIG. 57, the central control device 52C obtains an increased/decreased amount determined value U(d) based on the value "G(s)+σ(s)" (S222 and S225 in FIG. 50). That is, since the value "G(s1)+σ(s1)=130" in the power transmitting end s1 is greater than the threshold (transmitted power upper limit value "Bu(s1)=120"), the central control device 52C calculates as U(d1)=15, U(d2)=15, and U(d3)=10 (FIG. 57). After that, as shown in FIG. 58, the central control device 52C updates the power transmitting end S(d, p) for which the power increased/decreased amount determined value U(d, p) and the power increase/decrease have been determined, and updates the remnant power request value C(d) (S231 and S232 in FIG. 51).

Figure 59:
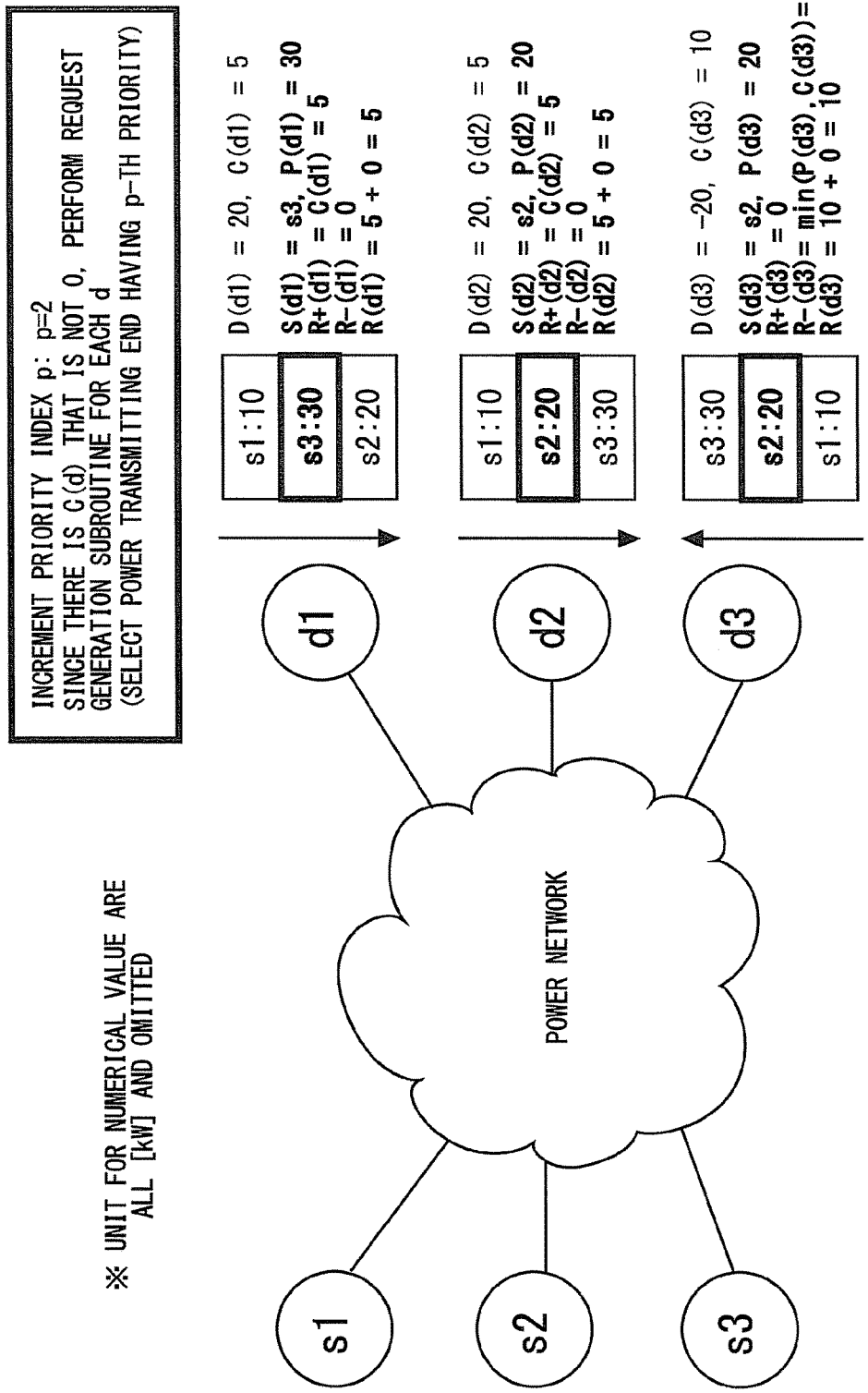
FIG. 59 shows an example of a power adjustment according to the first exemplary embodiment of the present invention.

Next, as shown in FIG. 59, the central control device 52C increments the priority index p and thereby sets the priority index as p=2. Then, since there is a power request value C(d) that is not zero, the central control device 52C performs the Request Generation subroutine for each of the power receiving ends d1 to d3 again (S210 in FIG. 47). In this process, the central control device 52C selects the power transmitting end having the second priority, i.e., the priority p=2. That is, the central control device 52C selects the power transmitting end s3 for the power receiving end d1, selects the power transmitting end s2 for the power receiving end d2, and selects the power transmitting end s2 for the power receiving end d3. Then, S(d),P(d), R$_+$(d), R$_-$(d) and R(d) are calculated (FIG. 49).

Figure 60:
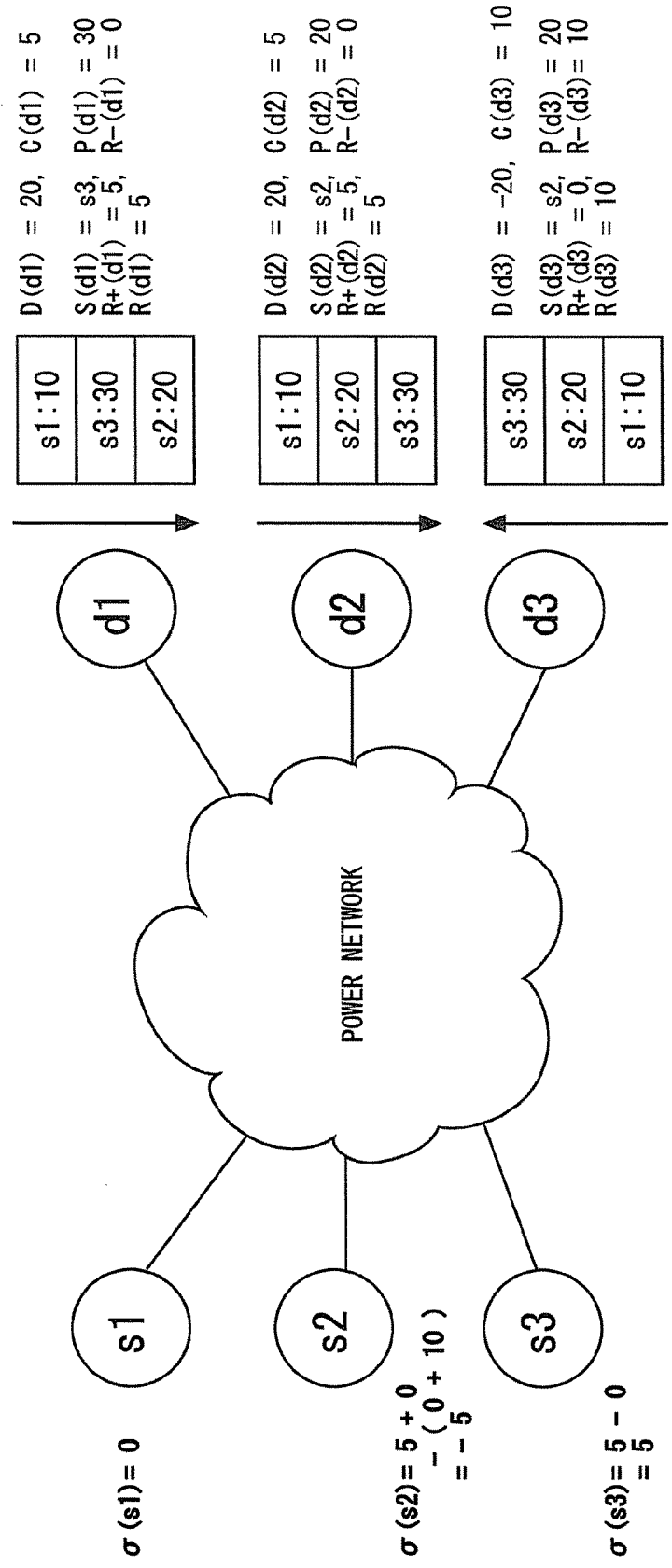
FIG. 60 shows an example of a power adjustment according to the first exemplary embodiment of the present invention.
Figure 61:
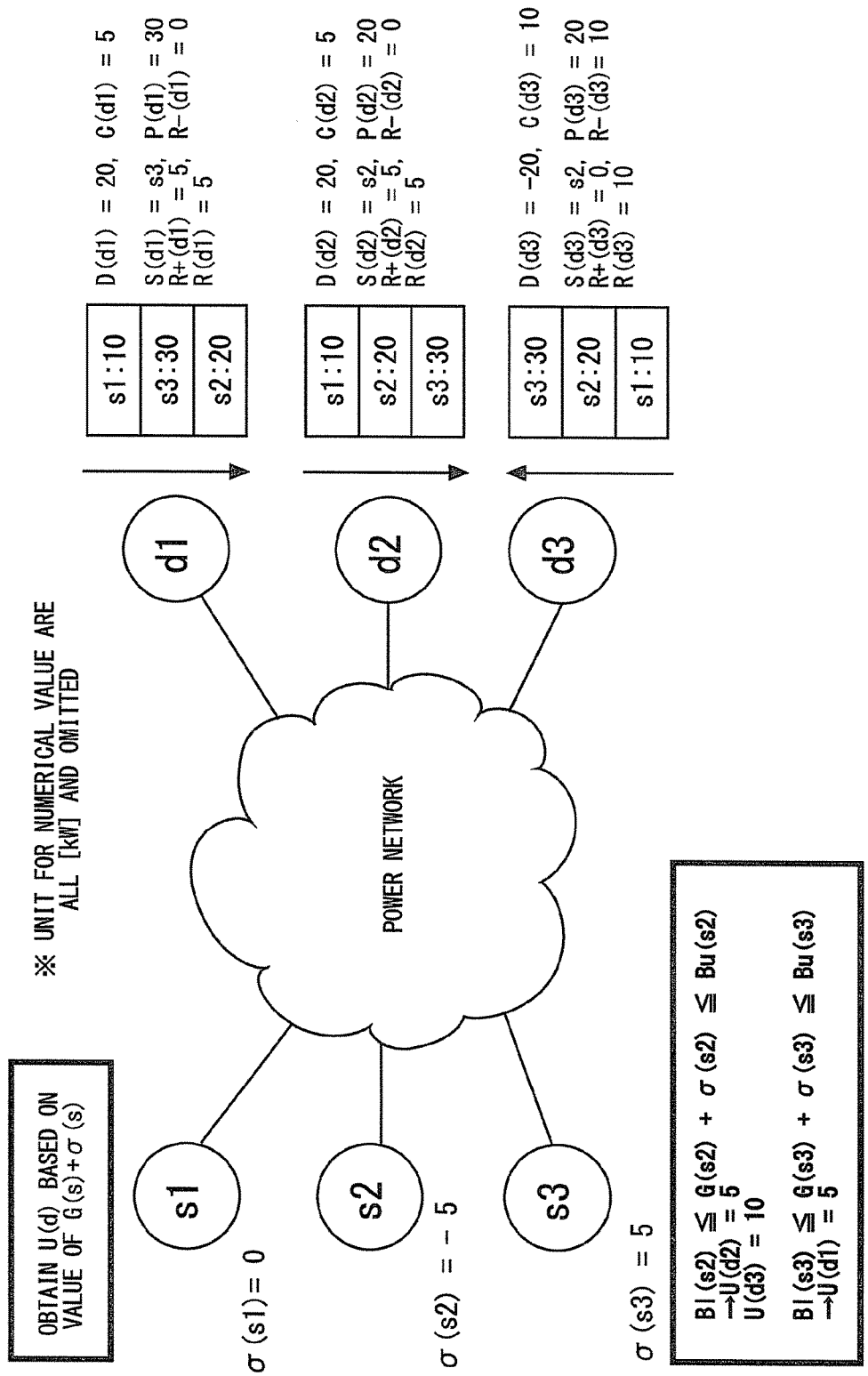
FIG. 61 shows an example of a power adjustment according to the first exemplary embodiment of the present invention.

Then, as shown in FIG. 60, the central control device 52C calculates σ(s1), σ(s2) and σ(s3) (S221 in FIG. 50). Then, as shown in FIG. 61, the central control device 52C obtains U(s) based on the value "G(s)+σ(s)" (S222 and S223 in FIG. 50). That is, since the value "G(s2)+σ(s2)" in the power transmitting end s2 is within the threshold range (between the transmitted power lower limit value Bl(s2) and the transmitted power upper limit value Bu(s2)), the central control device 52C calculates as U(d2)=5 and U(d3)=10 (FIG. 61). Further, since the value "G(s3)+σ(s3)" in the power transmitting end s3 is within the threshold range (between the transmitted power lower limit value Bl(s3) and the transmitted power upper limit value Bu(s3)), the central control device 52C calculates as U(d1)=5 (FIG. 61).

Figure 62:
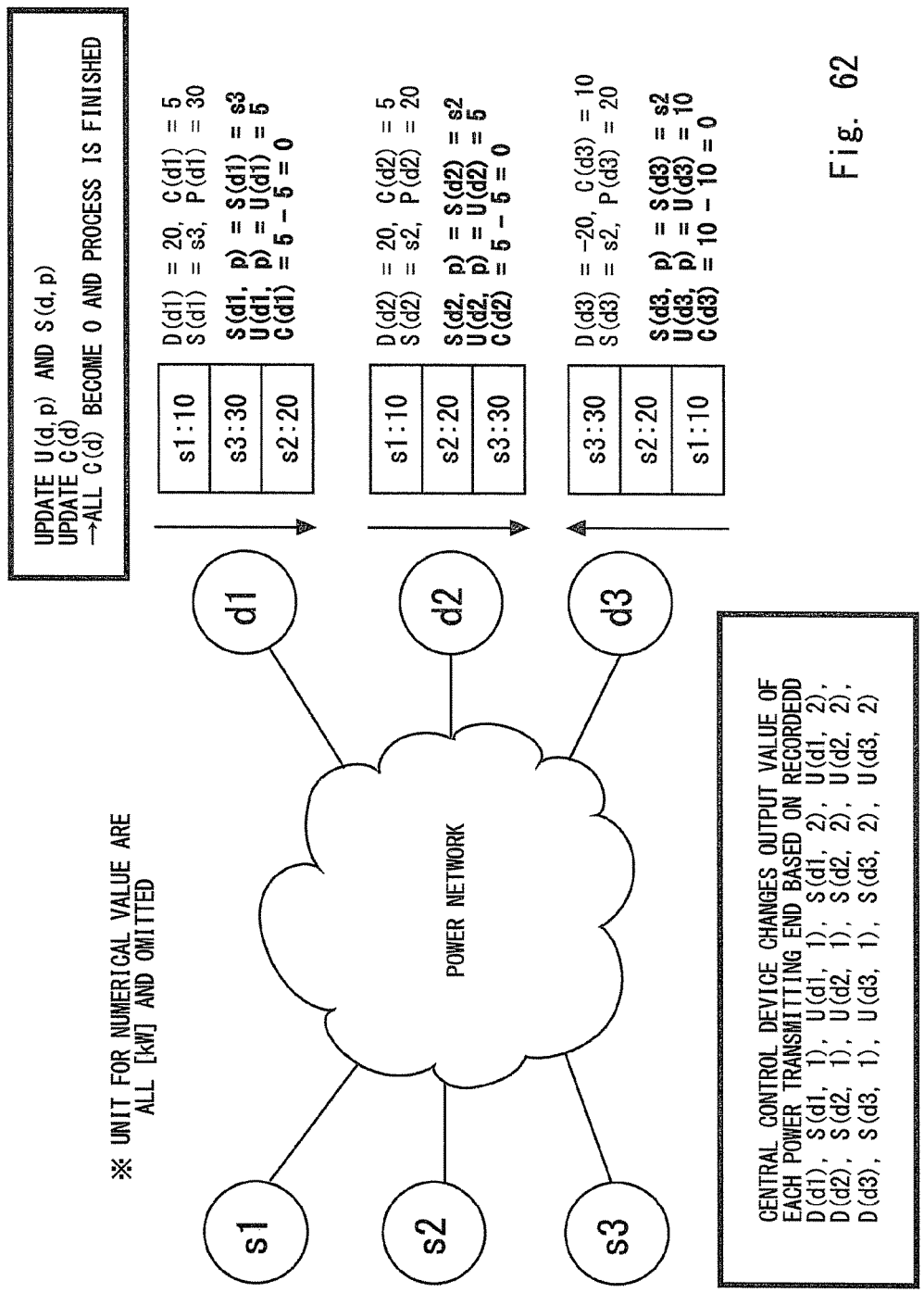
FIG. 62 shows an example of a power adjustment according to the first exemplary embodiment of the present invention.

After that, as shown in FIG. 62, the central control device 52C updates the power transmitting end S(d, p) for which the power increased/decreased amount determined value U(d, p) and the power increase/decrease have been determined, and updates the remnant power request value C(d) (FIG. 51). At this point, since all the remnant power request values C(d) become zero, the step S200 is finished. Then, the central control device 52C changes the output value of each power transmitting end based on D(d1), S(d1,1), U(d1,1), S(d1,2), U(d1,2), D(d2), S(d2,1), U(d2,1), S(d2,2), U(d2,2), D(d3), S(d3,1), U(d3,1), S(d3,2) and U(d3,2) recorded in the hard disk drive 524 or the like.

Here, examples of the above-described changes in values in the above-described power transmitting ends s1-s3 before and after the power adjustment are summarized in FIG. 63. For FIG. 63, an explanation is given for each power transmitting end.

Firstly, the transmitted power predetermined value G(s1) in the power transmitting end s1 has increased by 20 kW from 30 kW before the power adjustment to 50 kW after the power adjustment. Therefore, G(s1) remains in the range between the transmitted power lower limit value Bl(s1)=20 and the transmitted power upper limit value Bu(s1)=50 before and after the power adjustment. Further, the breakdown of the power (breakdown power) supplied from the power transmitting end s1 to each of the power receiving ends d1 and d2 has increased by 15 kW from 10 kW before the power adjustment to 25 kW after the power adjustment. Further, the breakdown of the power supplied from the power transmitting end s1 to the power receiving end d3 has decreased by 10 kW from 10 kW before the power adjustment to 0 kW after the power adjustment. Therefore, it can be said that the overall supply power of the power transmitting end s1 has increased by 20 kW after the power adjustment.

Next, the transmitted power predetermined value G(s2) in the power transmitting end s2 has decreased by 5 kW from 60 kW before the power adjustment to 55 kW after the power adjustment. Therefore, G(s2) remains in the range between Bl(s2)=50 and Bu(s2)=80 before and after the power adjustment. Further, the breakdown power from the power transmitting end s2 to the power receiving end d1 is 20 kW before and after the power adjustment, i.e., is unchanged after the power adjustment. Further, the breakdown power from the power transmitting end s2 to the power receiving end d2 has increased by 5 kW from 20 kW before the power adjustment to 25 kW after the power adjustment. Further, the breakdown power from the power transmitting end s2 to the power receiving end d3 has decreased by 10 kW from 20 kW before the power adjustment to 10 kW after the power adjustment. Therefore, it can be said that the overall supply power of the power transmitting end s2 has decreased by 5 kW after the power adjustment.

Next, the transmitted power predetermined value G(s3) in the power transmitting end s3 has increased by 5 kW from 90 kW before the power adjustment to 95 kW after the power adjustment. Therefore, G(s3) remains in the range between Bl(s3)=70 and Bu(s3)=110 before and after the power adjustment. Further, the breakdown power from the power transmitting end s3 to the power receiving end d1 has increased by 5 kW from 30 kW before the power adjustment to 35 kW after the power adjustment. Further, each of the breakdown power from the power transmitting end s3 to the power receiving end d2 and that from the power transmitting end s3 to the power receiving end d3 is 30 kW before and after the power adjustment, i.e., is unchanged after the power adjustment. Therefore, it can be said that the overall supply power of the power transmitting end s3 has increased by 5 kW after the power adjustment. Further, examples of the above-described changes in values in the power receiving ends d1 to d3 before and after the power adjustment are summarized in FIG. 64. For FIG. 64, an explanation is given for each power receiving end.

Firstly, the received power value in the power receiving end d1 has increased by 20 kW from 60 kW before the power adjustment to 80 kW after the power adjustment. Further, the received power value in the power receiving end d2 has increased by 20 kW from 60 kW before the power adjustment to 80 kW after the power adjustment. Further, the received power value in the power receiving end d3 has decreased by 20 kW from 60 kW before the power adjustment to 40 kW after the power adjustment.

Therefore, it can be said that in each of the power receiving ends d1 to d3, the received power value could have been adjusted so that the received power value satisfies its requested power after the power adjustment. Note that the breakdown power of each power receiving end in FIG. 64 is based on the priorities of the power transmitting ends and corresponds to the breakdown power shown in FIG. 63.

As described above, in the first exemplary embodiment according to the present invention, when received power values in a plurality of power receiving ends are brought closer to their power request values, they are adjusted in accordance with the priorities for power transmitting ends. Note that since the power supply priority information 5248 is managed for each of the power receiving ends, the priorities for the power transmitting ends can be individually set for each customer. Therefore, it is possible to cope with various power adjustment needs from a plurality of customers.

Note that the above-described power adjustment process may be performed only for the power receiving end(s) for which a change in the received power is requested (in other words, the power request value is updated). Further, the setting (updating) of the power request value may be explicitly set by a customer, or the power demand may be measured in real time at regular intervals in each power receiving end and changes in the power demand are thereby detected for the setting of the power request value.

Further, the above-described power adjustment process may be performed before transmitting power.

Note that in the steps S225 and S227 in FIG. 50, the method in which the amount by which the the value is greater than the upper limit value or smaller the lower limit value is weighted by the request value and the weighted value is distributed is used. However, the determination method for distributed values is not limited to this method. For example, a method in which the amount by which the the value is greater than the upper limit value or smaller the lower limit value is uniformly distributed may be adopted.

Alternatively, a method in which the distributed values are not handled as continuous values but are distributed in units of a fixed amount (e.g., 1 kW or 10 kW) may be adopted. Further, the above-described methods may be combined with one another. Further, the determination method for distributed values can be considered to be a method in which when it is determined that the value "$G(s)+\sigma(s)$" is outside the threshold range, i.e., the range between $Bl(s)$ and $Bu(s)$, the increase/decrease request value $R(d)$ set for each power transmitting end is corrected so that it falls within the aforementioned threshold range and the corrected value is determined as the adjustment value of the supply power for the power transmitting end for which the determination is made.

Second Exemplary Embodiment

Figure 65:
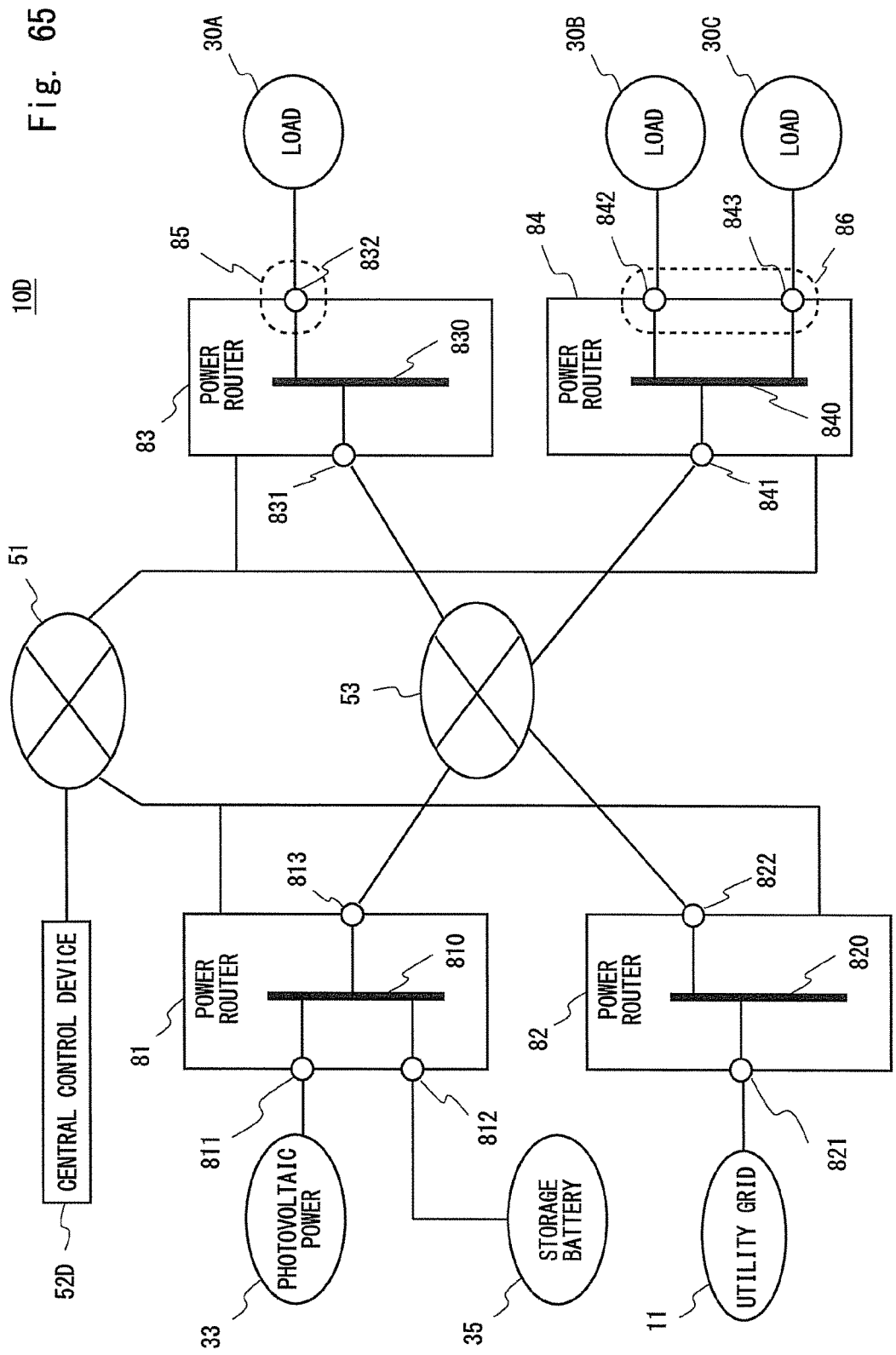
FIG. 65 is a block diagram showing a configuration of a power network system according to a second exemplary embodiment of the present invention.

In a second exemplary embodiment according to the present invention, a power adjustment in a case where priorities are set among a plurality of power receiving ends is explained. FIG. 65 is a block diagram showing a configuration of a power network system 10D according to a second exemplary embodiment of the present invention. The power network system 10D differs from the power network system 10C in that: the central control device 52C is replaced by a central control device 52D; the leg 832 belongs to a leg group 85; and the legs 842 and 843 belong to a leg group 86. The other configuration of the power network system 10D is similar to that of the power network system 10C.

Note that the leg group is a group of legs for which the same value is set for the priority for prioritizing the power supply. Therefore, the second exemplary embodiment according to the present invention is not limited to the case where the legs belonging to the leg group are all located in the same power router. That is, when the same priority is set for legs located in different power routers, these legs can be handled as a leg group. For example, when the same priority is set for the leg 832 located in the power router 83 and the leg 843 located in the power router 84, these legs can be handled as a leg group.

Figure 66:
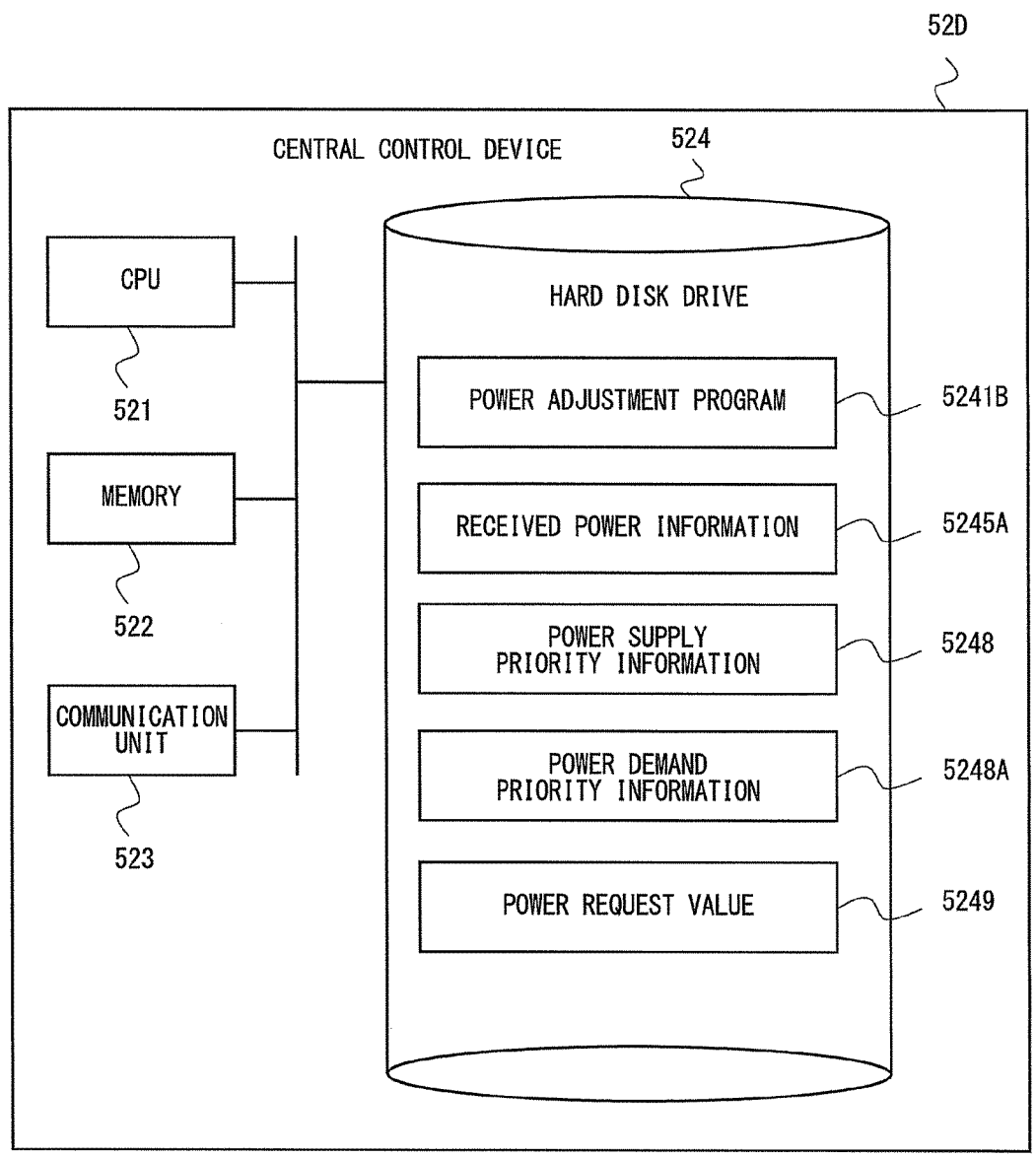
FIG. 66 is a block diagram showing a configuration of a central control device according to the second exemplary embodiment of the present invention.

FIG. 66 is a block diagram showing a configuration of the central control device 52D according to the second exemplary embodiment of the present invention. The central control device 52D includes a CPU 521, a memory 522, a communication unit 523, and a hard disk drive 524 similar to those of the above-described central control device 52C. Note that the central control device 52D differs from the central control device 52C in that a power adjustment program 5241B and power demand priority information 5248A are stored in the hard disk drive 524 in the central control device 52D.

The power adjustment program 5241B is a computer program in which a power adjustment process according to the second exemplary embodiment of the present invention (e.g., a later-described process shown in FIG. 69) is implemented. Further, the power demand priority information 5248A is information defining priorities for a plurality of power receiving end groups (i.e., ones in which every leg belonging to the leg group is the above-described "power receiving end") for indicating the levels for prioritizing the power supply among the plurality of power receiving end groups. For example, the power demand priority information 5248A may be identification information of a power transmitting end group with a priority associated therewith.

FIG. 67 shows an example of power demand priority information according to the second exemplary embodiment of the present invention. In this example, for each leg group ID, IDs of legs belonging to the leg group and a priority of the leg group are associated. For example, a leg connected to a demander such as a public customer such as a transport facility and a medical facility can be set as a leg having the highest priority. Note that at least one leg (power receiving end) should belong to a leg group. Alternatively, the power demand priority information 5248A may be information defining priorities for a plurality of power receiving ends for indicating the levels for prioritizing the power supply among the plurality of power receiving ends. For example, the power demand priority information 5248A may be identification information of a power receiving end with a priority associated therewith. Then, in this case, a group of power receiving ends for which the same priority is defined can be regarded as the above-described power receiving end group. FIG. 68 shows another example of the power demand priority information according to the second exemplary embodiment of the present invention. In this example, a priority is associated with each leg ID.

In the central control device 52D, the CPU 521 reads the OS, the power transmission control program 5241B, or the like stored in the memory 522 or the hard disk drive 524, and executes the read program or the like. In this way, the central control device 52D can function as a power adjustment unit (not shown) and carry out a power adjustment process and the like. Note that the power adjustment unit can acquire power supply priority information and power demand priority information by having the CPU 521 of the central control device 52D read the power supply priority information 5248 and the power demand priority information 5248A from the hard disk drive 524. Alternatively, when the power supply priority information 5248 and the power demand priority information 5248A are not stored in advance in the hard disk drive 524, the power adjustment unit can acquire power supply priority information and power demand priority information by externally receiving the power supply priority information and the power demand priority information.

Note that the power adjustment unit adjusts supply power supplied through the plurality of power transmitting ends according to the power request value requested in each of the plurality of power receiving ends. In particular, the power adjustment unit selects a group of power receiving ends for which the same priority is defined as a power receiving end group to be processed from among a plurality of power receiving ends according to the priority defined in the power demand priority information. Further, the power adjustment unit performs a determination process every time the power receiving end group to be processed is selected. After that, the power adjustment unit adjusts the supply power in each power transmitting end based on the adjustment value of the supply power determined by the determination process. Note that the power adjustment unit determines the power transmitting end for which the supply power is adjusted from among a plurality of power transmitting ends based on at least the received power information in the power receiving end group to be processed and the priority defined in the power supply priority information, performs a determination process for determining an adjustment value of the supply power in the determined power transmitting end, and adjusts the supply power based on the determined adjustment value.

Note that in the determination process, for each of the power receiving ends included in the selected power receiving end group to be processed, the power transmitting end for which the supply power is adjusted is selected from among the plurality of power transmitting ends based on the received power information acquired in each power receiving end and the priority defined in the power supply priority information. Further, in the determination process, the adjustment value of the supply power in the determined power transmitting end is determined so that the power value received in each of the power receiving ends included in the power receiving end group to be processed is brought closer to the power request value.

Figure 69:
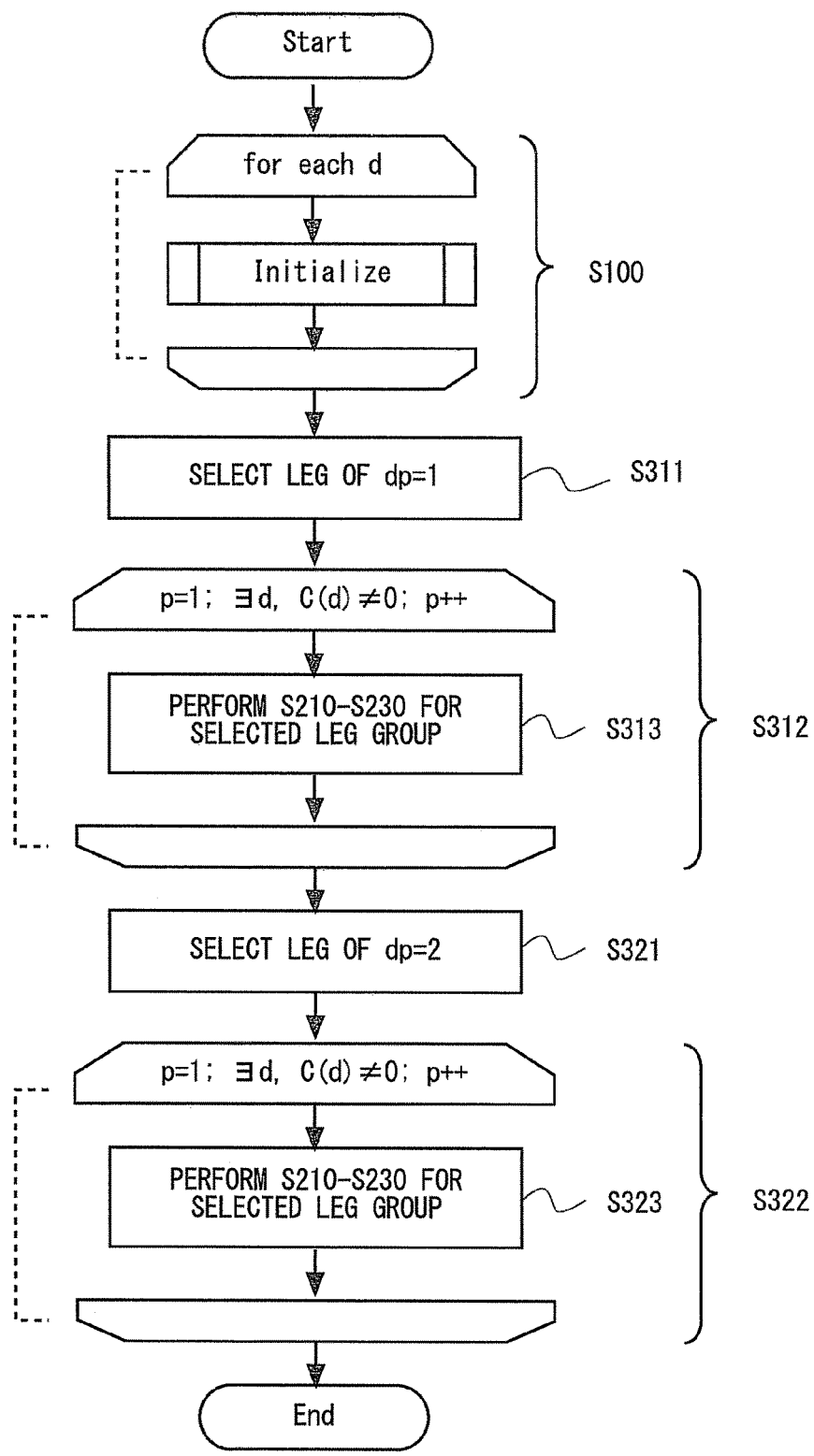
FIG. 69 is a flowchart showing a power adjustment process flow according to the second exemplary embodiment of the present invention.

FIG. 69 is a flowchart showing a power adjustment process flow according to the second exemplary embodiment of the present invention. Firstly, similarly to FIG. 47, the central control device 52D executes an Initialize subroutine for each power receiving end d (S100).

Next, the central control device 52D refers to the power demand priority information 5248A and selects a leg group for which the priority dp of the power receiving ends is one, i.e., the priority dp=1 as a leg group to be processed (S311). In this example, the leg group 85 is selected. Note that when the power demand priority information 5248A is the same as the example shown in FIG. 68, it is assumed that the central control device 52D selects the leg d1 for which the priority dp of the power receiving ends is one, i.e., the priority dp=1 as the leg group to be processed. Then, similarly to FIGS. 47, 49, 50 and 51, the central control device 52D calculates increase/decrease power while decreasing the priority to be processed by one at a time until all the remnant power request values C(d) become zero (S312). That is, the central control device 52D performs steps S210, S220 and S230 for the leg 832 included in the selected leg group 85 (S313). In this process, since the power request values in the other power receiving ends, i.e., the legs 842 and 843 are not taken into account, the supply power for the leg 832, which is the power receiving end, can be adjusted by using all the power transmitting ends.

After that, the central control device 52D refers to the power demand priority information 5248A and selects a leg group for which the priority dp of the power receiving ends is two, i.e., the priority dp=2 as a leg group to be processed (S321). At this time, the leg group 86 is selected. Note that when the power demand priority information 5248A is the same as the example shown in FIG. 68, it is assumed that the central control device 52D selects the legs d2 and d3 for which the priority dp of the power receiving ends is two, i.e., the priority dp=2 as the leg group to be processed. Then, similarly to FIGS. 47, 49, 50 and 51, the central control device 52D calculates increase/decrease power while decreasing the priority to be processed by one at a time until all the remnant power request values C(d) become zero (S322). That is, the central control device 52D performs steps S210, S220 and S230 for the legs 842 and 843 included in the selected leg group 86 (S323). In this process, the power that can be supplied in each power transmitting end is performed by the adjusted power for the leg 832.

As described above, the second exemplary embodiment according to the present invention can make it possible to give a priority to a group of some power receiving ends among the plurality of power receiving ends and then perform a power adjustment in which priorities for different power transmitting ends are taken into account for each of the power receiving ends. Therefore, it is possible to cope with various needs of a plurality of customers more effectively.

Third Exemplary Embodiment

A third exemplary embodiment according to the present invention is a modified example of the above-described second exemplary embodiment. Specifically, a power adjustment process is performed for each combination of a priority for a power receiving end group and a priority for a power transmitting end group. That is, the power adjustment unit calculates a difference between the current received power value (i.e., the received power value at the present time) and the power request value for each of a plurality of power receiving ends. Then, the power adjustment unit selects a power receiving end group to be processed from among a plurality of power receiving end groups according to the priority defined in the power demand priority information. Then, the power adjustment unit selects a priority that has not been processed yet in the selected power receiving end group to be processed as a priority to be processed in the descending order from the highest priority to the lowest priority based on the power supply priority information, and performs an adjustment process every time the power receiving end group and the priority to be processed are selected until the difference is cancelled out. This makes it possible to perform power adjustments according to the detailed needs.

Figure 70:
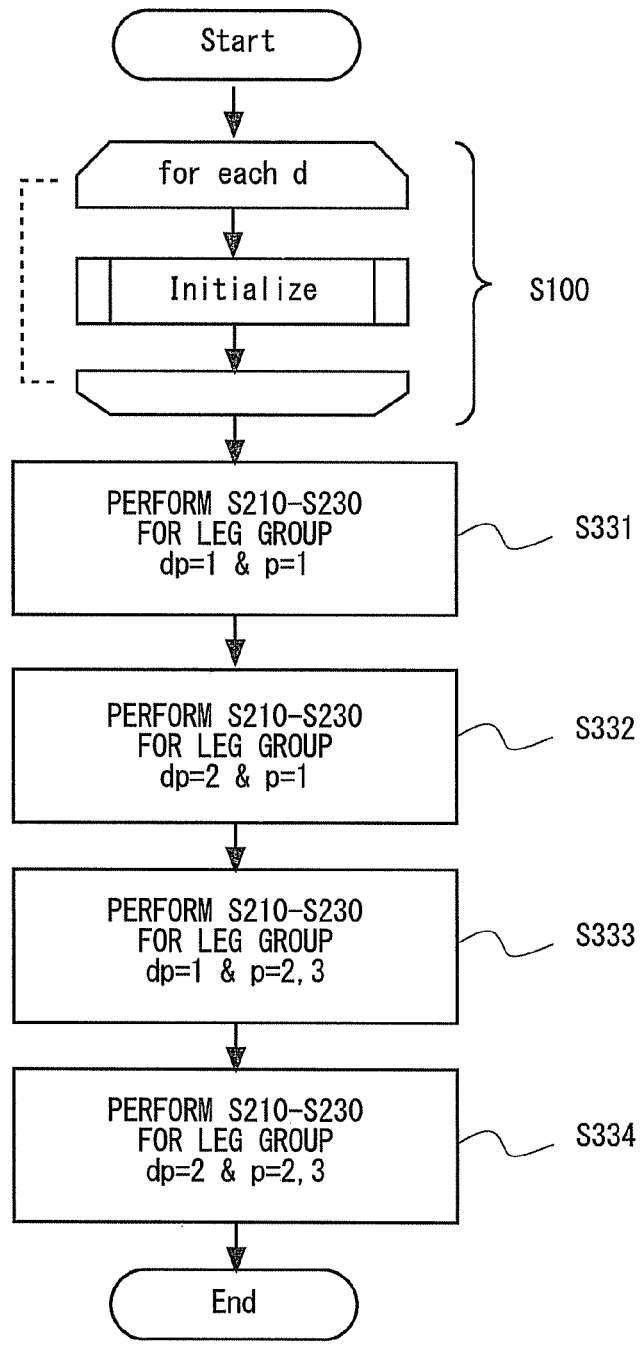
FIG. 70 is a flowchart showing a power adjustment process flow according to a third exemplary embodiment of the present invention.

FIG. 70 is a flowchart showing a power adjustment process flow according to the third exemplary embodiment of the present invention. Firstly, similarly to FIG. 47, the central control device 52D executes an Initialize subroutine for each power receiving end d (S100).

Next, the central control device 52D refers to the power demand priority information 5248A, and selects a leg group for which the priority dp of the power receiving ends is one, i.e., the priority dp=1 and selects the priority p=1 to be processed. At this time, the leg group 85 is selected. Then, the central control device 52D performs steps S210, S220 and S230 for the leg 832 included in the selected leg group 85 with the priority p=1 (S331).

Next, the central control device 52D refers to the power demand priority information 5248A, and selects a leg group for which the priority dp of the power receiving ends is two (i.e., dp=2) and selects the priority p=1 to be processed. At this time, the leg group 86 is selected. Then, the central control device 52D performs steps S210, S220 and S230 for each of the legs 842 and 843 included in the selected leg group 86 with the priority p=1 (S332).

Then, the central control device 52D refers to the power demand priority information 5248A, and selects a leg group for which the priority dp of the power receiving ends is one, i.e., the priority dp=1 and selects the priorities to be processed in the order of the priorities p=2 and p=3. At this time, the leg group 85 is selected. Then, the central control device 52D performs steps S210, S220 and S230 for the leg 832 included in the selected leg group 85 with the priorities p=2 and p=3 (S333).

Finally, the central control device 52D refers to the power demand priority information 5248A, and selects a leg group for which the priority dp of the power receiving ends is two, i.e., the priority dp=2 and selects the priorities p=2 and p=3 to be processed. At this time, the leg group 86 is selected. Then, the central control device 52D performs steps S210, S220 and S230 for each of the legs 842 and 843 included in the selected leg group 86 with the priorities p=2 and p=3 (S334).

As described above, the third exemplary embodiment according to the present invention can make it possible to perform a power adjustment in a more detailed manner than the second exemplary embodiment.

Other Exemplary Embodiments

Note that the above-described "central control devices" (including 52, 52B, 52C and 52D) are merely examples of the power adjustment apparatus, and the power adjustment apparatus is not limited to these central control devices. Further, the present invention is not limited to the above-described exemplary embodiments, and needless to say, various modifications can be made without departing from the spirit and scope of the present invention described above. For example, although the present invention is described as a hardware configuration in the above-described exemplary embodiments, the present invention is not limited to the hardware configurations. In the present invention, arbitrary processing can be also implemented by causing a CPU (Central Processing Unit) to execute a computer program.

In the above-described examples, the program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, a DVD (Digital Versatile Disc), a BD (Blu-ray (registered trademark) Disc), and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

Although the present invention is explained above with reference to exemplary embodiments, the present invention is not limited to the above-described exemplary embodiments. Various modifications that can be understood by those skilled in the art can be made to the configuration and details of the present invention within the scope of the invention.

This application is based upon and claims the benefit of priority from Japanese patent applications No. 2013-105214, filed on May 17, 2013, the disclosure of which is incorporated herein in its entirety by reference.

REFERENCE SIGNS LIST

10 POWER NETWORK SYSTEM
10A POWER NETWORK SYSTEM
10B POWER NETWORK SYSTEM
10C POWER NETWORK SYSTEM
10D POWER NETWORK SYSTEM
11 UTILITY GRID
12 LARGE-SCALE POWER PLANT
21 POWER CELL
22 POWER CELL
23 POWER CELL
24 POWER CELL
30 LOAD
30A LOAD
30B LOAD
30C LOAD
31 HOUSE
32 BUILDING
33 SOLAR PANEL
34 WIND POWER GENERATOR
35 POWER STORAGE FACILITY (STORAGE BATTERY)
35a STORAGE BATTERY
35b STORAGE BATTERY
41 POWER ROUTER
42 POWER ROUTER
43 POWER ROUTER
44 POWER ROUTER
50 MANAGEMENT SERVER
51 COMMUNICATION NETWORK
52 CENTRAL CONTROL DEVICE
52B CENTRAL CONTROL DEVICE
52C CENTRAL CONTROL DEVICE
52D CENTRAL CONTROL DEVICE
521 CPU
522 MEMORY
523 COMMUNICATION UNIT
524 HARD DISK DRIVE
5241 POWER TRANSMISSION CONTROL PROGRAM
5241A POWER ADJUSTMENT PROGRAM
5241B POWER ADJUSTMENT PROGRAM
5242 INPUT/OUTPUT TERMINAL SETTING INFORMATION
5243 POWER TRANSMISSION ROUTE INFORMATION
5244 MEASUREMENT TAG
5245 POWER TAG
5245A RECEIVED POWER INFORMATION
5246 POWER TRANSMISSION/RECEPTION TRANSACTION CONTRACT INFORMATION
5247 CORRESPONDENCE RELATION MANAGEMENT INFORMATION
5248 POWER SUPPLY PRIORITY INFORMATION
5248A POWER DEMAND PRIORITY INFORMATION
5249 POWER REQUEST VALUE
53 POWER NETWORK
100 (FIRST) POWER ROUTER
101 DC BUS
102 SMOOTHING CAPACITOR
103 VOLTAGE SENSOR
110 LEG
111 POWER CONVERSION UNIT
111D FEEDBACK DIODE
111P ANTI-PARALLEL CIRCUIT
111T POWER CONVERSION ELEMENT
112 CURRENT SENSOR
113 SWITCH
114 VOLTAGE SENSOR
115 CONNECTION TERMINAL
120 LEG
121 POWER CONVERSION UNIT
121T POWER CONVERSION ELEMENT
122 CURRENT SENSOR
123 SWITCH
124 VOLTAGE SENSOR
125 CONNECTION TERMINAL
130 LEG
135 CONNECTION TERMINAL
140 LEG
145 CONNECTION TERMINAL
150 LEG
151 POWER CONVERSION UNIT
152 CURRENT SENSOR
153 SWITCH
154 VOLTAGE SENSOR
155 CONNECTION TERMINAL
160 LEG
162 CURRENT SENSOR

163 SWITCH
164 VOLTAGE SENSOR
165 CONNECTION TERMINAL
180 STORAGE UNIT
181 PRIORITY TABLE
190 CONTROL UNIT
200 SECOND DPOWER ROUTER
201 DC BUS
210 FIRST LEG (STAND-ALONE LEG)
220 SECOND LEG (MASTER LEG)
230 THIRD LEG
240 FOURTH LEG
245 CONNECTION TERMINAL
250 FIFTH LEG
260 SIXTH LEG
300 THIRD POWER ROUTER
301 DC BUS
310 DESIGNATED POWER TRANSMISSION/RECEPTION LEG
320 MASTER LEG
400 FOURTH POWER ROUTER
401 DC BUS
410 STAND-ALONE LEG
420 MASTER LEG
500 FIFTH POWER ROUTER
501 DC BUS
600 SIXTH POWER ROUTER
601 DC BUS
71A POWER TRANSMISSION LINE
71B POWER TRANSMISSION LINE
72 DISTRIBUTION LINE
BL BRANCH LINE
100A POWER ROUTER
101A DC BUS
110A INPUT/OUTPUT TERMINAL
120A INPUT/OUTPUT TERMINAL
190A CONTROL UNIT
200A POWER ROUTER
201A DC BUS
210A INPUT/OUTPUT TERMINAL
220A INPUT/OUTPUT TERMINAL
230A INPUT/OUTPUT TERMINAL
290A CONTROL UNIT
100B POWER ROUTER
101B DC BUS
110B INPUT/OUTPUT TERMINAL
120B INPUT/OUTPUT TERMINAL
130B INPUT/OUTPUT TERMINAL
140B INPUT/OUTPUT TERMINAL
190B CONTROL UNIT
200B POWER ROUTER
201B DC BUS
210B INPUT/OUTPUT TERMINAL
220B INPUT/OUTPUT TERMINAL
230B INPUT/OUTPUT TERMINAL
240B INPUT/OUTPUT TERMINAL
290B CONTROL UNIT
C1-C3 CONTRACT
ST1-ST4 SETTING
RT1-RT5 ROUTE
MT1-MT6 MEASUREMENT TAG
PT1-PT10 POWER TAG
81 POWER ROUTER
810 DC BUS
811 LEG
812 LEG
813 LEG
82 POWER ROUTER
820 DC BUS
821 LEG
822 LEG
83 POWER ROUTER
830 DC BUS
831 LEG
832 LEG
84 POWER ROUTER
840 DC BUS
841 LEG
842 LEG
843 LEG
85 LEG GROUP
86 LEG GROUP
s1 POWER TRANSMITTING END
s2 POWER TRANSMITTING END
s3 POWER TRANSMITTING END
d1 POWER RECEIVING END
d2 POWER RECEIVING END
d3 POWER RECEIVING END

The invention claimed is:

1. A power network system comprising a plurality of power cells each comprising a power router for asynchronous connection to a power grid, wherein
the power router comprises:
a DC bus maintained at a predetermined rated voltage;
a plurality of input/output end parts, one of connection ends of each of the input/output end parts being connected to the DC bus and the other of the connection ends serving as an external connection terminal and being connected to an external connection partner, each of the input/output end parts being configured to convert power between the one connection end and the other connection end; and
control unit that controls the plurality of input/output end parts,
at least first and second power routers among the plurality of power routers are connected to each other by respective input/output end parts,
some of the plurality of input/output end parts included in the first power router are used as a plurality of power transmitting ends,
each of the plurality of power transmitting ends supplies supply power to the second power router, the supply power being supplied from one of a plurality of power supply sources,
some of the plurality of input/output end parts included in the second power router are used as a plurality of power receiving ends,
each of the plurality of power receiving ends receives supply power through the DC bus and supplies the received power to one of a plurality of power demanders, the supply power being supplied from each of the plurality of power transmitting ends,
the power network system comprises a power adjustment apparatus connected to the first and second power routers through a communication network,
the power adjustment apparatus comprises power adjustment unit that adjusts the supply power according to a power request value requested in each of the plurality of power receiving ends, and
the power adjustment unit:
acquires, for each of the plurality of power receiving ends, received power information including identification information of each of the plurality of power transmitting ends and a value of supply power supplied from each of the plurality of power transmitting ends, and power supply priority information defining a priority for determining a power transmitting end for which an adjustment of the supply power to be supplied to each of the plurality of power receiving ends should be prioritized; and determines a power transmitting end for which the supply power is adjusted from among the plurality of power transmitting ends based on the received power information and the priority defined in the power supply priority information.

2. The power network system according to claim 1, wherein the power adjustment unit adjusts the supply power in the determined power transmitting end so as to bring a value of the received power in each of the power receiving ends closer to the power request value.

3. The power network system according to claim 1, wherein the power adjustment unit:

adjusts, for each of the plurality of power receiving ends, the supply power of the power transmitting end having the highest priority, which is determined based on the received power information and the power supply priority information; and determines, after the adjustment, the power transmitting end having a next highest priority as the power transmitting end for which the supply power is adjusted based on the received power information and the power supply priority information.

4. The power network system according to claim 1, wherein the received power information further includes attribute information of a supply source that supplies the supply power for each of the plurality of power transmitting ends, in the power supply priority information, a priority of the attribute information is defined as a priority for determining the power transmitting end for which the adjustment should be prioritized for each of the plurality of power receiving ends, and the power adjustment unit:

refers to the power supply priority information and specifies the attribute information corresponding to a predetermined priority; and refers to the received power information and determines the power transmitting end corresponding to the specified attribute information.

5. The power network system according to claim 4, wherein the attribute information includes, for each of the plurality of power transmitting ends, a plurality of attribute types and attribute values corresponding to the respective attribute types, the power supply priority information includes information in a case where different priorities of the attribute types or different priorities of the attribute values are defined among the plurality of power receiving ends.

6. The power network system according to claim 1, wherein the power adjustment unit:

calculates, for each of the plurality of power receiving ends, a difference between a current received power value and the power request value;

selects a priority to be processed in a descending order from the highest priority to the lowest priority based on the power supply priority information;

performs a determination process every time the priority to be processed is selected until the difference is cancelled out; and adjusts the supply power in each of the plurality of power transmitting ends based on an adjustment value of the supply power determined by the determination process, and the determination process comprises:

specifying the power transmitting end corresponding to the priority to be processed among the power transmitting ends included in the received power information for each of the plurality of power receiving ends;

specifying a value of the supply power supplied from the specified power transmitting end included in the current received power value based on the received power information and setting this specified supply power value as an increase/decrease request value for the specified power transmitting end;

calculating a total increase/decrease request value by summing up the increase/decrease request value sets for each of the plurality of power transmitting ends;

determining whether or not the total value of the current supply power value in each of the plurality of power transmitting ends and the total increase/decrease request value is within a predetermined threshold range;

determining, when the total value is determined to be within the threshold range, the increase/decrease request value set for each of the plurality of power transmitting ends as the adjustment value of the supply power for the power transmitting end for which the determination is made, and correcting, when the total value is determined to be outside the threshold range, the increase/decrease request value set for each of the plurality of power transmitting ends so that it falls within the threshold range and determining the corrected increase/decrease request value as the adjustment value of the supply power for the power transmitting end for which the determination is made.

7. The power network system according to claim 1, wherein when the power adjustment unit externally receives the power request value, the power adjustment means unit calculates a difference between the received power request value and the current received power value, and when the difference is equal to or greater than a predetermined value, adjusts the supply power.

8. The power network system according to claim 1, wherein the power adjustment unit measures the current received power value in each of the plurality of power receiving ends at a predetermined interval, and when the difference between the measured received power value and the power request value is equal to or greater than a predetermined value, adjusts the supply power.

9. The power network system according to claim 1, wherein the power adjustment apparatus further comprises storage unit for storing the power supply priority information.

10. A power adjustment apparatus connected to a power router through a communication network, the power router comprising:

a DC bus maintained at a predetermined rated voltage;

a plurality of input/output end parts, one of connection ends of each of the input/output end parts being connected to the DC bus and the other of the connection ends serving as an external connection terminal and being connected to an external connection partner, each of the input/output end parts being configured to convert power between the one connection end and the other connection end; and control unit that controls the plurality of input/output end parts, wherein at least first and second power routers among the plurality of power routers are connected to each other by respective input/output end parts, some of the plurality of input/output end parts included in the first power router are used as a plurality of power transmitting ends, each of the plurality of power transmitting ends supplies supply power to the second power router, the supply power being supplied from one of a plurality of power supply sources, some of the plurality of input/output end parts included in the second power router are used as a plurality of power receiving ends, each of the plurality of power receiving ends receives supply power through the DC bus and supplies the received power to one of a plurality of power demanders, the supply power being supplied from each of the plurality of power transmitting ends, the power adjustment apparatus comprises power adjustment unit that adjusts the supply power according to a power request value requested in each of the plurality of power receiving ends, and the power adjustment unit:

acquires, for each of the plurality of power receiving ends, received power information including identification information of each of the plurality of power transmitting ends and a value of supply power supplied from each of the plurality of power transmitting ends, and power supply priority information defining a priority for determining the power transmitting end for which an adjustment of the supply power to be supplied to each of the plurality of power receiving ends should be prioritized; and determines a power transmitting end for which the supply power is adjusted from among the plurality of power transmitting ends based on the received power information and the priority defined in the power supply priority information.

11. A power adjustment method using a power router and a power adjustment apparatus connected to the power router through a communication network, the power router comprising:

a DC bus maintained at a predetermined rated voltage;

a plurality of input/output end parts, one of connection ends of each of the input/output end parts being connected to the DC bus and the other of the connection ends serving as an external connection terminal and being connected to an external connection partner, each of the input/output end parts being configured to convert power between the one connection end and the other connection end; and control unit that controls the plurality of input/output end parts, wherein at least first and second power routers among the plurality of power routers are connected to each other by respective input/output end parts, and when:

some of the plurality of input/output end parts included in the first power router are used as a plurality of power transmitting ends;

each of the plurality of power transmitting ends supplies supply power to the second power router, the supply power being supplied from one of a plurality of power supply sources;

some of the plurality of input/output end parts included in the second power router are used as a plurality of power receiving ends; and each of the plurality of power receiving ends receives supply power through the DC bus and supplies the received power to one of a plurality of power demanders, the supply power being supplied from each of the plurality of power transmitting ends, the power adjustment apparatus:

acquires, for each of the plurality of power receiving ends, received power information including identification information of each of the plurality of power transmitting ends and a value of supply power supplied from each of the plurality of power transmitting ends, and power supply priority information defining a priority for determining the power transmitting end for which an adjustment of the supply power to be supplied to each of the plurality of power receiving ends should be prioritized;

determines a power transmitting end for which the supply power is adjusted from among the plurality of power transmitting ends based on the received power information and the priority defined in the power supply priority information;

determines an adjustment value of supply power at the determined power transmitting end; and adjusts the supply power in each of the plurality of power transmitting ends based on the determined adjustment value.

12. A non-transitory computer readable medium storing a power adjustment program for causing a computer connected to a power router through a communication network to execute a power adjustment process, the power router comprising:

a DC bus maintained at a predetermined rated voltage;

a plurality of input/output end parts, one of connection ends of each of the input/output end parts being connected to the DC bus and the other of the connection ends serving as an external connection terminal and being connected to an external connection partner, each of the input/output end parts being configured to convert power between the one connection end and the other connection end; and control unit that controls the plurality of input/output end parts, wherein at least first and second power routers among the plurality of power routers are connected to each other by respective input/output end parts, and when:

some of the plurality of input/output end parts included in the first power router are used as a plurality of power transmitting ends;

each of the plurality of power transmitting ends supplies supply power to the second power router, the supply power being supplied from one of a plurality of power supply sources;

some of the plurality of input/output end parts included in the second power router are used as a plurality of power receiving ends; and each of the plurality of power receiving ends receives supply power through the DC bus and supplies the received power to one of a plurality of power demanders, the supply power being supplied from each of the plurality of power transmitting ends, the power adjustment program causes the computer to execute:

a process of acquiring, for each of the plurality of power receiving ends, received power information including identification information of each of the plurality of power transmitting ends and a value of supply power supplied from each of the plurality of power transmitting ends, and power supply priority information defining a priority for determining the power transmitting end for which an adjustment of the supply power to be supplied to each of the plurality of power receiving ends should be prioritized;

a process of determining a power transmitting end for which the supply power is adjusted from among the plurality of power transmitting ends based on the received power information and the priority defined in the power supply priority information;

a process of determining an adjustment value of supply power at the determined power transmitting end; and a process of adjusting the supply power in each of the plurality of power transmitting ends based on the determined adjustment value.

* * * * *